(12) United States Patent
Schuelke et al.

(10) Patent No.: US 12,478,282 B2
(45) Date of Patent: Nov. 25, 2025

(54) METHODS AND SYSTEMS FOR COLLECTING SPIROMETRY DATA

(71) Applicant: eResearchTechnology, Inc., Philadelphia, PA (US)

(72) Inventors: Achim Schuelke, Winterhausen (DE); Stefan Schindelmann, Leinach (DE); Michael Worth, Wuerzburg (DE); Bernd Mark, Seinsheim (DE)

(73) Assignee: eResearchTechnology, Inc., Philadelphia, PA (US)

( * ) Notice: Subject to any disclaimer, the term of this patent is extended or adjusted under 35 U.S.C. 154(b) by 333 days.

(21) Appl. No.: 15/468,613

(22) Filed: Mar. 24, 2017

(65) Prior Publication Data

US 2017/0273597 A1  Sep. 28, 2017

Related U.S. Application Data

(60) Provisional application No. 62/313,016, filed on Mar. 24, 2016.

(51) Int. Cl.
*A61B 5/087*  (2006.01)
*A61B 5/00*  (2006.01)
(Continued)

(52) U.S. Cl.
CPC .............. *A61B 5/087* (2013.01); *A61B 5/002* (2013.01); *A61B 5/0022* (2013.01); *A61B 5/097* (2013.01); *A61B 5/1172* (2013.01); *A61B 5/1495* (2013.01); *A61B 5/7405* (2013.01); *A61B 5/7445* (2013.01); *G06F 21/32* (2013.01); *G16H 40/67* (2018.01); *H02J 7/0044* (2013.01); *H02J 50/10* (2016.02); *H02J 50/80* (2016.02); *A61B 5/1176* (2013.01); *A61B 5/7415* (2013.01); *A61B 5/743* (2013.01);
(Continued)

(58) Field of Classification Search
CPC .... A61B 2560/0431; A61B 2560/0456; A61B 5/087; A61B 5/097
See application file for complete search history.

(56) References Cited

U.S. PATENT DOCUMENTS 5,241,469 A    8/1993  Nelson et al.
5,502,660 A *  3/1996  Anderson .............. A61B 5/087
                                                    702/100
(Continued)

FOREIGN PATENT DOCUMENTS

CN    1228015 A      9/1999
CN    103987314 A    8/2014
(Continued)

OTHER PUBLICATIONS

Co-pending U.S. Appl. No. 15/583,723, filed May 1, 2017.
(Continued)

*Primary Examiner* — Tse W Chen
*Assistant Examiner* — Michael A Catina
(74) *Attorney, Agent, or Firm* — Buchanan Ingersoll & Rooney PC

(57) ABSTRACT

Disclosed herein are spirometers that can be used for assessment of pulmonary lung function. The disclosed systems, computer readable mediums and methods can be directed towards use in a variety of settings by health care professionals, clinical trial specialists, and individual users.

100 Claims, 32 Drawing Sheets

(51) Int. Cl.

| | | |
|---|---|---|
| *A61B 5/097* | (2006.01) | |
| *A61B 5/1172* | (2016.01) | |
| *A61B 5/1495* | (2006.01) | |
| *G06F 21/32* | (2013.01) | |
| *G16H 40/67* | (2018.01) | |
| *H02J 7/00* | (2006.01) | |
| *H02J 50/10* | (2016.01) | |
| *H02J 50/80* | (2016.01) | |
| *A61B 5/1171* | (2016.01) | |
| *H01M 10/42* | (2006.01) | |
| *H04W 4/80* | (2018.01) | |

(52) U.S. Cl.
CPC .......... *A61B 2560/0214* (2013.01); *A61B 2560/0431* (2013.01); *A61B 2560/0456* (2013.01); *A61B 2562/0219* (2013.01); *A61B 2562/029* (2013.01); *H01M 10/4257* (2013.01); *H04W 4/80* (2018.02)

(56) References Cited

U.S. PATENT DOCUMENTS

| | | | |
|---|---|---|---|
| 5,540,220 A * | 7/1996 | Gropper | A61M 16/024 128/204.21 |
| 5,778,882 A | 7/1998 | Raymond et al. | |
| 5,924,994 A * | 7/1999 | Harbrecht | A61B 5/087 600/532 |
| 6,095,985 A | 8/2000 | Raymond et al. | |
| 6,126,613 A | 10/2000 | Edwards et al. | |
| 6,190,326 B1 | 2/2001 | McKinnon et al. | |
| 6,282,441 B1 | 8/2001 | Raymond et al. | |
| 6,440,069 B1 | 8/2002 | Raymond et al. | |
| 6,640,134 B2 | 10/2003 | Raymond et al. | |
| 6,824,520 B2 * | 11/2004 | Orr | A61B 5/087 600/529 |
| 6,847,840 B2 | 1/2005 | Depasquale et al. | |
| 6,879,970 B2 | 4/2005 | Shiffman et al. | |
| 7,273,454 B2 | 9/2007 | Raymond et al. | |
| 7,291,115 B2 | 11/2007 | Burrul et al. | |
| 7,415,447 B2 | 8/2008 | Shiffman et al. | |
| 7,873,589 B2 | 1/2011 | Shiffman et al. | |
| 8,065,180 B2 | 11/2011 | Hufford et al. | |
| 8,145,519 B2 | 3/2012 | Hufford et al. | |
| 8,209,002 B2 | 6/2012 | Vajdic et al. | |
| 8,273,019 B2 | 9/2012 | Crowley et al. | |
| 8,311,618 B2 | 11/2012 | Vajdic et al. | |
| 8,380,531 B2 | 2/2013 | Paty et al. | |
| 8,433,605 B2 | 4/2013 | Hufford et al. | |
| 8,533,029 B2 | 9/2013 | Hufford et al. | |
| 8,679,012 B1 | 3/2014 | Kayyali | |
| 9,075,900 B2 | 7/2015 | Wilson et al. | |
| 9,129,215 B2 | 9/2015 | Shiffman et al. | |
| 9,398,858 B2 | 7/2016 | Phillips et al. | |
| 9,483,618 B2 | 11/2016 | Brincat et al. | |
| 9,881,062 B2 | 1/2018 | Shiffman et al. | |
| 9,977,583 B2 | 5/2018 | Calderwood et al. | |
| 10,025,910 B2 | 7/2018 | Paty et al. | |
| 10,049,368 B2 | 8/2018 | Hansen et al. | |
| 2005/0065815 A1 * | 3/2005 | Mazar | A61B 5/117 600/300 |
| 2007/0032733 A1 * | 2/2007 | Burton | A61B 5/02405 600/509 |
| 2007/0055481 A1 | 3/2007 | Baird et al. | |
| 2007/0252001 A1 | 11/2007 | Kail et al. | |
| 2008/0045806 A1 * | 2/2008 | Keppler | A61B 5/1172 600/300 |
| 2008/0200824 A1 | 8/2008 | Kane et al. | |
| 2009/0056708 A1 * | 3/2009 | Stenzler | A61M 11/005 128/200.14 |
| 2009/0143045 A1 * | 6/2009 | Graves | A61B 5/411 455/404.1 |
| 2009/0281829 A1 | 11/2009 | Hansen et al. | |
| 2010/0076275 A1 | 3/2010 | Chu et al. | |
| 2011/0092840 A1 * | 4/2011 | Forbes | A61B 7/003 600/538 |
| 2012/0130204 A1 | 5/2012 | Basta et al. | |
| 2012/0323590 A1 | 12/2012 | Udani | |
| 2012/0330175 A1 | 12/2012 | Phillips et al. | |
| 2013/0150727 A1 | 6/2013 | Phillips et al. | |
| 2013/0157244 A1 | 6/2013 | Eger et al. | |
| 2013/0159010 A1 | 6/2013 | Paty et al. | |
| 2013/0211265 A1 * | 8/2013 | Bedingham | G06F 19/3418 600/483 |
| 2013/0268287 A1 | 10/2013 | Hufford et al. | |
| 2013/0317379 A1 | 11/2013 | Brimer et al. | |
| 2014/0100470 A1 | 4/2014 | Perry | |
| 2014/0108032 A1 | 4/2014 | Hufford et al. | |
| 2014/0142403 A1 | 5/2014 | Brumback et al. | |
| 2014/0213925 A1 | 7/2014 | Chan et al. | |
| 2014/0247137 A1 * | 9/2014 | Proud | G06K 19/07762 340/870.01 |
| 2014/0316296 A1 | 10/2014 | Meng et al. | |
| 2015/0119743 A1 | 4/2015 | Maksym et al. | |
| 2015/0164373 A1 | 6/2015 | Davis et al. | |
| 2015/0164416 A1 * | 6/2015 | Nothacker | A61B 5/082 340/573.1 |
| 2015/0178473 A1 | 6/2015 | Hufford et al. | |
| 2015/0178474 A1 | 6/2015 | Hufford et al. | |
| 2015/0306486 A1 | 10/2015 | Logan et al. | |
| 2016/0015324 A1 | 1/2016 | Du Bois | |
| 2016/0034541 A1 | 2/2016 | Shiffman et al. | |
| 2016/0058325 A1 * | 3/2016 | Meng | A61B 5/7475 600/538 |
| 2016/0284058 A1 | 9/2016 | Calderwood et al. | |
| 2017/0007159 A1 * | 1/2017 | Dieffenderfer | A61B 5/087 |
| 2018/0150523 A1 | 5/2018 | Shiffman et al. | |

FOREIGN PATENT DOCUMENTS

| | | |
|---|---|---|
| CN | 104093356 A | 10/2014 |
| CN | 104207779 A | 12/2014 |
| CN | 104519795 A | 4/2015 |
| CN | 207912688 U | 9/2018 |
| CN | 109414219 A | 3/2019 |
| JP | S6399841 A | 5/1988 |
| JP | 2006514842 A | 5/2006 |
| JP | 2010512953 A | 4/2010 |
| JP | 2013509977 A | 3/2013 |
| JP | 2014504517 A | 2/2014 |
| WO | WO-9625877 A2 | 8/1996 |
| WO | WO-9748338 A1 | 12/1997 |
| WO | WO-03098177 A2 | 11/2003 |
| WO | WO-2004017831 A1 | 3/2004 |
| WO | WO-2004082161 A1 | 9/2004 |
| WO | 2006129516 A1 | 12/2006 |
| WO | 2008079323 A2 | 7/2008 |
| WO | WO-2009017820 A2 | 2/2009 |
| WO | WO-2011054117 A1 | 5/2011 |
| WO | WO-2012025097 A2 | 3/2012 |
| WO | WO-2013177300 A1 | 11/2013 |
| WO | WO-2012138663 A3 | 5/2014 |
| WO | WO-2014085682 A1 | 6/2014 |
| WO | 2015040548 A1 | 3/2015 |
| WO | WO-2017165761 A1 | 9/2017 |

OTHER PUBLICATIONS

Co-pending U.S. Appl. No. 15/604,368, filed May 24, 2017.
Co-pending U.S. Appl. No. 15/955,461, filed Apr. 17, 2018.
Office Action dated Jan. 17, 2018 for U.S. Appl. No. 13/688,962.
Office Action dated Sep. 5, 2017 for U.S. Appl. No. 14/579,574.
Office Action dated Sep. 8, 2017 for U.S. Appl. No. 14/670,261.
Office Action dated Nov. 29, 2017 for U.S. Appl. No. 14/579,670.
U.S. Appl. No. 12/434,244 Office Action dated Oct. 4, 2017.
U.S. Appl. No. 13/688,962 Office Action dated Apr. 13, 2018.
U.S. Appl. No. 14/579,574 Office Action dated Mar. 27, 2018.
U.S. Appl. No. 14/579,670 Office Action dated May 29, 2018.
Office Action dated Jan. 5, 2016 for U.S. Appl. No. 12/434,244.
Office Action dated Jan. 26, 2017 for U.S. Appl. No. 12/434,244.
Office Action dated Jan. 31, 2011 for U.S. Appl. No. 12/434,244.

(56) References Cited

OTHER PUBLICATIONS

Office Action dated Mar. 24, 2014 for U.S. Appl. No. 12/434,244.
Office Action dated Jun. 8, 2017 for U.S. Appl. No. 13/688,962.
Office Action dated Jun. 15, 2011 for U.S. Appl. No. 12/434,244.
Office action dated Jun. 28, 2017 for U.S. Appl. No. 13/801,853.
Office Action dated Jul. 21, 2015 for U.S. Appl. No. 12/434,244.
Office Action dated Jul. 28, 2016 for U.S. Appl. No. 12/434,244.
Office Action dated Dec. 1, 2014 for U.S. Appl. No. 12/434,244.
Office Action dated Jan. 22, 2015 for U.S. Appl. No. 13/838,698.
Office Action dated Feb. 8, 2016 for U.S. Appl. No. 13/838,698.
Office Action dated Jun. 24, 2015 for U.S. Appl. No. 13/838,698.
European Examination Report issue in corresponding European Patent Application No. 17771231.2 issued May 8, 2020.
Co-pending U.S. Appl. No. 16/007,633, filed Jun. 13, 2018.
Co-pending U.S. Appl. No. 16/020,109, filed Jun. 27, 2018.
U.S. Appl. No. 15/291,103 Office Action dated Oct. 5, 2018.
U.S. Appl. No. 15/955,461 Office Action dated Aug. 9, 2018.
Co-pending U.S. Appl. No. 11/002,046, filed Jan. 12, 2014.
Co-pending U.S. Appl. No. 15/291,103, filed Oct. 12, 2016.
EResearchTechnology GmbH. MasterScope ©: Diagnostic Platform for Centralized Spirometry, ECG and Home Monitoring. © 2014 eResearch Technology GmbH. Rev. 02, May 30, 2014. 4 pages.
EResearchTechnology GmbH. SpiroPro © CT: Handheld Spirometer and Pulse Oximeter. © 2014 eResearchTechnology GmbH. Rev. 01, Jul. 2014. 2 pages.
ERT ©. ERT Introduces Updated Diagnostic Platform for Centralized Spirometry, ECG, and Home Monitoring in Respiratory Clinical Trials. Web article. Jun. 16, 2014. 4 pages. URL:<https://www.ert.com/ert-introduces-updated-diagnostic-platform-for-centralized-spirometry-ecg-and-home-monitoring-in-respiratory-clinical-trials/>.
González, Jorge. Spirometer Demo with Freescale Microcontrollers. Document No. AN4325. © 2012 Freescale Semiconductor, Inc. Rev. 1, Dec. 2012. 36 pages.
International Search Report and Written Opinion dated Jun. 7, 2017 for International PCT Patent Application No. PCT/US2017/024007.
Johnston, Richard. Spirometer: AM3. Pft Guide. Apr. 28, 2014. 3 pages. URL:<http://www.pftforum.com/directory/2014/04/28/am3/>.
Medical Device Depot Inc. AstraTouch. Brochure. Accessed Mar. 16, 2017. 3 pages.
Office action dated Jan. 3, 1996 for U.S. Appl. No. 08/394,157.
Office action dated Jan. 4, 2012 for U.S. Appl. No. 12/177,540.
Office action dated Jan. 8, 2008 for U.S. Appl. No. 11/002,046.
Office action dated Jan. 25, 2016 for U.S. Appl. No. 14/792,126.
Office action dated Jan. 26, 2007 for U.S. Appl. No. 09/840,730.
Office action dated Jan. 29, 2009 for U.S. Appl. No. 09/840,730.
Office action dated Feb. 7, 2006 for U.S. Appl. No. 10/693,232.
Office Action dated Feb. 8, 2017 for U.S. Appl. No. 14/670,261.
Office action dated Feb. 9, 2006 for U.S. Appl. No. 09/825,533.
Office action dated Feb. 10, 1997 for U.S. Appl. No. 08/394,157.
Office action dated Feb. 19, 2010 for U.S. Appl. No. 11/844,632.
Office action dated Feb. 20, 2015 for U.S. Appl. No. 13/688,962.
Office action dated Mar. 9, 2012 for U.S. Appl. No. 12/509,318.
Office action dated Mar. 12, 2013 for U.S. Appl. No. 13/603,035.
Office action dated Mar. 13, 2012 for U.S. Appl. No. 12/965,719.
Office action dated Mar. 20, 2015 for U.S. Appl. No. 13/670,151.
Office action dated Apr. 3, 2009 for U.S. Appl. No. 09/825,533.
Office Action dated Apr. 4, 2017 for U.S. Appl. No. 14/792,126.
Office action dated Apr. 11, 2007 for U.S. Appl. No. 10/693,232.
Office action dated Apr. 19, 2006 for U.S. Appl. No. 11/002,046.
Office action dated Apr. 21, 2016 for U.S. Appl. No. 13/670,151.
Office action dated Apr. 29, 2010 for U.S. Appl. No. 09/825,533.
Office action dated May 2, 2000 for U.S. Appl. No. 09/447,986.
Office Action dated May 5, 2017 for U.S. Appl. No. 14/579,670.
Office action dated May 8, 2014 for U.S. Appl. No. 12/965,719.
Office action dated May 18, 1999 for U.S. Appl. No. 09/001,032.
Office action dated May 20, 2008 for U.S. Appl. No. 09/825,533.
Office action dated May 20, 2016 for U.S. Appl. No. 13/801,853.
Office Action dated May 22, 2017 for U.S. Appl. No. 13/670,151.
Office action dated May 26, 2015 for U.S. Appl. No. 13/801,853.
Office action dated Jun. 7, 2011 for U.S. Appl. No. 12/177,540.
Office action dated Jun. 8, 2000 for U.S. Appl. No. 09/447,986.
Office action dated Jun. 16, 2008 for U.S. Appl. No. 09/840,730.
Office action dated Jun. 18, 2007 for U.S. Appl. No. 11/002,046.
Office action dated Jun. 26, 2014 for U.S. Appl. No. 13/801,853.
Office action dated Jul. 2, 2014 for U.S. Appl. No. 13/670,151.
Office action dated Jul. 10, 1997 for U.S. Appl. No. 08/394,157.
Office action dated Jul. 12, 2005 for U.S. Appl. No. 11/002,046.
Office action dated Jul. 15, 2002 for U.S. Appl. No. 09/940,129.
Office action dated Jul. 17, 2007 for U.S. Appl. No. 09/840,730.
Office action dated Jul. 19, 2006 for U.S. Appl. No. 10/693,232.
Office action dated Aug. 31, 2016 for U.S. Appl. No. 13/670,151.
Office action dated Sep. 3, 2015 for U.S. Appl. No. 13/688,962.
Office action dated Sep. 8, 2006 for U.S. Appl. No. 09/825,533.
Office action dated Sep. 18, 2013 for U.S. Appl. No. 13/801,853.
Office Action dated Sep. 28, 2016 for U.S. Appl. No. 14/792,126.
Office action dated Sep. 29, 1998 for U.S. Appl. No. 09/001,032.
Office action dated Oct. 4, 2005 for U.S. Appl. No. 09/840,730.
Office action dated Oct. 4, 2011 for U.S. Appl. No. 12/965,719.
Office action dated Oct. 9, 2015 for U.S. Appl. No. 13/801,853.
Office action dated Oct. 11, 2012 for U.S. Appl. No. 12/965,719.
Office Action dated Oct. 13, 2016 for U.S. Appl. No. 14/579,670.
Office action dated Oct. 22, 2014 for U.S. Appl. No. 13/801,853.
Office action dated Nov. 14, 2007 for U.S. Appl. No. 11/324,504.
Office Action dated Nov. 16, 2016 for U.S. Appl. No. 13/688,962.
Office action dated Nov. 17, 2014 for U.S. Appl. No. 13/953,503.
Office action dated Nov. 22, 2013 for U.S. Appl. No. 13/801,853.
Office action dated Nov. 25, 2011 for U.S. Appl. No. 12/509,318.
Office action dated Nov. 26, 2010 for U.S. Appl. No. 09/825,533.
Office action dated Dec. 5, 2006 for U.S. Appl. No. 11/002,046.
Office action dated Dec. 19, 2002 for U.S. Appl. No. 09/940,129.
Office action dated Dec. 20, 2007 for U.S. Appl. No. 09/840,730.
Office action dated Dec. 30, 2010 for U.S. Appl. No. 12/177,540.
United States Patent and Trademark Office. Trademark Status & Document Retrieval (TSDR) search for mark "SpiroSphere". Generated Jul. 24, 2015. 10 pages.
Office Action (Notice of Reasons for Rejection) issued on Oct. 19, 2023, in corresponding Japanese Patent Application No. 2022-128783 and English translation of the Office Action. (16 pages).
Office Action (Notice of Reasons for Refusal) issued on Apr. 18, 2024, in corresponding Japanese Patent Application No. 2022-128783 and English translation of the Office Action. (7 pages).
Office Action issued on May 11, 2024, in corresponding Chinese Patent Application No. 202210980044.X. (12 pages).
Office Action/Search Report (Notification of the Second Office Action) issued on Dec. 27, 2024, in corresponding Chinese Patent Application No. 202210980044.X and English translation of the Office Action/Search Report. (26 pages).
Office Action/Search Report (Notification of the Third Office Action) issued on May 17, 2025, in corresponding Chinese Patent Application No. 202210980044.X and English translation of the Office Action/Search Report. (26 pages).
Wang et al., "Core Curriculum for Internal Medicine Physician Advancement (3rd Edition)", People's Military Medical Press, (Oct. 31, 2012), p. 84. (5 pages).
Zhang et al., "Diagnosis and Treatment Guidelines & Clinical Operational Procedures", Guangxi People's Publishing House, (Nov. 30, 2008), p. 606. (5 pages).
Office Action (Fourth Examination Opinion Notice) issued Aug. 18, 2025, by the State Intellectual Property Office of People's Republic of China in corresponding Chinese Patent Application No. 202210980044.X and an English machine translation of the Office Action. (12 pages).

\* cited by examiner

METHODS AND SYSTEMS FOR COLLECTING SPIROMETRY DATA

CROSS-REFERENCE

This application claims priority to U.S. provisional application No. 62/313,016, filed on Mar. 24, 2016; which is herein incorporated by reference in its entirety.

BACKGROUND

Spirometry tests can provide information about lung function, respiration, blood oxygenation and even cardiac function. Spirometry readings can be used by man. Individuals can use spirometers to monitor their personal health, medical professionals can use spirometers to diagnose a condition or assess the status of a patient's condition, and clinical trial professionals can use spirometers to assess the efficacy of a particular drug or to monitor the occurrence of specific condition amongst users of a specific demographic, genotype or other medically relevant classification. Provided herein are improved methods and systems for acquiring spirometry data.

SUMMARY

Provided herein are systems for assessing pulmonary function comprising: (a) a wireless detection unit that can comprise a tubular passage that can comprise a first opening and a second opening, a first opening being opposite from a second opening; and (b) a base station configured to communicate with a detection unit, where a base station can comprise an integrated biometric sensor, where an integrated biometric sensor can be a fingerprint sensor, where a base station can further comprise an ambient sensor and a docking cradle sized and adapted to store a detection unit. In some embodiments, a detection unit can further comprise a power source. In some embodiments, a power source can be a battery. In some embodiments, a battery can be a lithium ion battery pack. In some embodiments, a detection unit can further comprise a charging receiver coil. In some embodiments, a charging receiver coil can be a wireless charging receiver coil. In some embodiments, a detection unit can further comprise a gyroscope or an accelerometer. In some embodiments, a gyroscope or accelerometer can detect axial changes including orientation, rotation, and vibration. In some embodiments, a system can further comprise a mouthpiece. In some embodiments, a mouthpiece can comprise a tubular elongated body that can comprise a first end and a second end, a first end being opposite from a second end, a first end that can comprise an opening and being configured to permitting a subject to exhale air into a mouthpiece. In some embodiments, a second end can be disposed within a tubular passage of a detection unit. In some embodiments, a mouthpiece can comprise a sensor. In some embodiments, a sensor can be an alcohol sensor. In some embodiments, a sensor can be a flow sensor. In some embodiments, a flow sensor can be pre-calibrated. In some embodiments, a flow sensor can be a disposable flow sensor. In some embodiments, a flow sensor can be a pneumotach tube. In some embodiments, a pneumotach tube can be a lilly type pneumotach tube. In some embodiments, a detection unit or a base station can further comprise one or more indicator elements. In some embodiments, one or more indicator elements can comprise one or more audible source. In some embodiments, one or more indicator elements can comprise one or more light emitting diodes. In some embodiments, one or more light emitting diodes can direct a subject or a user. In some embodiments, the one or more light emitting diodes can direct the subject to inhale, hold air in lungs, or exhale. In some embodiments, a one or more light emitting diodes can direct a subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, a detection unit can transmit data to a base station over a network. In some embodiments, a detection unit can transmit data to a base station via a Bluetooth connection. In some embodiments, a network can be a wireless network. In some embodiments, a base station can communicate with a detection unit using Bluetooth, ZigBee, Infrared Transmission, or short-range wireless communications. In some embodiments, a base station can communicate with two or more detection units. In some embodiments, a detection unit and a base station can be separated by a distance. In some embodiments, a base station can further comprise a visual display. In some embodiments, a visual display can display spirometric data in real-time. In some embodiments, a visual display can comprise an animated icon indicating a validity of a data in real-time. In some embodiments, a visual display can display a user icon or a subject icon that provides feedback regarding a success of a data collected by a detection unit. In some embodiments, a base station can further comprise a power source. In some embodiments, a power source can be a battery. In some embodiments, a battery can be a lithium ion battery pack. In some embodiments, a base station can further comprise a charging transmitter coil. In some embodiments, a charging transmitter coil can be a wireless charging transmitter coil. In some embodiments, an ambient sensor can be a humidity sensor.

Also disclosed herein are systems for assessing pulmonary function comprising: (a) a wireless detection unit that can comprise a tubular passage that can comprise a first opening and a second opening, a first opening being opposite from a second opening, a detection unit that can further comprise a charging receiver coil; and (b) a base station configured to communicate with a detection unit, where a base station can comprise a surface that can comprise a touch visual display and a docking cradle, where a docking cradle can comprise a charging transmitter coil and can be sized and adapted to store a detection unit and to wirelessly charge the detection unit. In some embodiments, a detection unit can further comprise a power source. In some embodiments, a power source can be a battery. In some embodiments, a battery can be a lithium ion battery pack. In some embodiments, a charging receiver coil can be a wireless charging receiver coil. In some embodiments, a detection unit can further comprise a gyroscope or an accelerometer. In some embodiments, a gyroscope or accelerometer can detect axial changes including orientation, rotation, and vibration. In some embodiments, a system can further comprise a mouthpiece. In some embodiments, a mouthpiece can comprise a tubular elongated body that can comprise a first end and a second end, a first end being opposite from a second end, a first end that can comprise an opening and can be configured to permit a subject to exhale air into a mouthpiece. In some embodiments, a second end can be disposed within a tubular passage of a detection unit. In some embodiments, a mouthpiece can comprise a sensor. In some embodiments, a sensor can be an alcohol sensor. In some embodiments, a sensor can be a flow sensor. In some embodiments, a flow sensor can be pre-calibrated. In some embodiments, a flow sensor can be a disposable flow sensor. In some embodiments, a flow sensor can be a pneumotach tube. In some embodiments, a pneumotach tube can be a lilly type pneumotach tube. In some embodiments, a detection unit or a base station can further comprise one or more indicator elements. In some embodiments, one or more indicator elements can comprise one or more audible source. In some embodiments, one or more indicator elements can comprise one or more light emitting diodes. In some embodiments, a one or more light emitting diodes can direct a subject or a user. In some embodiments, one or more light emitting diodes can direct the subject to inhale, hold air in lungs, or exhale. In some embodiments, one or more light emitting diodes can direct a subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, a detection unit can transmit data to a base station over a network. In some embodiments, a detection unit can transmit data to a base station via a Bluetooth connection. In some embodiments, a network can be a wireless network. In some embodiments, a base station can communicate with a detection unit using Bluetooth, ZigBee, Infrared Transmission, or short-range wireless communications. In some embodiments, a base station can communicate with two or more detection units. In some embodiments, a detection unit and a base station can be separated by a distance. In some embodiments, a touch visual display can display spirometric data in real-time. In some embodiments, a touch visual display can comprise an animated icon indicating a validity of a data in real-time. In some embodiments, a touch visual display can display a user icon or a subject icon that provides feedback regarding a success of a data collected by a detection unit. In some embodiments, a base station can further comprise a power source. In some embodiments, a power source can be a battery. In some embodiments, a battery can be a lithium ion battery pack. In some embodiments, a charging transmitter coil can be a wireless charging transmitter coil. In some embodiments, a base station can further comprise a biometric sensor. In some embodiments, a biometric sensor can be a fingerprint sensor.

Also disclosed herein are systems for assessing pulmonary function comprising: (a) a wireless detection unit that can comprise a power source and a charging receiver coil, a detection unit that can comprise a tubular passage that can comprise a first opening and a second opening, a first opening being opposite from a second opening; and (b) a base station configured to communicate with a detection unit over a Bluetooth connection, where a base station can comprise an ambient sensor and an integrated biometric sensor, where an integrated biometric sensor can be a fingerprint sensor, where a fingerprint sensor can be located between a docking cradle and a touch visual display, where a docking cradle can comprise a charging transmitter coil and can be sized and adapted to store a detection unit and to wirelessly charge a detection unit. In some embodiments, a charging receiver coil can be a wireless charging receiver coil. In some embodiments, a detection unit can further comprise a gyroscope or an accelerometer. In some embodiments, a gyroscope or accelerometer can detect axial changes including orientation, rotation, and vibration. In some embodiments, a system can further comprise a mouthpiece. In some embodiments, a mouthpiece can comprise a tubular elongated body that can comprise a first end and a second end, a first end being opposite from a second end, a first end that can comprise an opening and being configured to permitting a subject to exhale air into a mouthpiece. In some embodiments, a second end can be disposed within a tubular passage of a detection unit. In some embodiments, a mouthpiece can comprise a sensor. In some embodiments, a sensor can be an alcohol sensor. In some embodiments, a sensor can be a flow sensor. In some embodiments, a flow sensor can be pre-calibrated. In some embodiments, a flow sensor can be a disposable flow sensor. In some embodiments, a flow sensor can be a pneumotach tube. In some embodiments, a pneumotach tube can be a lilly type pneumotach tube. In some embodiments, a detection unit or a base station can further comprise one or more indicator elements. In some embodiments, one or more indicator elements can comprise one or more audible source. In some embodiments, one or more indicator elements can comprise one or more light emitting diodes. In some embodiments, a one or more light emitting diodes can direct a subject or a user. In some embodiments, one or more light emitting diodes direct the subject to inhale, hold air in lungs, or exhale. In some embodiments, one or more light emitting diodes can direct a subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, a detection unit can transmit data to a base station over a network. In some embodiments, a network can be a wireless network. In some embodiments, a base station can communicate with a detection unit using ZigBee, Infrared Transmission, or short-range wireless communications. In some embodiments, a base station can communicate with two or more detection units. In some embodiments, a detection unit and a base station can be separated by a distance. In some embodiments, a touch visual display can display spirometric data in real-time. In some embodiments, a touch visual display can comprise an animated icon indicating a validity of a data in real-time. In some embodiments, a touch visual display can display a user icon or a subject icon that provides feedback regarding a success of a data collected by a detection unit. In some embodiments, a base station can further comprise a power source. In some embodiments, a power source can be a battery. In some embodiments, a battery can be a lithium ion battery pack. In some embodiments, a charging transmitter coil can be a wireless charging transmitter coil. In some embodiments, an ambient sensor can be a humidity sensor.

Also provided herein are methods for performing a pulmonary function test, the methods can comprise: a. providing to a subject a detection unit that can comprise a mouthpiece and a sensor; b. using a biometric data to identify a user of an application; c. receiving spirometric data transmitted from the detection unit at a base station; and d. monitoring the base station to determine test error. In some embodiments, the test error results from variations in subject effort. In some embodiments, the method can further comprise generating the spirometric data from a breath sample provided by the subject, where the spirometric data can be generated from the breath sample by the sensor. In some embodiments, the method can further comprise transmitting the spirometric data from the detection unit over a network. In some embodiments, the method can further comprise transmitting the spirometric data from the detection unit via a Bluetooth connection. In some embodiments, the base station can receives remote commands and configuration from a cloud. In some embodiments, the sensor can comprise a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator element can comprise one or more light emitting diode. In some embodiments, the one or more light emitting diode can direct the subject using the detection unit or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator elements can comprise one or more audible source. In some embodiments, the detection unit can further comprise a gyroscope or accelerometer. In some embodiments, the gyroscope or accelerometer can detect axial changes including orientation, rotation and vibration. In some embodiments, the base station can comprise an integrated biometric sensor. In some embodiments, the biometric sensor can be a fingerprint reader. In some embodiments, the biometric sensor can collect biometric data. In some embodiments, the biometric data can control access to an application. In some embodiments, the application can provide access to stored spirometric data. In some embodiments, the application can provide access to operate the detection unit. In some embodiments, the application identifies an individual authorized to use the base station. In some embodiments, the individual can be a clinician. In some embodiments, the base station can further comprise one or more indicator elements. In some embodiments, the indicator elements can comprise one or more light emitting diode. In some embodiments, the one or more light emitting diode can direct the subject or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can be charged on the base station. In some embodiments, the detection unit can be charged wirelessly. In some embodiments, the network is a wirelessly network. In some embodiments, the base station can communicate with the detection unit using Bluetooth, ZigBee, Infrared Transmission, or other short-range wireless communications. In some embodiments, the base station can communicate with two or more detection units. In some embodiments, the detection unit and the base station can be separated by a distance. In some embodiments, the base station can further transmit data to a database or server. In some embodiments, the database or server can be a cloud based database or server. In some embodiments, the spirometric data can be transmitted to one or more servers, databases, storage units including network attached storage units, volumes, or any combination thereof. In some embodiments, the base station can further transmit data via a wired connection. In some embodiments, the wired connection can be a USB or Ethernet connection. In some embodiments, the base station can further transmit data via a wireless connection. In some embodiments, the wireless connection can be Wi-Fi, 3G, 4G LTE, or Bluetooth connection. In some embodiments, the base station can further comprise a visual display. In some embodiments, the visual display can display spirometric data in real-time. In some embodiments, the visual display can display a user icon or a subject icon that provides feedback regarding the success of the data collected by the detection unit.

Also provided herein are methods for collecting spirometric data, the methods can comprise: a. collecting a biometric data from a user at a base station from an integrated biometric sensor; b. providing a subject with a detection unit that can comprise a mouthpiece and a sensor; c. receiving spirometric data transmitted from the detection unit, d. correlating a biometric data collected from the base station with spirometric data collected from the detection unit; and e. processing the collected spirometric data on the base station. In some embodiments, the method can further comprise generating the spirometric data from a breath sample provided by the subject, wherein the spirometric data can be generated from the breath sample by the sensor. In some embodiments, the method can further comprise transmitting the spirometric data from the detection unit over a network. In some embodiments, the method can further comprise transmitting the spirometric data from the detection unit via a Bluetooth connection. In some embodiments, the base station can receive remote commands and configuration from a cloud. In some embodiments, the sensor can comprise a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator element can comprise one or more light emitting diode. In some embodiments, the one or more light emitting diode can direct the subject using the detection unit or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can further comprise a gyroscope or accelerometer. In some embodiments, the gyroscope or accelerometer can detect axial changes including orientation, rotation and vibration. In some embodiments, the base station can further comprise one or more indicator elements. In some embodiments, the indicator element can comprise one or more light emitting diode. In some embodiments, the one or more light emitting diode can direct the subject or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can be charged on the base station. In some embodiments, the detection unit can be charged wirelessly. In some embodiments, the network is a wirelessly network. In some embodiments, the base station can communicate with the detection unit using Bluetooth, ZigBee, Infrared Transmission, or other short-range wireless communications. In some embodiments, the base station can communicate with two or more detection units. In some embodiments, the detection unit and the base station can be separated by a distance. In some embodiments, the base station can further transmit data to a database or server. In some embodiments, the database or server can be a cloud based database or server. In some embodiments, the spirometric data can be transmitted to one or more servers, databases, storage units including network attached storage units, volumes, or any combination thereof. In some embodiments, the base can station further transmits data via a wired connection. In some embodiments, the wired connection can be a USB or Ethernet connection. In some embodiments, the base station can further transmit data via a wireless connection. In some embodiments, the wireless connection can be Wi-Fi, 3G, 4G LTE, or Bluetooth connection. In some embodiments, the base station can further comprise a visual display. In some embodiments, the visual display displays spirometric data in real-time. In some embodiments, the visual display can display a user icon or a subject icon that provides feedback regarding the success of the data collected by the detection unit.

Also provided herein are methods for improving the quality of spirometric data, the methods can comprise: a. collecting a biometric data from a user at a base station from an integrated biometric sensor; b. providing a subject with a detection unit that can comprise a mouthpiece and a sensor; c. receiving spirometric data transmitted from the detection unit, where the base station can be configured to graphically display the spirometric data and indicate test error; and d. processing the received spirometric data on the base station. In some embodiments, the test error can be due to variability in subject effort. In some embodiments, the user and the subject can be the same individual. In some embodiments, the user and the subject may not be the same individual. In some embodiments, the method can further comprise generating the spirometric data from a breath sample provided by the subject, wherein the spirometric data can be generated from the breath sample by the sensor. In some embodiments, the method can further comprise transmitting the spirometric data from the detection unit over a network. In some embodiments, the method can further comprise transmitting the spirometric data from the detection unit via a Bluetooth connection. In some embodiments, the base station can receive remote commands and configuration from a cloud. In some embodiments, the sensor can comprise a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator element can comprise one or more light emitting diode. In some embodiments, the one or more light emitting diode can direct the subject using the detection unit or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can further comprise a gyroscope or accelerometer. In some embodiments, the gyroscope or accelerometer can detect axial changes including orientation, rotation and vibration. In some embodiments, the base station can further comprise one or more indicator elements. In some embodiments, the indicator element can comprise one or more light emitting diode. In some embodiments, the one or more light emitting diode can direct the subject or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can be charged on the base station. In some embodiments, the detection unit can be charged wirelessly. In some embodiments, the network can be a wirelessly network. In some embodiments, the base station can communicate with the detection unit using Bluetooth, ZigBee, Infrared Transmission, or other short-range wireless communications. In some embodiments, the base station can communicate with two or more detection units. In some embodiments, the detection unit and the base station can be separated by a distance. In some embodiments, the base station can further transmit data to a database or server. In some embodiments, the database or server can be a cloud based database or server. In some embodiments, the spirometric data can be transmitted to one or more servers, databases, storage units including network attached storage units, volumes, or any combination thereof. In some embodiments, the base station can further transmit data via a wired connection. In some embodiments, the wired connection can be a USB or Ethernet connection. In some embodiments, the base station can further transmit data via a wireless connection. In some embodiments, the wireless connection can be Wi-Fi (Wi-Fi), 3G, 4G LTE, or Bluetooth connection. In some embodiments, the base station can further comprise a visual display. In some embodiments, the visual display can display spirometric data in real-time. In some embodiments, the visual display can display a user icon or a subject icon that provides feedback regarding the success of the data collected by the detection unit.

Also provided herein are methods for manufacturing a system for collecting spirometric test results from a subject, the methods can comprise: a. constructing a detection unit that can comprise a sensor and a mouthpiece, where the detection unit can be configured to reduce testing error resulting from variations in subject effort; b. configuring wireless communication between the detection unit and a base station where the base station can comprise a visual display of spirometric data collected by the detection unit; and c. installing onto the base station an application for processing or transferring the collected spirometric data. In some embodiments, the base station can receive remote commands and configuration from a cloud. In some embodiments, the sensor can comprise a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator element can comprise one or more light emitting diode. In some embodiments, the one or more light emitting diode can direct the subject using the detection unit or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can further comprise a gyroscope or accelerometer. In some embodiments, the gyroscope or accelerometer can detect axial changes including orientation, rotation and vibration. In some embodiments, the base station can further comprise one or more indicator elements. In some embodiments, the indicator element can comprise one or more light emitting diode. In some embodiments, the one or more light emitting diode can direct the subject or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can be charged on the base station. In some embodiments, the detection unit can be charged wirelessly. In some embodiments, the base station can communicate with the detection unit using Bluetooth, ZigBee, Infrared Transmission, or other short-range wireless communications. In some embodiments, the base station can communicate with two or more detection units. In some embodiments, the base station can further transmit data to a database or server. In some embodiments, the database or server can be a cloud based database or server. In some embodiments, the spirometric data can be transmitted to one or more servers, databases, storage units including network attached storage units, volumes, or any combination thereof. In some embodiments, the base station can further transmit data via a wired connection. In some embodiments, the wired connection can be a USB or Ethernet connection. In some embodiments, the base station can further transmit data via a wireless connection. In some embodiments, the wireless connection can be Wi-Fi, 3G, 4G LTE, or Bluetooth connection.

Also provided herein are methods for manufacturing systems for reducing subject error in spirometric data from a subject, the methods can comprise: a. constructing a system that can comprise a detection unit and a base station; b. integrating a biometric sensor into the base station; and c. configuring the base station with one or more mechanisms for receiving spirometric data from the detection unit. In some embodiments, the base station can receive remote commands and configuration from a cloud. In some embodiments, the spirometric data can be transmitted from the detection unit over a network. In some embodiments, the method can further comprise transmitting the spirometric data from the detection unit via a Bluetooth connection. In some embodiments, the detection unit can comprise a sensor and a mouthpiece. In some embodiments, the sensor can comprise a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator elements can comprise one or more light emitting diode. In some embodiments, the one or more light emitting diode can direct the subject using the detection unit or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can further comprise a gyroscope or accelerometer. In some embodiments, the gyroscope or accelerometer can detect axial changes including orientation, rotation and vibration. In some embodiments, the biometric sensor can be a fingerprint reader. In some embodiments, the biometric sensor can collect biometric data. In some embodiments, the biometric data can control access to an application. In some embodiments, the application can provide access to stored spirometric data. In some embodiments, the application can provide access to operate the detection unit. In some embodiments, the application can identify an individual authorized to use the base station. In some embodiments, the individual can be a clinician. In some embodiments, the base station can further comprise one or more indicator elements. In some embodiments, the indicator element can comprise one or more light emitting diode. In some embodiments, the one or more light emitting diode can direct the subject or the user. In some embodiments, the method can further comprise directing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can be charged on the base station. In some embodiments, the detection unit can be charged wirelessly. In some embodiments, the network can be a wirelessly network. In some embodiments, the base station can communicate with the detection unit using Bluetooth, ZigBee, Infrared Transmission, or other short-range wireless communications. In some embodiments, the base station can communicate with two or more detection units. In some embodiments, the detection unit and the base station can be separated by a distance. In some embodiments, the base station can further transmit data to a database or server. In some embodiments, the database or server can be a cloud based database or server. In some embodiments, the spirometric data can be transmitted to one or more servers, databases, storage units including network attached storage units, volumes, or any combination thereof. In some embodiments, the base station can further transmit data via a wired connection. In some embodiments, the wired connection can be a USB or Ethernet connection. In some embodiments, the base station can further transmit data via a wireless connection. In some embodiments, the wireless connection can be Wi-Fi, 3G, 4G LTE, or Bluetooth connection. In some embodiments, the base station can further comprise a visual display. In some embodiments, the visual display can display spirometric data in real-time. In some embodiments, the visual display can display a user icon or a subject icon that can provide feedback regarding the success of the data collected by the detection unit.

Also provided herein are systems for testing pulmonary function that can comprise: a. a wireless detection unit that can comprise a sensor and a mouthpiece; b. a base station that can be configured to communicate with the detection unit, where the base station can comprise an integrated biometric sensor; and c. a docking cradle that can be configured to charge and store the detection unit. In some embodiments, the base station can receive remote commands and configuration from a cloud. In some embodiments, the sensor can be a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator element can comprise one or more light emitting diodes. In some embodiments, the one or more light emitting diodes direct a subject using the detection unit or a user. In some embodiments, the directing the subject can comprise informing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the base station can further comprise one or more indicator elements. In some embodiments, the indicator element can comprise one or more light emitting diodes. In some embodiments, the one or more light emitting diodes direct a subject or a user. In some embodiments, the directing the subject can comprise informing the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the detection unit can further comprise a gyroscope or an accelerometer. In some embodiments, the gyroscope or accelerometer can detect axial changes including orientation, rotation, and vibration. In some embodiments, the biometric sensor can comprise a fingerprint reader. In some embodiments, the detection unit can be charged wirelessly. In some embodiments, the detection unit transmits data to the base station over a network. In some embodiments, the detection unit transmits data to the base station via a Bluetooth connection. In some embodiments, the network can be a wireless network. In some embodiments, the base station can communicate with the detection unit using Bluetooth, ZigBee, Infrared Transmission, short-range wireless communications. In some embodiments, the base station can communicate with two or more detection units. In some embodiments, the detection unit and the base station can be separated by a distance. In some embodiments, the base station can further comprise a visual display. In some embodiments, the visual display can display spirometric data in real-time. In some embodiments, the visual display can comprise an animated icon indicating the validity of the data in real-time. In some embodiments, the visual display can display a user icon or a subject icon that can provide feedback regarding the success of the data collected by the detection unit.

Also disclosed herein are non-transient computer readable media suitable for use in electronic devices, the media can comprise instructions that when executed by the electronic device, can cause the electronic device to perform: a. providing to a subject a detection unit that can comprise a mouthpiece and a sensor; b. using a biometric data to control access to an application; c. receiving data transmitted from the detection unit at a base station; and d. transmitting data from the base station to an external server or database. In some embodiments, the database or server can be a cloud based database or server. In some embodiments, the computer readable medium can further comprise instructions that when executed by the electronic device, can cause the base station to transmit data via a wired connection. In some embodiments, the wired connection can be a USB or Ethernet connection. In some embodiments, the computer readable medium can further comprise instructions that when executed by the electronic device, can cause the base station to transmit data via a wireless connection. In some embodiments, the wireless connection can be Wi-Fi, 3G, 4G LTE, or Bluetooth connection. In some embodiments, the computer readable medium can further comprise instructions that when executed by the electronic device, can cause the base station to received remote commands and configuration from a cloud. In some embodiments, the computer readable medium can further comprise instructions that when executed by the electronic device, can cause the data to be generated from a breath sample provided by a subject, wherein the data can be generated from the breath sample by the sensor. In some embodiments, the computer readable medium can further comprise instructions that when executed by the electronic device, can cause the detection unit to transmit the data via a Bluetooth connection. In some embodiments, the computer readable medium can further comprise instructions that when executed by the electronic device, can cause the detection unit to transmit the data over a network. In some embodiments, the sensor can be a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator element can comprise one or more light emitting diode. In some embodiments, the computer readable medium can further comprise instructions that when executed by the electronic device, can cause the one or more light emitting diode to direct the subject using the detection unit or the user. In some embodiments, the computer readable medium can further comprise instructions that when executed by the electronic device, can cause the detection unit to inform the subject to inhale, hold air in lungs, or exhale. In some embodiments, the computer readable medium can further comprise instructions that when executed by the electronic device, can cause the detection unit to direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the base station can further comprise one or more indicator elements. In some embodiments, the indicator element can comprise one or more light emitting diode. In some embodiments, the computer readable medium can further comprise instructions that when executed by the electronic device, can cause the one or more light emitting diode to direct the subject or the user. In some embodiments, the computer readable medium can further comprise instructions that when executed by the electronic device, can cause the base station to inform the subject to inhale, hold air in lungs, or exhale. In some embodiments, the computer readable medium can further comprise instructions that when executed by the electronic device, can cause the base station to direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more light emitting diode. In some embodiments, the detection unit can further comprise a gyroscope or an accelerometer. In some embodiments, the computer readable medium can further comprise instructions that when executed by the electronic device, can cause the gyroscope or accelerometer to detect axial changes including orientation, rotation and vibration. In some embodiments, the biometric sensor can be a fingerprint reader. In some embodiments, the computer readable medium can further comprise instructions that when executed by the electronic device, can cause the biometric sensor to collect the biometric data. In some embodiments, the computer readable medium can further comprise instructions that when executed by the electronic device, can cause the biometric data to control access to an application. In some embodiments, the computer readable medium can further comprise instructions that when executed by the electronic device, can cause the electronic device to correlate the biometric data with the spirometric data. In some embodiments, the computer readable medium can further comprise instructions that when executed by the electronic device, can cause the application to provide access to spirometric data stored on the base station. In some embodiments, the computer readable medium can further comprise instructions that when executed by the electronic device, can cause the application to provide access to operate the detection unit. In some embodiments, the computer readable medium can further comprise instructions that when executed by the electronic device, can cause the application to identify an individual authorized to use the base station. In some embodiments, the individual can be a clinician. In some embodiments, the computer readable medium can further comprise instructions that when executed by the electronic device, can cause the detection unit to charge on the base station. In some embodiments, the computer readable medium can further comprise instructions that when executed by the electronic device, can cause the detection unit to charge wirelessly. In some embodiments, the network can be a wireless network. In some embodiments, the computer readable medium can further comprise instructions that when executed by the electronic device, can cause the base station to communicate with the detection unit using Bluetooth, ZigBee, Infrared Transmission, or other short-range wireless communications. In some embodiments, the computer readable medium can further comprise instructions that when executed by the electronic device, can cause the base station to communicate with two or more detection units. In some embodiments, the detection unit and the base station can be separated by a distance. In some embodiments, the computer readable medium can further comprise instructions that when executed by the electronic device, can cause the base station to transmit data to a database or server. In some embodiments, the database or server can be a cloud based database or server. In some embodiments, the computer readable medium can further comprise instructions that when executed by the electronic device, can cause the base station to transmit data to the database or server via a wired connection. In some embodiments, the wired connection can be a USB or Ethernet connection. In some embodiments, the computer readable medium can further comprise instructions that when executed by the electronic device, can cause the base station to transmit data to the database or server via a wireless connection. In some embodiments, the wireless connection can be Wi-Fi, 3G, 4G LTE, or Bluetooth connection. In some embodiments, the base station can further comprise a visual display. In some embodiments, the computer readable medium can further comprise instructions that when executed by the electronic device, can cause the visual display to display spirometric data in real-time. In some embodiments, the computer readable medium can further comprise instructions that when executed by the electronic device, can cause the visual display to display an animated icon indicating the validity of the data in real-time. In some embodiments, the computer readable medium can further comprise instructions that when executed by the electronic device, can cause the visual display to display a user icon or a subject icon that can provide feedback regarding the success of the spirometric data collected by the detection unit.

Also provided herein are non-transient computer readable media suitable for use in electronic devices, the medium can comprise instructions that when executed by the electronic device, can cause the electronic device to perform: a. collecting a biometric data from a user at a base station that can comprise an integrated biometric sensor; b. receiving data transmitted from a detection unit, where the detection unit can comprise a mouthpiece and a sensor; c. correlating the biometric data collected from the base station with data collected from the detection unit; and d. processing collected data on the base station. In some embodiments, the computer readable medium can further comprise instructions that when executed by the electronic device, can cause the data to be generated from a breath sample provided by a subject, wherein the data can be generated from the breath sample by the sensor. In some embodiments, the computer readable medium can further comprise instructions that when executed by the electronic device, can cause the detection unit to transmit the data via a Bluetooth connection. In some embodiments, the computer readable medium can further comprise instructions that when executed by the electronic device, can cause the detection unit to transmit the data over a network. In some embodiments, the sensor can be a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator element can comprise one or more light emitting diode. In some embodiments, the computer readable medium can further comprise instructions that when executed by the electronic device, can cause the one or more light emitting diode to direct the subject using the detection unit or the user. In some embodiments, the computer readable medium can further comprise instructions that when executed by the electronic device, can cause the detection unit to inform the subject to inhale, hold air in lungs, or exhale. In some embodiments, the computer readable medium can further comprise instructions that when executed by the electronic device, can cause the detection unit to direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the base station can further comprise one or more indicator elements. In some embodiments, the indicator element can comprise one or more light emitting diode. In some embodiments, the computer readable medium can further comprise instructions that when executed by the electronic device, can cause the one or more light emitting diode to direct the subject or the user. In some embodiments, the computer readable medium can further comprise instructions that when executed by the electronic device, can cause the base station to inform the subject to inhale, hold air in lungs, or exhale. In some embodiments, the computer readable medium can further comprise instructions that when executed by the electronic device, can cause the base station to direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more light emitting diode. In some embodiments, the detection unit can further comprise a gyroscope or an accelerometer. In some embodiments, the computer readable medium can further comprise instructions that when executed by the electronic device, can cause the gyroscope or accelerometer to detect axial changes including orientation, rotation and vibration. In some embodiments, the biometric sensor can be a fingerprint reader. In some embodiments, the computer readable medium can further comprise instructions that when executed by the electronic device, can cause the biometric sensor to collect the biometric data. In some embodiments, the computer readable medium can further comprise instructions that when executed by the electronic device, can cause the biometric data to control access to an application. In some embodiments, the computer readable medium can further comprise instructions that when executed by the electronic device, can cause the electronic device to correlate the biometric data with the spirometric data. In some embodiments, the computer readable medium can further comprise instructions that when executed by the electronic device, can cause the application to provide access to spirometric data stored on the base station. In some embodiments, the computer readable medium can further comprise instructions that when executed by the electronic device, can cause the application to provide access to operate the detection unit. In some embodiments, the computer readable medium can further comprise instructions that when executed by the electronic device, can cause the application to identify an individual authorized to use the base station. In some embodiments, the individual can be a clinician. In some embodiments, the computer readable medium can further comprise instructions that when executed by the electronic device, can cause the detection unit to charge on the base station. In some embodiments, the computer readable medium can further comprise instructions that when executed by the electronic device, can cause the detection unit to charge wirelessly. In some embodiments, the network can be a wireless network. In some embodiments, the computer readable medium can further comprise instructions that when executed by the electronic device, can cause the base station to communicate with the detection unit using Bluetooth, ZigBee, Infrared Transmission, or other short-range wireless communications. In some embodiments, the computer readable medium can further comprise instructions that when executed by the electronic device, can cause the base station to communicate with two or more detection units. In some embodiments, the detection unit and the base station can be separated by a distance. In some embodiments, the computer readable medium can further comprise instructions that when executed by the electronic device, can cause the base station to transmit data to a database or server. In some embodiments, the database or server can be a cloud based database or server. In some embodiments, the computer readable medium can further comprise instructions that when executed by the electronic device, can cause the base station to transmit data to the database or server via a wired connection. In some embodiments, the wired connection can be a USB or Ethernet connection. In some embodiments, the computer readable medium can further comprise instructions that when executed by the electronic device, can cause the base station to transmit data to the database or server via a wireless connection. In some embodiments, the wireless connection can be Wi-Fi, 3G, 4G LTE, or Bluetooth connection. In some embodiments, the base station can further comprise a visual display. In some embodiments, the computer readable medium can further comprise instructions that when executed by the electronic device, can cause the visual display to display spirometric data in real-time. In some embodiments, the computer readable medium can further comprise instructions that when executed by the electronic device, can cause the visual display to display an animated icon indicating the validity of the data in real-time. In some embodiments, the computer readable medium can further comprise instructions that when executed by the electronic device, can cause the visual display to display a user icon or a subject icon that can provide feedback regarding the success of the spirometric data collected by the detection unit.

Also provided herein are non-transient computer readable media suitable for use in electronic devices, the media can comprise instructions that when executed by the electronic device, can cause the electronic device to perform: a. collecting biometric data from a user at a base station that can comprise an integrated biometric sensor; b. receiving data transmitted from a detection unit that can comprise a mouthpiece and a sensor, where the detection unit can comprise a mouthpiece and a sensor, and the base station can be configured to indicate whether the biometric data can be valid; and c. processing the received data on the base station. In some embodiments, the computer readable medium can further comprise instructions that when executed by the electronic device, can cause the data to be generated from a breath sample provided by a subject, wherein the data can be generated from the breath sample by the sensor. In some embodiments, the computer readable medium can further comprise instructions that when executed by the electronic device, can cause the detection unit to transmit the data via a Bluetooth connection. In some embodiments, the computer readable medium can further comprise instructions that when executed by the electronic device, can cause the detection unit to transmit the data over a network. In some embodiments, the sensor can be a flow sensor. In some embodiments, the flow sensor can be pre-calibrated. In some embodiments, the flow sensor can be a disposable flow sensor. In some embodiments, the flow sensor can be a pneumotach tube. In some embodiments, the pneumotach tube can be a lilly type pneumotach tube. In some embodiments, the detection unit can further comprise one or more indicator elements. In some embodiments, the indicator element can comprise one or more light emitting diode. In some embodiments, the computer readable medium can further comprise instructions that when executed by the electronic device, can cause the one or more light emitting diode to direct the subject using the detection unit or the user. In some embodiments, the computer readable medium can further comprise instructions that when executed by the electronic device, can cause the detection unit to inform the subject to inhale, hold air in lungs, or exhale. In some embodiments, the computer readable medium can further comprise instructions that when executed by the electronic device, can cause the detection unit to direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more audible source. In some embodiments, the base station can further comprise one or more indicator elements. In some embodiments, the indicator element can comprise one or more light emitting diode. In some embodiments, the computer readable medium can further comprise instructions that when executed by the electronic device, can cause the one or more light emitting diode to direct the subject or the user. In some embodiments, the computer readable medium can further comprise instructions that when executed by the electronic device, can cause the base station to inform the subject to inhale, hold air in lungs, or exhale. In some embodiments, the computer readable medium can further comprise instructions that when executed by the electronic device, can cause the base station to direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the indicator element can comprise one or more light emitting diode. In some embodiments, the detection unit can further comprise a gyroscope or an accelerometer. In some embodiments, the computer readable medium can further comprise instructions that when executed by the electronic device, can cause the gyroscope or accelerometer to detect axial changes including orientation, rotation and vibration. In some embodiments, the biometric sensor can be a fingerprint reader. In some embodiments, the computer readable medium can further comprise instructions that when executed by the electronic device, can cause the biometric sensor to collect the biometric data. In some embodiments, the computer readable medium can further comprise instructions that when executed by the electronic device, can cause the biometric data to control access to an application. In some embodiments, the computer readable medium can further comprise instructions that when executed by the electronic device, can cause the electronic device to correlate the biometric data with the spirometric data. In some embodiments, the computer readable medium can further comprise instructions that when executed by the electronic device, can cause the application to provide access to spirometric data stored on the base station. In some embodiments, the computer readable medium can further comprise instructions that when executed by the electronic device, can cause the application to provide access to operate the detection unit. In some embodiments, the computer readable medium can further comprise instructions that when executed by the electronic device, can cause the application to identify an individual authorized to use the base station. In some embodiments, the individual can be a clinician. In some embodiments, the computer readable medium can further comprise instructions that when executed by the electronic device, can cause the detection unit to charge on the base station. In some embodiments, the computer readable medium can further comprise instructions that when executed by the electronic device, can cause the detection unit to charge wirelessly. In some embodiments, the network can be a wireless network. In some embodiments, the computer readable medium can further comprise instructions that when executed by the electronic device, can cause the base station to communicate with the detection unit using Bluetooth, ZigBee, Infrared Transmission, or other short-range wireless communications. In some embodiments, the computer readable medium can further comprise instructions that when executed by the electronic device, can cause the base station to communicate with two or more detection units. In some embodiments, the detection unit and the base station can be separated by a distance. In some embodiments, the computer readable medium can further comprise instructions that when executed by the electronic device, can cause the base station to transmit data to a database or server. In some embodiments, the database or server can be a cloud based database or server. In some embodiments, the computer readable medium can further comprise instructions that when executed by the electronic device, can cause the base station to transmit data to the database or server via a wired connection. In some embodiments, the wired connection can be a USB or Ethernet connection. In some embodiments, the computer readable medium can further comprise instructions that when executed by the electronic device, can cause the base station to transmit data to the database or server via a wireless connection. In some embodiments, the wireless connection can be Wi-Fi, 3G, 4G LTE, or Bluetooth connection. In some embodiments, the base station can further comprise a visual display. In some embodiments, the computer readable medium can further comprise instructions that when executed by the electronic device, can cause the visual display to display spirometric data in real-time. In some embodiments, the computer readable medium can further comprise instructions that when executed by the electronic device, can cause the visual display to display an animated icon indicating the validity of the data in real-time. In some embodiments, the computer readable medium can further comprise instructions that when executed by the electronic device, can cause the visual display to display a user icon or a subject icon that can provide feedback regarding the success of the spirometric data collected by the detection unit.

Provided herein is a system for assessing pulmonary function comprising a wireless detection unit comprising a tubular passage comprising a first opening and a second opening, the first opening being opposite from the second opening; a mouthpiece comprising a tubular elongated body comprising a first end and a second end, the first end being opposite from the second end, the first end comprising an opening and being configured to permit a subject to exhale air into the mouthpiece, and the second end disposed within the tubular passage of the detection unit; and a base station configured to communicate with the detection unit, wherein the base station comprises an integrated biometric sensor, wherein the integrated biometric sensor is a fingerprint sensor, wherein the base station further comprises an ambient sensor and a docking cradle sized and adapted to store the detection unit. In some embodiments the detection unit further comprises a power source. In some embodiments, the power source is a battery. In some embodiments, the battery is a lithium ion battery pack. In some embodiments, the detection unit further comprises a charging receiver coil. In some embodiments, the charging receiver coil is a wireless charging receiver coil. In some embodiments, the detection unit further comprises a gyroscope or an accelerometer. In some embodiments, the gyroscope or accelerometer detects axial changes including orientation, rotation, and vibration. In some embodiments, the mouthpiece comprises a sensor. In some embodiments, the sensor is an alcohol sensor. In some embodiments, the sensor is a flow sensor. In some embodiments, the flow sensor is pre-calibrated. In some embodiments, the flow sensor is a disposable flow sensor. In some embodiments, the flow sensor is a pneumotach tube. In some embodiments, the pneumotach tube is a lilly type pneumotach tube. In some embodiments, the detection unit or the base station further comprises one or more indicator elements. In some embodiments, the one or more indicator elements comprise one or more audible source. In some embodiments, the one or more indicator elements comprise one or more light emitting diodes. In some embodiments, the one or more light emitting diodes direct a subject or a user. In some embodiments, the one or more light emitting diodes direct the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the detection unit transmits data to the base station over a network. In some embodiments, the detection unit transmits data to the base station via a Bluetooth connection. In some embodiments, the network is a wireless network. In some embodiments, the base station communicates with the detection unit using Bluetooth, ZigBee, Infrared Transmission, or short-range wireless communications. In some embodiments, the base station communicates with two or more detection units.

In some embodiments, the detection unit and the base station are separated by a distance. In some embodiments, the base station further comprises a visual display. In some embodiments, the visual display displays spirometric data in real-time. In some embodiments, the visual display comprises an animated icon indicating the validity of the data in real-time. In some embodiments, the visual display displays a user icon or a subject icon that provides feedback regarding the success of the data collected by the detection unit. In some embodiments, the base station further comprises a power source. In some embodiments, the power source is a battery. In some embodiments, the battery is a lithium ion battery pack. In some embodiments, the base station further comprises a charging transmitter coil. In some embodiments, the charging transmitter coil is a wireless charging transmitter coil. In some embodiments, the ambient sensor is a humidity sensor.

Provided herein is a system for assessing pulmonary function comprising: a wireless detection unit comprising a tubular passage comprising a first opening and a second opening, the first opening being opposite from the second opening, the detection unit further comprising a charging receiver coil; a mouthpiece comprising an elongated tubular body comprising a first end and a second end, the first end being opposite from the second end, the first end comprising an opening and being configured to permit a subject to exhale air into the mouthpiece, and the second end disposed within the tubular passage of the detection unit; and a base station configured to communicate with the detection unit, wherein the base station comprises a touch visual display and a docking cradle, wherein the docking cradle comprises a charging transmitter coil and is sized and adapted to store the detection unit and to wirelessly charge the detection unit. In some embodiments, the detection unit further comprises a power source. In some embodiments, the power source is a battery. In some embodiments, the battery is a lithium ion battery pack. In some embodiments, the charging receiver coil is a wireless charging receiver coil. In some embodiments, the detection unit further comprises a gyroscope or an accelerometer. In some embodiments, the gyroscope or accelerometer detects axial changes including orientation, rotation, and vibration. In some embodiments, the mouthpiece comprises a sensor. In some embodiments, the sensor is an alcohol sensor. In some embodiments, the sensor is a flow sensor. In some embodiments, the flow sensor is pre-calibrated. In some embodiments, the flow sensor is a disposable flow sensor. In some embodiments, the flow sensor is a pneumotach tube. In some embodiments, the pneumotach tube is a lilly type pneumotach tube. In some embodiments, the detection unit or the base station further comprises one or more indicator elements. In some embodiments, the one or more indicator elements comprise one or more audible source. In some embodiments, the one or more indicator elements comprise one or more light emitting diodes. In some embodiments, the one or more light emitting diodes direct a subject or a user. In some embodiments, the one or more light emitting diodes direct the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the detection unit transmits data to the base station over a network. In some embodiments, the detection unit transmits data to the base station via a Bluetooth connection. In some embodiments, the network is a wireless network. In some embodiments, the base station communicates with the detection unit using Bluetooth, ZigBee, Infrared Transmission, or short-range wireless communications. In some embodiments, the base station communicates with two or more detection units. In some embodiments, the detection unit and the base station are separated by a distance. In some embodiments, the touch visual display displays spirometric data in real-time. In some embodiments, the touch visual display comprises an animated icon indicating the validity of the data in real-time. In some embodiments, the touch visual display displays a user icon or a subject icon that provides feedback regarding the success of the data collected by the detection unit. In some embodiments, the base station further comprises a power source. In some embodiments, the power source is a battery. In some embodiments, the battery is a lithium ion battery pack. In some embodiments, the charging transmitter coil is a wireless charging transmitter coil. In some embodiments, base station further comprises a biometric sensor. In some embodiments, the biometric sensor is a fingerprint sensor.

Provided herein is a system for assessing pulmonary function comprising: a wireless detection unit comprising a power source and a charging receiver coil, the detection unit comprising a tubular passage comprising a first opening and a second opening, the first opening being opposite from the second opening; a mouthpiece comprising an elongated tubular body comprising a first end and a second end, the first end being opposite from the second end, the first end comprising an opening and being configured to permit a subject to exhale air into the mouthpiece, and the second end disposed within the tubular passage of the detection unit; and a base station configured to communicate with the detection unit over a Bluetooth connection, wherein the base station comprises an ambient sensor and an integrated biometric sensor, wherein the integrated biometric sensor is a fingerprint sensor, wherein the fingerprint sensor is located between a docking cradle and a touch visual display, wherein the docking cradle comprises a charging transmitter coil and is sized and adapted to store the detection unit and to wirelessly charge the detection unit. In some embodiments, the charging receiver coil is a wireless charging receiver coil. In some embodiments, the detection unit further comprises a gyroscope or an accelerometer. In some embodiments, the gyroscope or accelerometer detects axial changes including orientation, rotation, and vibration. In some embodiments, the mouthpiece comprises a sensor. In some embodiments, the sensor is an alcohol sensor. In some embodiments, the sensor is a flow sensor. In some embodiments, the flow sensor is pre-calibrated. In some embodiments, the flow sensor is a disposable flow sensor. In some embodiments, the flow sensor is a pneumotach tube. In some embodiments, the pneumotach tube is a lilly type pneumotach tube. In some embodiments, the detection unit or the base station further comprises one or more indicator elements. In some embodiments, the one or more indicator elements comprise one or more audible source. In some embodiments, the one or more indicator elements comprise one or more light emitting diodes. In some embodiments, the one or more light emitting diodes direct a subject or a user. In some embodiments, the one or more light emitting diodes direct the subject to inhale, hold air in lungs, or exhale. In some embodiments, the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds. In some embodiments, the detection unit transmits data to the base station over a network. In some embodiments, the network is a wireless network. In some embodiments, the base station communicates with the detection unit using ZigBee, Infrared Transmission, or short-range wireless communications. In some embodiments, the base station communicates with two or more detection units. In some embodiments, the detection unit and the base station are separated by a distance. In some embodiments, the touch visual display displays spirometric data in real-time. In some embodiments, the touch visual display comprises an animated icon indicating the validity of the data in real-time. In some embodiments, the touch visual display displays a user icon or a subject icon that provides feedback regarding the success of the data collected by the detection unit. In some embodiments, the base station further comprises a power source. In some embodiments, the power source is a battery. In some embodiments, the battery is a lithium ion battery pack. In some embodiments, the charging transmitter coil is a wireless charging transmitter coil. In some embodiments, the ambient sensor is a humidity sensor.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of exemplary embodiments are set forth with particularity in the appended claims. A better understanding of the features and advantages will be obtained by reference to the following detailed description that sets forth illustrative embodiments, in which the principles of exemplary embodiments are utilized, and the accompanying drawings of which:

DETAILED DESCRIPTION

Figure 1:
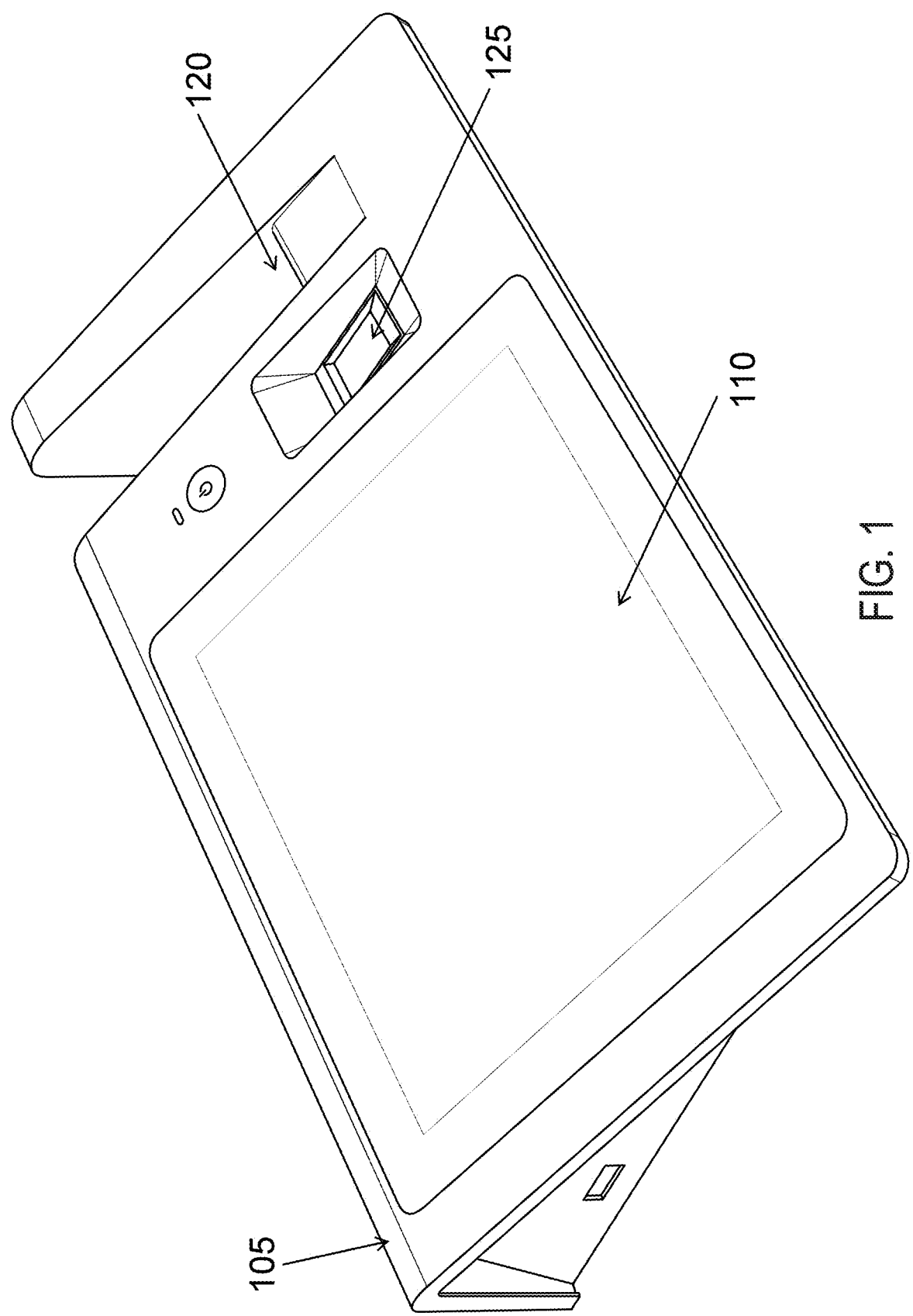
FIG. 1 illustrates a base station comprising a fingerprint sensor, docking cradle and a visual display

Several aspects are described below with reference to example applications for illustration. It should be understood that numerous specific details, relationships, and methods are set forth to provide a full understanding of the features described herein. One having ordinary skill in the relevant art, however, will readily recognize that the features described herein may be practiced without one or more of the specific details or with other methods. The features described herein are not limited by the illustrated ordering of acts or events, as some acts can occur in different orders and/or concurrently with other acts or events. Furthermore, not all illustrated acts or events are required to implement a methodology in accordance with the features described herein.

The terminology used herein is for the purpose of describing particular cases only and is not intended to be limiting. As used herein, the singular forms "a", "an" and "the" can include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising".

The term "about" or "approximately" can mean a range of +/−10% of a given value.

The term "user" as used herein can refer to an individual that conducts the test. The term "subject" as used herein can refer to an individual that the spirometry test is being performed on. In some cases, a "user" or a "subject" can be a patient. In some cases, the terms "subject", "user", and "patient" can refer to a same individual. In further embodiments, the terms "subject", "user", and "patient" can refer to different individuals. In some embodiments, a subject, a user, or a patient can be in the same room. In some instances, a subject, a user, or a patient can be in different rooms, cities, or countries. In some instances, a user, subject, or patient can be a mammal. In some cases, a subject, a user, or a patient can be a human age 0 to 135 years of age. In some cases, a subject, a user, or a patient can be a male. In some cases, a subject, a user, or a patient can be a female. In some cases, a subject, a user, or a patient can be an individual capable of understanding instructions. In some cases, a subject, a user, or a patient can an individual able to read.

In some cases, a user can be an individual trained to operate a spirometer. A user can be an individual with knowledge of medical technology. In some cases, a user can be an individual able to install software on, prepare, and/or maintain a spirometer. In some cases, a user can be an individual able to perform measurements using a spirometer. In some cases, a user can be a healthcare provider. In some cases, a healthcare provider can be a professional employed at a clinics or hospital such as a physician, nurse, or technician. In some cases, a user can be a non-healthcare provider such as an information technology specialist.

Overview

Provided herein are methods for performing a pulmonary function test. In some embodiments, the methods can comprise providing to a subject a detection unit that can comprise a mouthpiece and a sensor, using a biometric data to identify the user of an application, receiving spirometric data transmitted from the detection unit at a base station, and monitoring the base station to determine test error.

Also provided herein are methods for collecting pulmonary function data. The methods can comprise collecting biometric data from a user at a base station, providing a subject with a detection unit that can comprise a mouthpiece and a sensor, receiving spirometric data transmitted from the detection unit, correlating a biometric data collected from the base station with spirometric data collected from the detection unit, and processing collected data on the base station.

Also provided herein are methods for improving the quality of spirometric data. The methods can comprise collecting biometric data from a user at a base station; providing a subject with a detection unit that can comprise a mouthpiece and a sensor, receiving spirometric data transmitted from the detection unit, where the base station can be configured to graphically display the spirometric data and indicate test error, and processing the received spirometric data on the base station.

Also provided herein are methods for monitoring pulmonary function data. The methods can comprise generating spirometric data by providing a breath sample to a detection unit that can comprise a mouthpiece and a sensor, where the detection unit can be configured to be calibration free, and transmitting the spirometric data in real-time from the detection unit to a remote base station.

Also provided herein are methods for manufacturing a system for collecting spirometric test results. The methods can comprise constructing a detection unit that can comprise a sensor and a mouthpiece, where the detection unit can be configured to reduce testing error resulting from variations in user effort, configuring wireless communication between the detection unit and a base station wherein the base station can comprise a visual display of spirometric data collected by the detection unit, and installing onto the base station an application for processing or transferring the collected spirometric data.

Also provided herein are methods for manufacturing a system for reducing user error in spirometric data. The methods can comprise constructing a system that can comprise a detection unit and a base station, integrating a biometric sensor into the base station, and configuring the base station with one or more mechanisms for receiving spirometric data from the detection unit.

Also provided herein are systems for testing pulmonary function. The systems can comprise a wireless detection unit that can comprise a sensor and a mouthpiece, a base station that can be configured to communicate with the detection unit, where the base station can comprise an integrated biometric sensor, and a docking cradle that can be configured to charge and store the detection unit.

Also provided herein are non-transient computer readable media suitable for use in an electronic device. The media can comprise instructions that when executed by the electronic device can cause the electronic device to perform using biometric data to control access to an application, receiving spirometric data transmitted from the detection unit at a base station, and transmitting spirometric data from the base station to an external server or database.

Also provided herein are non-transient computer readable media suitable for use in an electronic device. The media can comprise instructions that when executed by the electronic device, can cause the electronic device to perform collecting a biometric data from a user at a base station, receiving spirometric data transmitted from a detection unit, where the detection unit can comprise a mouthpiece and a sensor, correlating the biometric data collected from the base station with spirometric data collected from the detection unit, and processing collected data on the base station.

Also provided herein are non-transient computer readable media suitable for use in an electronic device, the medium can comprise instructions that when executed by the electronic device, can cause the electronic device to perform: collecting biometric data from a user at a base station; receiving spirometric data transmitted from a detection unit that can comprise a mouthpiece and a sensor, where the detection unit can comprise a mouthpiece and a sensor, and the base station can be configured to indicate whether the biometric data is valid; and processing the received spirometric data on the base station.

In some embodiments, provided herein is a spirometer. In some embodiments, a spirometer can comprise a base station and a detection unit. In some embodiments, a detection unit can comprise a mouthpiece. In some embodiments, a detection unit can comprise a flow sensor. In some embodiments, a flow sensor can be pre-calibrated. In some embodiments, a flow sensor can be disposable. In some embodiments, a flow sensor can be a pneumotach sensor. In some embodiments, a detection unit can comprise one or more indicator element. In some embodiments, the indicator element can be a light emitting diode. In some embodiments, a detection unit can be configured remotely. In some embodiments, a detection unit can be configured via the cloud. In some embodiments, a detection unit can transmit spirometric data to a database or server. In some embodiments, a database or server can be a cloud server or database. In some embodiments, a detection unit can transmit data wirelessly. In some embodiments, a base station and a detection unit can be in wireless communication. In some embodiments, a detection unit can transmit data to a base station via a Bluetooth connection. In some embodiments, a base station can comprise a docking cradle. In some embodiments, a docking cradle can be configured to charge a detection unit. In some embodiments, a docking cradle can change a detection unit wirelessly. In some embodiments, a base station can comprise a visual display. In some embodiments, a visual display can display spirometric data in real time. In some embodiments, a base station can comprise one or more indicator element. In some embodiments, the indicator element can be a light emitting diode. In some embodiments, a base station can transmit spirometric data to a data base or server. In some embodiments, a database or server can be a cloud server or database. In some embodiments, a base station can transmit data wirelessly. In some embodiments, a base station can be configured remotely. In some embodiments, a base station can be configured via the cloud. In some embodiments, a base station can comprise an integrated biometric sensor (e.g., fingerprint sensor). In another embodiment, an integrated biometric sensor can be located on a detection unit.

The term "cloud" as used herein can refer to cloud computing. Cloud computing can be an Internet-based computing that can provide shared processing resources and data to computers and other devices on demand. In some cases, cloud computing can entail a sharing of resources (e.g. data) over a network. In some embodiments, a spirometer can be configured remotely. In some embodiments, a spirometer can be configured via a cloud. In some instances, a data can be uploaded to a cloud based server or database from a spirometer. In some instances, a data can be retrieved from a cloud based server or database to a spirometer.

In some embodiments, a spirometer can utilize a Bluetooth connection. The term "Bluetooth" as used herein can refer to a global wireless communication standard that connects devices together over a certain distance. A Bluetooth device can use radio waves instead of wires or cables to connect to another device. In some cases, a device can contain a tiny computer chip with a Bluetooth radio and software that can allow it to connect. In some instances, two Bluetooth devices can be paired in order to communicate. Communication between Bluetooth devices can occur over short-range, ad hoc networks known as piconets. A piconet can be a network of devices connected using Bluetooth technology. In some instances, the network can range from two to eight connected devices or more. When a network is established, one device can take the role of the master while other devices can act as slaves. Piconets can be established dynamically and automatically as Bluetooth devices enter and leave radio proximity. In some embodiments, a Bluetooth core specification can be a Bluetooth basic rate/enhanced data rate (BR/EDR) core specification. In some embodiments, a Bluetooth core specification can be a Bluetooth core specification with low energy functionality. In some embodiments, a Bluetooth core specification can be a Bluetooth Smart core specification.

In other embodiments, a spirometer described herein and/or the base station thereof can enter a standby or idle mode for a configurable length of time when not in use. In other cases, software installed on a spirometer described herein can be updated wirelessly.

Systems

A spirometer provided herein can comprise a detection unit and an integrated biometric sensor (e.g., fingerprint sensor). A spirometer can comprise other components. For example, a spirometer can comprise a mouthpiece, and a mouthpiece can be attached to a detection unit. A detection unit can comprise one or more sensors, e.g., flow sensors or ambient air sensors. A spirometer can comprise one or more indicator elements, e.g., light emitting diodes (LEDs). A spirometer can comprise a visual display, a power supply, accelerometer, gyroscope, integrated ambient sensor, pre-calibrated pneumotach, multi-language support, USB and/or Bluetooth interface with external devices (e.g., printer, SpO2), and/or can be application (app) and tablet enabled. In some cases, a spirometer can be chargeable. A spirometer can be configured for data storage. A spirometer provided herein can be a compact, portable spirometer and can comprise smart features (e.g., seamless zero-flow, auto detect start/end test), multi-model data transfer capability (e.g., Wi-Fi, 3G, Ethernet, USB, HL7, GDT), and can be cloud enabled. In some cases, a user can chose a preferred communication type. A spirometer provided herein can offer online or offline usage. A spirometer provided herein can comprise a wireless handle with wireless charging and LED, auditory, or tactile feedback.

A spirometer provided herein can comprise a touch screen display. In some cases, a touch screen display can be an 8 inch capacitive high-resolution display. In some embodiments, a touch screen comprises a color screen. In some instances, a touch screen can have a resolution of at least or about 800×600. In some cases, a touch screen can allow for multi-touch gestures. A touch screen can allow for calibration and/or correct for differences in finger size. Furthermore, a touch screen can allow for usage while wearing a glove (e.g. latex surgical glove). In some instances, a power button can be integrated into a touch screen. In some instances, a power button can be separate from a touch screen.

A spirometer can comprise an integrated firmware. In some cases, a firmware can be updated by connecting to an external device as described herein. A spirometer can be capable of backing up and/or restoring data. In some cases, data can be backed up to an external device described herein. In some cases, data can be restored from an external device described herein. In some instances, an external device can be a USB device. In some cases, an external device can be a cloud storage server. A spirometer can allow for partial or complete backup depending upon indication by a user.

In some embodiments, one or more, or all, components of a spirometer may not be detachable. In some embodiments, one or more components of a spirometer can be detachable. For example, a detection unit can be detachable from another component of a spirometer, e.g., a base station. For example, a detection unit can be attached to another part of a spirometer, e.g., a base station, through, e.g., a docking cradle, and a detection unit can be detached from a docking cradle. A spirometer can comprise a sensor, e.g., a proximity sensor to sense a detachable element. An integrated biometric sensor (e.g., fingerprint sensor), can be located in a base station. In another embodiment, an integrated biometric sensor (e.g., fingerprint sensor), can be located on a detection unit.

As shown in FIG. 15-FIG. 21, a spirometer provided herein can comprise a base station (105) and a detection unit (130) with mouthpiece (135). A base station can comprise a visual display (110), a biometric sensor, (e.g., fingerprint sensor) (125), and a docking cradle (120).

A system described herein can comprise a high quality pneumotach. A system described herein can have a flow rang of 0.1 to about ±16 L/s (liter per second). A system described herein can have a flow accuracy of about 0.1 to 14 L/s: +/−5%/0.2 L/s. A system described herein can have a flow resolution of about 5 mL/s (milliliter per second). A system described herein can have a resistance of about 0.05 kPa/(L/s) at 10 L/s. A system described herein can have a digital integration volume measurement. A system described herein can have a volume range of about 0.1 to 8 L. A system described herein can have a volume accuracy of about 0.5 to 8 L: +/−3%/0.05 L. A system described herein can have a volume resolution of about 1 mL. A system described herein can have a high resolution graphical LCD touchscreen display with back light. A visual display disclosed herein can be 16.2 cm×12.2 cm, color, touch screen, 1024×800 pixels. A system described herein can have a power supply input having 100-240 VAC, 50/60 Hz, 1.5 A. A system described herein can have a power supply out pout of about 5V, 6 A.

Docking Cradle

Figure 2:
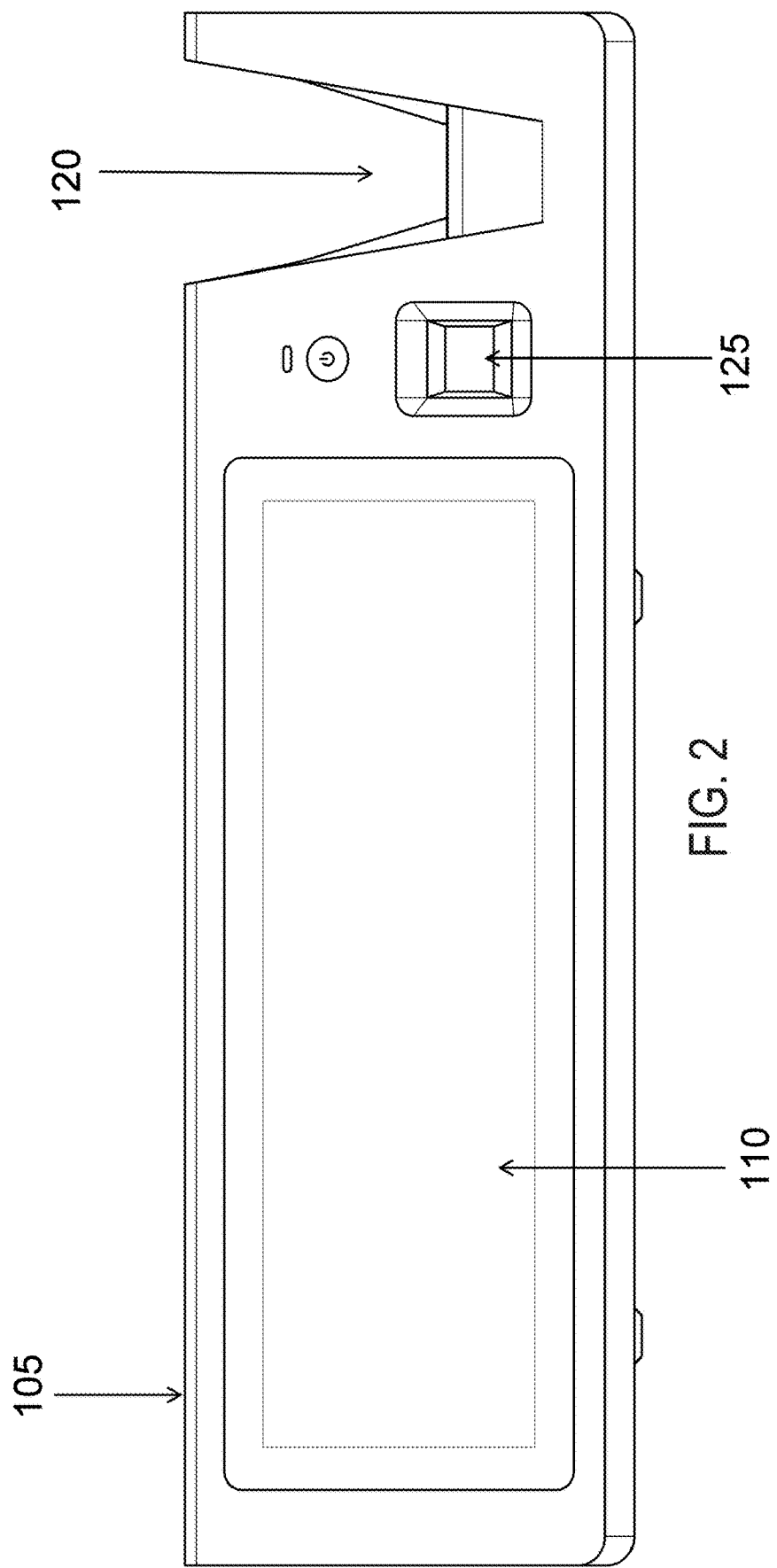
FIG. 2 illustrates a front view of a base station comprising a fingerprint sensor, docking cradle and a visual display.
Figure 3:
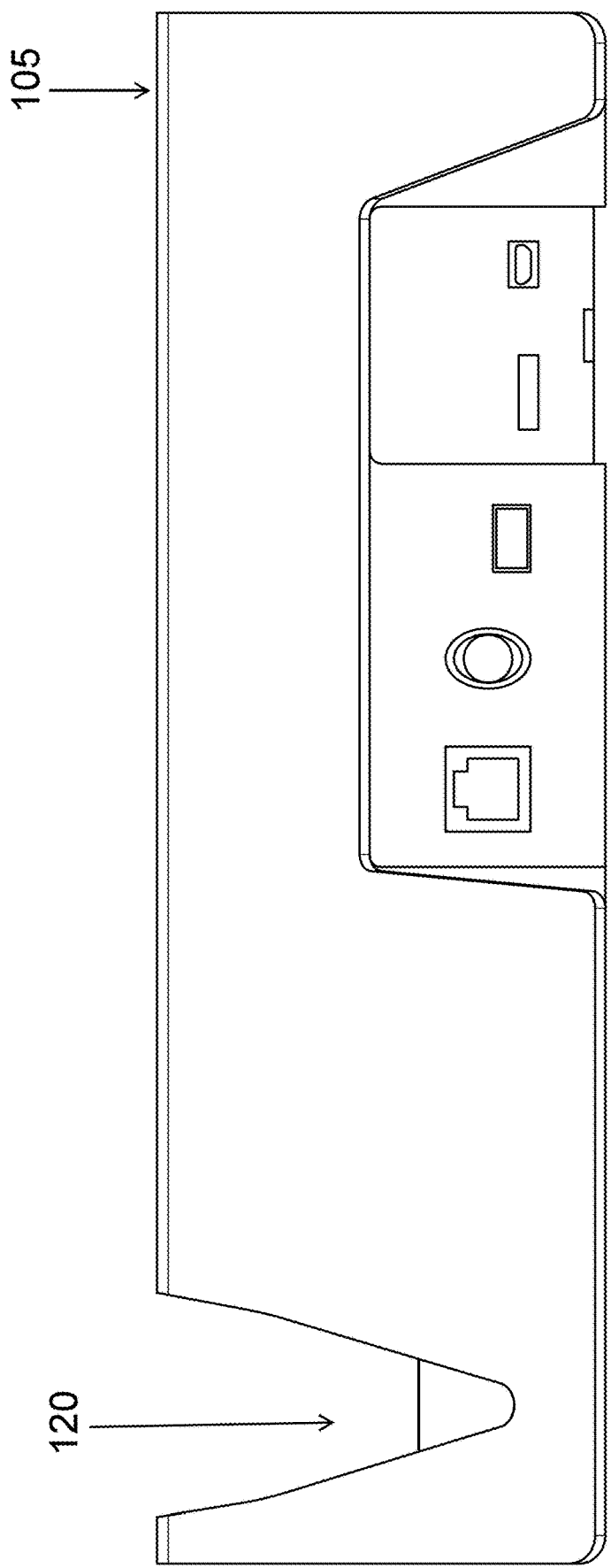
FIG. 3 illustrates a rear view of a base station.
Figure 24:
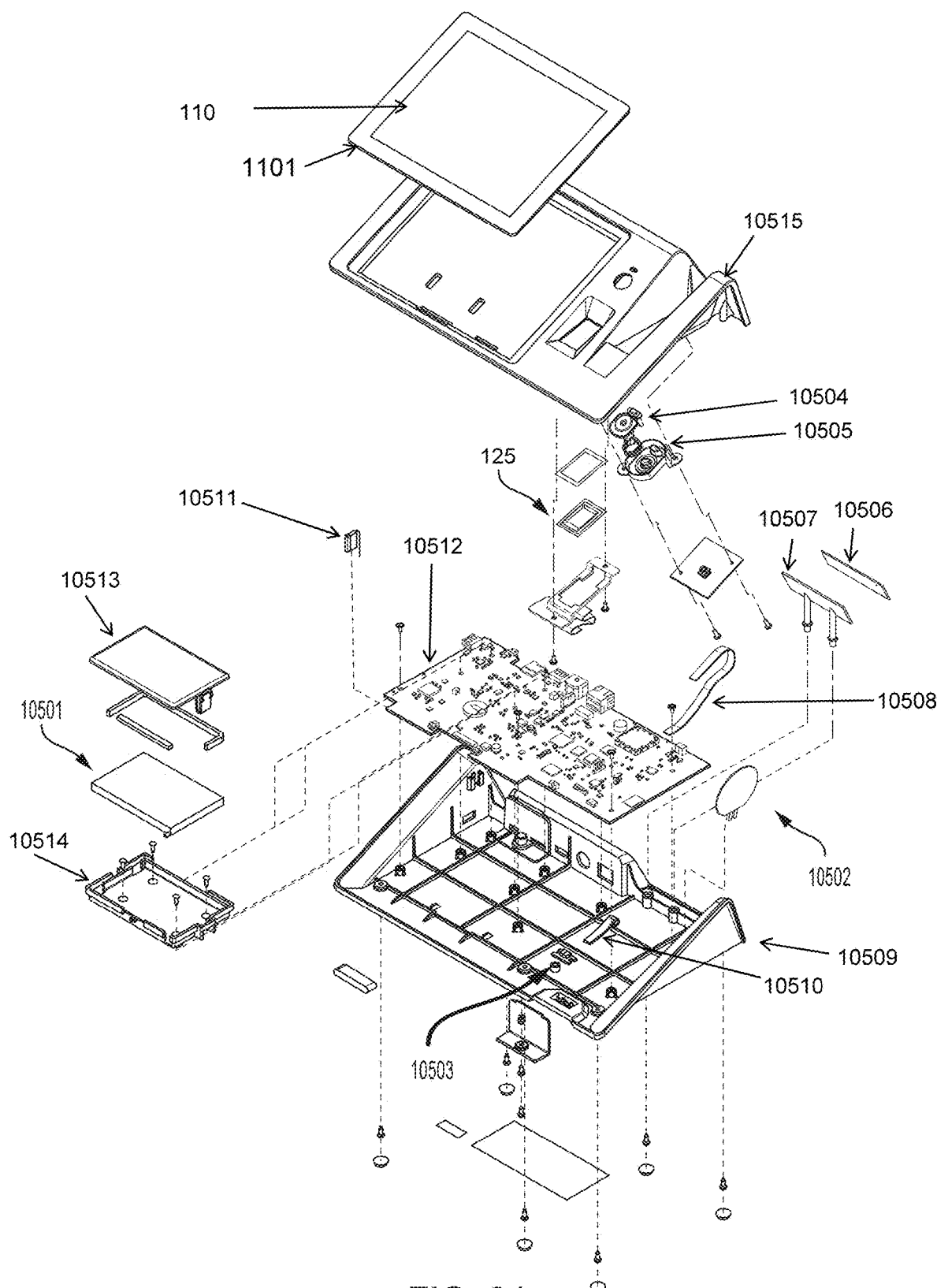
FIG. 24 illustrates an exploded view of a base station. The base station having a power source, a charging transmitter coil, a fingerprint sensor and a visual display.

In some embodiments, a detection unit (130) described herein can be stored in a docking cradle (120). In some instances, as depicted in FIG. 1 and FIG. 2, a docking cradle (120) can be disposed in a base station (105). In other instances, a docking cradle (120) can be detached from a base station (105). In some embodiments, a docking cradle can have a separate plug or power source. In some embodiments, a docking cradle can share a power source of a base station. In some embodiments, a detection unit can be charged by a docking cradle. In some embodiments, if a subject is at a remote location, a detection unit (130) can be provided to a subject along with an independent docking cradle unit for charging a detection unit without a base station. In some embodiments, a base station may not be accessible, a detection unit (130) can be provided to a subject along with an independent docking cradle unit for charging a detection unit without a base station. In some instances, a docking cradle, whether attached to a base station or as a separate independent unit, can be equipped with a proximity sensor to detect a presence of a detection unit in relation to a docking cradle. A docking cradle can be configured to inductively charge a detection unit. Inductive charging between a detection unit and a docking cradle can occur with a Qi standard. In some instances, a docking cradle can be configured to improve charging efficiency by including additional components; for example, one or more additional magnets can be used to provide tactile feedback between a detection unit and a base station. A detection unit can comprise one or more electric charging plates. In some embodiments, charging plates can comprise an array of coils. In some embodiments, an array of coils can cause a detection unit to be charged irrespective of positioning in a docking cradle on a charging plate. As depicted in FIG. 24, a docking cradle of a base station can comprise a charging transmitter coil (10502). In further embodiments, a detection unit can comprise limited communication protocols in addition to power transfer. In some embodiments, limited communication protocols and power transfer can cause a detection unit to provide control feedback to a base station or docking cradle. In some embodiments, a control feedback can include detection unit charge status, percent charged, battery life, and operation status (e.g. ready for use)

In some embodiments, a docking cradle (120) can automatically pair (recognize) a detection unit (130) when a detection unit (130) is docked in a docking cradle. In other embodiments, a docking cradle (120) can pair (recognize) a detection unit (130) when a detection unit (130) is proximal to a docking cradle (120). In some instance, a detection unit (130) can be proximal to a docking cradle (120) when a distance between a detection unit (130) and a docking cradle (120) is a distance of at least, at most, or about 1, 10, 15, 30, 50, 75, 100, 150, 200, 300, 400, 500, 600, 700, 800, 900, 1000, 1500, 2000, 2500, 3000, 4000, 5000 cm (centimeter), 10 m (meter), 25 m, 50 m, 75, or 100 m. In some embodiments, a detection unit (130) and a docking cradle (120) can be paired (recognize each other) through incorporation of a proximity sensor.

A docking cradle can have a flat, rounded or curved surface. A docking cradle can be shaped in such a way to secure a detection unit when a detection unit is placed on/in a docking cradle. A docking cradle can comprise a housing forming a receiving slot to receive a detection unit. A receiving slot can be sized and shaped to receive a detection unit therein. A docking cradle can have a mechanism to hold a detection unit in place on/in a docking cradle Proximity Sensor In some embodiments, a spirometer provided herein can comprise one or more detachable components. A first component can comprise a proximity sensor that can detect a second component. A second component can be capable of emitting a signal detectable by a proximity sensor. In some cases, a proximity sensor on a first component can detect a signal emitted from a second component. In some cases, a proximity sensor on a first component can detect a signal emitted from a second component when a first component and a second component are within a certain distance. For example, a docking cradle (120) or base station (105) can comprise a proximity sensor for detecting, e.g., a detachable detection unit (130), and a detachable detection unit (130) can emit a signal that can be detectable by a proximity sensor on a docking cradle or base station. In some cases, a docking cradle (120) or base station (105) can emit a signal detectable by a proximity sensor in a detection unit (130).

In some embodiments, a proximity sensor in a first component can be in communication, e.g., electronically connected, e.g., wireless or wired connection, to a second component, e.g., docking cradle (120) or a base station. In some embodiments, an electrical signal can be sent through a USB connection. In some embodiments, an electrical signal can be sent through a fiber optic connection. In some embodiments, an electrical signal can be transmitted through an Ethernet cable. In some embodiments, a wireless signal can be sent through a 3G data signal. In other embodiments, a wireless signal can be sent through a Bluetooth connection. In some embodiments, a wireless signal can be sent through a Wi-Fi connection. In other embodiments, a wireless signal can be sent through an infra-red data association link. A spirometer can provide an indication of signal strength when wirelessly connected. In some instances, a spirometer can provide feedback about a connection. For instance, a spirometer can provide an indication of a loss of a connection, or a success or failure to transmit data across a connection.

In some embodiments, a proximity sensor in a first component can detect a signal emitted from a second component, e.g., a detection unit (130). In some embodiments, a detection unit (130) can be detected by a proximity sensor when a detection unit (130) is docked in a docking cradle (120). In other embodiments, a proximity sensor can detect a detection unit (130) when a detection unit (130) is proximal to a docking cradle.

In some embodiments, a proximity sensor on a first component, e.g., docking cradle (120) or base station (105), can detect a signal emitted from a second component, e.g., detection unit (130), when a first component is at a distance of from about 1 cm to about 5,000 cm away, about 1 cm to about 4,000 cm away, about 1 cm to about 3,000 cm away, about 1 cm to about 2,000 cm away, about 1 cm to about 1,000 cm away, about 1 cm to about 500 cm away, about 1 cm to about 250 cm away, about 1 cm to about 200 cm away, about 1 cm to about 150 cm away, about 1 cm to about 100 cm away, about 1 cm to about 50 cm away, about 1 cm to about 25 cm away, about 1 cm to about 20 cm away, about 1 cm to about 15 cm away, about 1 cm to about 10 cm away, or about 1 cm to about 5 cm away from a second component. In some embodiments, a proximity sensor in a first component, e.g., docking cradle (120) or base station (105) can detect a signal emitted from a second component, e.g., a detection unit (130), when a first component is at a distance of at least, at most, or about 1 cm away, at least, at most, or about 2 cm away, at least, at most, or about 5 cm away, at least, at most, or about 10 cm away, at least, at most, or about 15 cm away, at least, at most, or about 20 cm away, at least, at most, or about 25 cm away, at least, at most, or about 50 cm away, at least, at most, or about 75 cm away, at least, at most, or about 100 cm away, at least, at most, or about 150 cm away, at least, at most, or about 200 cm away, at least, at most, or about 250 cm away, at least, at most, or about 300 cm away, at least, at most, or about 350 cm away, at least, at most, or about 400 cm away, at least, at most, or about 450 cm away, at least, at most, or about 500 cm away, at least about 600 cm away, at least about 700 cm away, at least about 800 cm away, at least about 900 cm away, at least, at most, or about 1,000 cm away, at least, at most, or about 1,100 cm away, at least, at most, or about 1,200 cm away, at least, at most, or about 1,300 cm away, at least, at most, or about 1,400 cm away, at least, at most, or about 1,500 cm away, at least, at most, or about 1,750 cm away, at least, at most, or about 2,000 cm away, at least, at most, or about 2,250 cm away, at least, at most, or about 2,500 cm away, at least, at most, or about 2,750 cm away, at least, at most, or about 3,000 cm, at least, at most, or about 5 m, at least, at most, or about 10 m, at least, at most, or about 25 m, at least, at most, or about 50 m, at least, at most, or about 75 m, or at least, at most, or about 100 m away from a second component.

In some embodiments, detection of an emitted signal by a proximity sensor can result in activation of an indicator. In some cases, lack of detection of an emitted signal by a proximity sensor can result in activation of an indicator. In some embodiments, a proximity sensor can be in communication, e.g., electronically connected, e.g., wired or wireless connected, to an indicator, e.g., an audible source, a tactile source, or a visual source (e.g., an LED), that indicates when a proximity sensor detects an emitted signal or lack thereof. An audible source can be, e.g., a speaker. An audible source can be a device producing sound. In some embodiments an audible source can be one or more speakers. For example, in an exemplary embodiment an audible source can be a sound that changes volume and/or frequency based on signal strength. In some embodiments, an audible source can provide a sound output of from about 90 db to about 100 db (decibels). In other embodiments, a sound output can be at least between 0 db and 140 db. In some cases, a volume level of the audible source can be adjustable. A tactile source can be, e.g., a rotating motor. In some embodiments, a tactile source can be a vibration motor. In some embodiments, a tactile source can produce high frequency low amplitude vibrations. In some embodiments, a tactile source can vibrate in a constant and continuous mode, or vibrations may be non-continuous, such as intermittent periods or cycles of vibration and no vibration. For example, in an exemplary embodiment a tactile source can be a vibration that changes frequency based on signal strength. A visual source can be, e.g., a light, LED, etc. In some embodiments, a visual source can be a light, multiple lights, gauge, display or the like. For example, in an exemplary embodiment a visual source can be a light that changes frequency and/or pulsing rate and/or intensity based on signal strength.

Any combination of embodiments above can also be employed to provide an indication of proximity of detachable components, e.g., of a detection unit (130) to a docking cradle (120). For example, a docking cradle (120) can comprise both a vibrational motor and an audible source. In some embodiments, a detection unit (130) can comprise both a vibrational motor and an audible source.

Power Source

Figure 23:
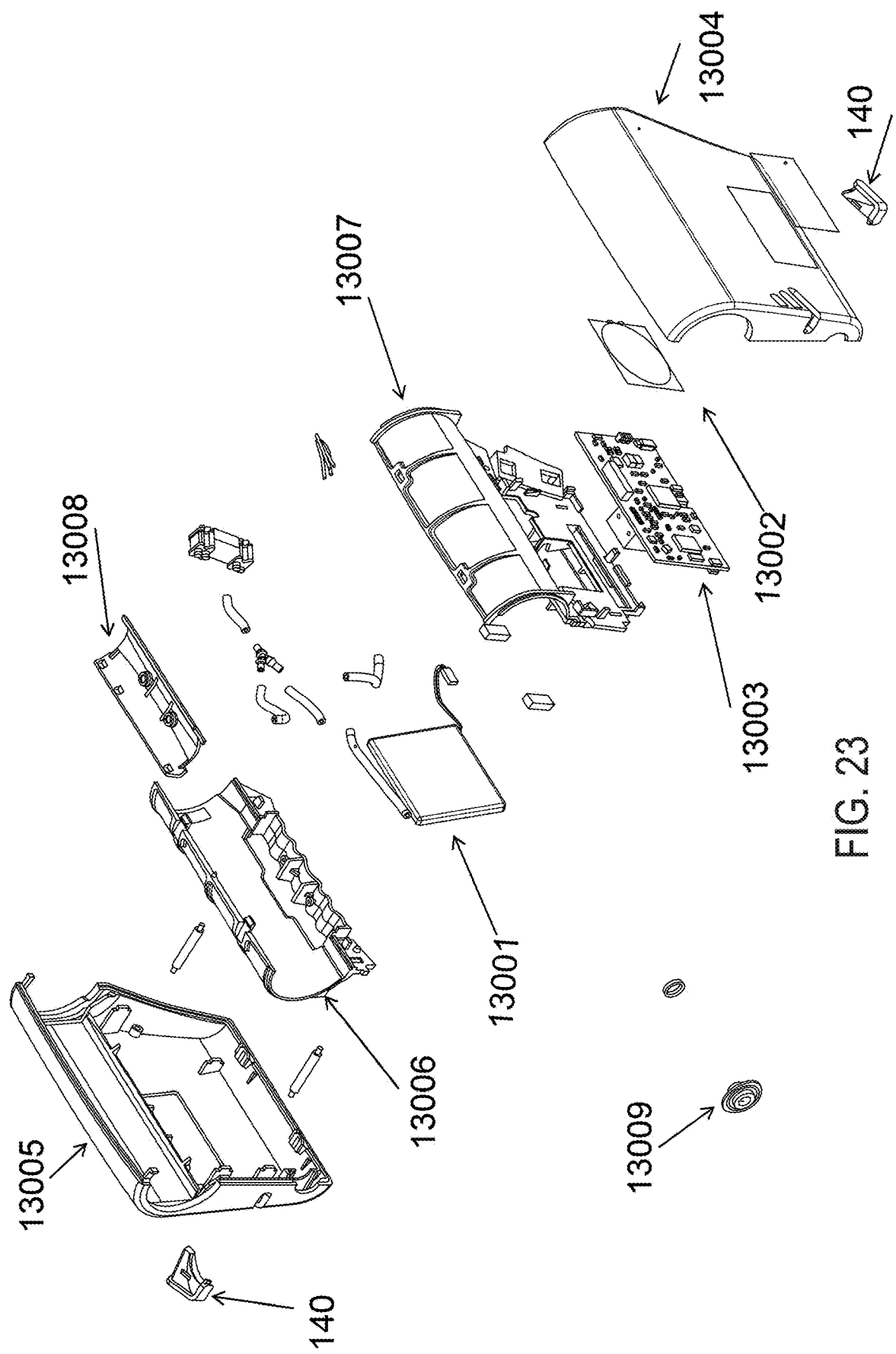
FIG. 23 illustrates an exploded view of a detection unit. The detection unit having a charging receiver coil and a power source.

In some embodiments, a detection unit (130) can be chargeable. In some cases, a detection unit can be charged via an external power source. In some cases, an external power source can be rechargeable or replaceable. In some cases, a detection unit can comprise an internal power source. In some cases, an internal power source can be rechargeable or replaceable. In some instances, a detection unit (130) can be charged when docked on a docking cradle (120). In some embodiments, charging can be performed through inductive charging. In some instances, a detection unit (130) can comprise one or a plurality of induction coils to allow for charging. In some instances, a docking cradle (120) can comprise one or a plurality of induction coils to allow for charging. In some embodiments, a detection unit (130) and a docking cradle (120) can each independently comprise one or a plurality of induction coils to allow for efficient charging when a detection unit (130) is in contact with a docking cradle (120). In some embodiments, a docking cradle (120) and a detection unit (130) can comprise one or a plurality of magnets. In some embodiments, a docking cradle (120) and a detection unit (130) can comprise one or a plurality of magnets to ensure proper orientation and contact to allow for more inductive charging. In some embodiments, inductive charging between a detection unit (130) and a docking cradle (120) can occur through Qi standard. In other embodiments, inductive charging between a detection unit (130) and a docking cradle (120) can occur through a Power Matters Alliance (PMA) standard. In some embodiments, as depicted in FIG. 23, a detection unit can comprise a charging receiver coil and a base station can comprise a charging transmitter coil.

In some embodiments, charging of a detection unit can occur through resonant inductive charging. In some embodiments, resonant inductive charging can occur when one or more induction coils can be tuned to resonate at a same frequency, thereby allowing for charging when a detection unit (130) and a docking cradle (120) can be in proximity. In some embodiments, a detection unit (130) can be charged when a detection unit (130) is in direct contact with a docking cradle (120).). In some embodiments, a detection unit (130) can be charged when a detection unit (130) is at a distance of at least 0.001 cm away, at least 0.002 cm away, at least 0.01 cm away, at least 0.03 cm away, at least 0.05 cm away, at least 0.1 cm away, at least 0.2 cm away, at least 0.3 cm away, at least 0.4 cm away, at least 0.5 cm away, at least 0.6 cm away, at least 0.7 cm away, at least 0.8 cm away, at least 0.9 cm away, at least 1 cm away, at least 2 cm away, at least 3 cm away, at least 5 cm away, at least 10 cm away, from a docking cradle (120). In some embodiments, a detection unit (130) can be charged when a detection unit (130) is at a distance of at least, at most, or about 1, 2, 5, 10, 15, 25, 50, 100, 500, 1000, 1500, 2000, 2500, 3000, 3500, 4000, 5000, or 10000 cm away from a docking cradle (120) through resonant inductive charging. In some embodiments, a detection unit (130) can be recharged when it is at a distance of about 1 cm to about 5,000 cm, about 1 cm to about 4,000 cm, about 1 cm to about 3,000 cm, about 1 cm to about 2,000 cm, about 1 cm to about 1,000 cm, about 1 cm to about 500 cm, about 1 cm to about 250 cm, about 1 cm to about 200 cm, about 1 cm to about 150 cm, about 1 cm to about 100 cm, about 1 cm to about 50 cm, about 1 cm to about 25 cm, about 1 cm to about 20 cm, about 1 cm to about 15 cm, about 1 cm to about 10 cm, or about 1 cm to about 5 cm away from a docking cradle (120) through resonant inductive charging.

In some embodiments, a wireless recharging of a detection unit (130) can proceed via radio charging. In such an embodiment, a detection unit (130) can comprise a receiver capable of receiving a radio signal from a radio transmitter on a docking cradle (120). In some embodiments, a detection unit (130) can comprise a radio transmitter. In some embodiments, a docking cradle (120) can comprise a receiver capable of receiving a radio signal. In some embodiments, a detection unit (130) can be charged when a detection unit (130) and a docking cradle (120) can be in proximity. In some embodiments, a detection unit (130) can be charged when a detection unit (130) is in direct contact with a docking cradle (120). In some embodiments, a detection unit (130) can be charged when a detection unit (130) is at a distance of at least, at most, or about 1 cm away, at least, at most, or about 2 cm away, at least, at most, or about 5 cm away, at least, at most, or about 10 cm away, at least, at most, or about 15 cm away, at least, at most, or about 20 cm away, at least, at most, or about 25 cm away, at least, at most, or about 50 cm away, at least, at most, or about 75 cm away, at least, at most, or about 100 cm away, at least, at most, or about 150 cm away, at least, at most, or about 200 cm away, at least, at most, or about 250 cm away, at least, at most, or about 300 cm away, at least, at most, or about 350 cm away, at least, at most, or about 400 cm away, at least, at most, or about 450 cm away, at least, at most, or about 500 cm away, at least, at most, or about 600 cm away, at least, at most, or about 700 cm away, at least, at most, or about 800 cm away, at least, at most, or about 900 cm away, at least, at most, or about 1,000 cm away, at least, at most, or about 1,100 cm away, at least, at most, or about 1,200 cm away, at least, at most, or about 1,300 cm away, at least, at most, or about 1,400 cm away, at least, at most, or about 1,500 cm away, at least, at most, or about 1,750 cm away, at least, at most, or about 2,000 cm away, at least, at most, or about 2,250 cm away, at least, at most, or about 2,500 cm away, at least about 2,750 cm away, or at least, at most, or about 3,000 cm away from a docking cradle (120) through radio charging. In some embodiments, a detection unit (130) can be recharged when it is at a distance of about 1 cm to about 5,000 cm, about 1 cm to about 4,000 cm, about 1 cm to about 3,000 cm, about 1 cm to about 2,000 cm, about 1 cm to about 1,000 cm, about 1 cm to about 500 cm, about 1 cm to about 250 cm, about 1 cm to about 200 cm, about 1 cm to about 150 cm, about 1 cm to about 100 cm, about 1 cm to about 50 cm, about 1 cm to about 25 cm, about 1 cm to about 20 cm, about 1 cm to about 15 cm, about 1 cm to about 10 cm, or about 1 cm to about 5 cm away from a docking cradle (120) through radio charging.

In other embodiments, a detection unit (130) can comprise a radio receiver capable of using a 3G, 4G LTE or Wi-Fi signal to charge a detection unit. In such an embodiment, radio charging efficiency can be improved through proximity to a wireless router. In some embodiments, charging can proceed through ambient backscatter. In some embodiments, a docking cradle (120) can comprise a wireless router. In other embodiments, a wireless router can be separate from a docking cradle (120).

Detection Unit

FIG. 5-FIG. 14 illustrate a detection unit (130). A detection unit (130) comprised herein can be fitted with a mouthpiece (135). FIG. 15-FIG. 21. illustrate an embodiment of a detection unit (130) and a mouthpiece (135). As depicted in the illustrations, a mouthpiece (135) can be disposed within a detection unit. In some embodiments, a mouthpiece (135) can be removable and/or disposable. In some embodiments, a mouthpiece (135) and a sensor can be one single unit. In some embodiments, a mouthpiece (135) and a sensor can be separate units. In some embodiments, a sensor and a mouthpiece (135) can be a single disposable unit. In some embodiments, a detector unit (130) can enter an energy conserving mode when not in use. In some embodiments, a detection unit (130) can be wireless or wired. In some embodiments, detection units (130) described herein can be used to measure spirometric data at one or more time points. For example, spirometric data can be measured before and/or after a subject receives treatment to determine an effectiveness of a treatment. In some embodiments, spirometric data can be measured at multiple time points to monitor a subject's disease or condition. A detection unit as disclosed herein can comprise a power source (13001), as in FIG. 23. In some instance, a power source can be a lithium ion battery. The detection unit (130) can comprise a tubular passage (130c) comprising a first opening (130a) and a second opening (130b), the first opening (130a) being opposite from the second opening (130b).

FIG. 23 depicts a detection unit (130). A detection unit (130) can be assembled and comprise a left cover (13004) and a right cover (13005). A right carrier (13006), a left carrier (13007) and a PT Tube sealing (13008) when assembled, can form a tubular passage (130c). A detection unit (130) can comprise a power source (13001). A power source can be a lithium ion battery pack that can have 3.7V/640 mAh. A detection unit (130) can comprise a charging receiver coil (13002). A charging receiver coil (13002) can be a wireless power charging receiver coil that can be 34×26.5 mm. A charging receiver coil (13002) can be uses to wirelessly charge a detection unit (130) power source (13001) when in close proximity to a charging transmitter coil (10502). A detection unit (130) can comprise a power button (13009) that can be used to power the detection unit (130) on or off. A detection unit (130) can comprise a printed circuit board assembly (13003) that can connect electronic components of a detection unit (130). A detection unit (130) can further comprise at least one indicator element (140).

Mouthpiece

In some embodiments, a mouthpiece (135) can be a cylindrical body with an outer surface and an inner surface. A cylindrical body can have a first end (135a), through which an individual or animal can inhale from or exhale into. In some embodiments, a cylindrical body can have a second end (135b) that faces 180 degrees from a face of a first end (135a). In some embodiments, a second end (135b) can be inserted into an interface comprised in a detection unit (130). In some embodiments, a mouthpiece (135) can be adapted to be contoured to the shape of a human mouth. In some embodiments, a first end (135a) can be adapted to be contoured to the shape of a human mouth. In some embodiments, a first end (135a) can be contoured for an ergonomic fit to a user's mouth. In some embodiments, a mouthpiece (135) can be contoured for a more efficient seal to a user's mouth. In some embodiments, a first end (135a) can be contoured for a more efficient seal to a user's mouth. In some embodiments, this first end (135a) can have sufficient structural strength to avoid collapsing when in use.

In some instances, a mouthpiece (135) can comprise a plastic material such as polyethylene, polypropylene, nylon, polyvinylchloride or other plastics known in the art. In some embodiments, a mouthpiece (135) can comprise cardboard or fiberboard. In some embodiments, a mouthpiece (135) can comprise malleable materials. A malleable material can be deformed by pressure to provide a more proper shape. In some embodiments, a mouthpiece (135) can comprise composite materials.

In some embodiments, a mouthpiece (135) can be a removable and disposable single unit. In some embodiments, a disposable mouthpiece (135) can be at least partially biodegradable, e.g., a component or material can be decomposable into environmentally acceptable components, such as carbon dioxide, water, methane and the like, by natural biological processes, such as microbial action, for example, if exposed to typical landfill conditions, in no more than five years, no more than three years, or no more than one year. In some embodiments, a mouthpiece (135) can be at least 5%, at least 10%, at least 15%, at least 20%, at least 25%, at least 30%, at least 35%, at least 40%, at least 45%, at least 50% at least 55%, at least 60%, at least 65%, at least 70%, at least 75%, at least 80%, at least 85%, at least 95%, at least 96%, at least 97%, at least 98%, or at least 99% biodegradable.

In some embodiments, a mouthpiece (135) can be sturdy when in use, but can be collapsible into a flat form when stored prior to use and when disposed. This feature can allow for efficient storage and disposal of a mouthpiece (135).

In some embodiments, a detection unit (130) can comprise filter. In some embodiments, a detection unit (130) can comprise an in-line filter between a mouthpiece (135) and a flow sensor. In some embodiments, an in-line filter can be used to prevent contamination of a spirometer in between uses. In some embodiments, an in-line filter can be removable and disposable. In some embodiments, an in-line filter can be a bag or sock shaped filter with a mesh or screen support mechanism, e.g., as described in U.S. Pat. No. 5,601,458. In some embodiments, an in-line filter can comprise any material common to one of skill in the art. In some embodiments, an in-line filter can comprise an electrostatic material. In some embodiments, an in-line filter can comprise woven, non-woven or synthetic materials.

In some embodiments, a mouthpiece (135) as depicted in FIG. 26-FIG. 31 can comprise a tubular elongated body. In some cases, a tubular elongated body can comprise a first end (135a) and a second end (135b). In some instances, a first end (135a) can be opposite from a second end (135b). In some embodiments, a first end (135a) can comprise an opening and can be configured to permit a subject to blow air into a mouthpiece. In some instances, a second end (135b) can be disposed within a tubular passage 130c) of a detection unit (130).

Flow Sensor

In some embodiments, a detection unit (130) or a mouthpiece (135) can comprise one or more flow sensors. In some instances, a flow sensor described herein can include a pneumotach sensor disposed within a tube to form a pneumotachometer. In some embodiments, a pneumotach sensor can be a wireless pneumotach sensor. In some embodiments, a pneumotachometer can measure air flow as a pressure difference over a small tube with fixed resistance. In some embodiments, a pneumotach sensor and tube can form a specific type of pneumotachometer. In some embodiments, a tube of a pneumotachometer can be configured to optimize laminar flow over a wide range of flows or rates. In some embodiments, a tube or pneumotachometer can comprise a trumpet-like configuration. In some embodiments a flow sensor can comprise a Lilly type pneumotachometer. In some embodiments, a Lilly type pneumotachometer can be configured such that a detection element can be a light screen or mesh inserted into a tube with the greatest surface area of a detection element oriented orthogonal to the air flow. In other embodiments, a flow sensor can comprise a Fleisch type pneumotachometer. In some embodiments, a Fleisch type pneumotachometer can be configured such that a resistance to flow can be derived from an array of capillaries arranged in parallel to the direction of air flow. In other embodiments, a flow sensor can comprise a turbine flow meter, wherein air flow through a tube can cause a vane to turn enabling a rate of air flow to be calculated in proportion to the number of revolutions per unit time. Further embodiments can rely on a hot wire anemometer to sense air flow. A hot wire anemometer can comprise a thin platinum wire heated to a constant temperature and disposed within a tube. As air passes through a tube, the air can cool the wire, allowing air flow to be calculated using the value of extra electrical energy required to maintain a temperature of a wire. In some embodiments, a flow sensor can comprise an ultrasonic sensor. In such a configuration, a detection unit can comprise two ultrasonic transducers facing each other. In some embodiments, one ultrasonic transducer can act as a transmitter and a second ultrasonic transducer can act as a receiver to transduce a sound-mediated signal. In some embodiments, an ultrasonic sensor can comprise a piezoelectric element to amplify a signal.

A pneumotach sensor can be unique to a subject or patient. In some embodiments, a pneumotach sensor can be removed and/or replaced after use by a subject or patient.

In some embodiments, a flow sensor can comprise an optical fiber flowmeter. In such an embodiment, an air flow can be calculated through a vibration of a fiber from using vortex shedding, which can cause phase modulation of an optical carrier within. In such an embodiment, a flow rate can then be calculated based on a vibrational frequency of a fiber. Velocity sensors can then be used to convert a vibrational oscillation into an electrical signal, which can then be used to determine a flow rate. In some embodiments, a vortex shedding can be facilitated through an inclusion of a shedder. In such an embodiment, a pressure and velocity fields in a vicinity of a shedder can oscillate at a vortex shedding frequency. Velocity sensors or pressure sensors such as pitot tubes can then be used to transform oscillating fields to an electrical signal, current or voltage in order to calculate a vortex shedding frequency. In some embodiments, an ultrasonic sensor described above can be used to independently detect vortex shedding and process a resulting vibrational frequency into an air flow rate.

In some embodiments, a flow sensor can be a pressure sensor. In some embodiments, a pressure sensor can be a pitot tube. A pitot tube can be oriented within a detection unit (130) such that a hole in a front of a pitot tube can be place in an airstream to measure a stagnation pressure, while a hole in a side of a pitot tube can be used to measure a static pressure. The difference in a stagnation pressure and a static pressure can allow a user to calculate an air flow rate.

In some embodiments, spirometric data can comprise information on air flow and/or flow rate. Embodiments above can be combined to provide multiple flow sensors within a detection unit (130). For example, a pitot tube can be combined with a vortex shedding sensor that can comprise a shedder, e.g., in order to calculate both a pressure differential and vortex shedding frequency, e.g., in order to independently calculate an air flow rate across each sensor. In some embodiments, a plurality of sensors can be located throughout a detection unit (130) or a mouthpiece (135) in order to calculate a change in air flow rate across different areas of a detection unit. In some embodiments, a detection unit (130) or a mouthpiece (135) can comprise at least 1, at least 2, at least 3, at least 4, or at least 5 flow rate sensors. In some embodiments, flow rate sensors can be located on a same face of a detection unit (130) or a (mouthpiece). In some embodiments, flow rate sensors can be located on a different face of a detection unit (130) or a mouthpiece (135). In other embodiments, flow rate sensors can be located on opposite faces of a detection unit (130) or a mouthpiece (135).

In some embodiments, a flow sensor can be a disposable flow sensor. In some embodiments, a flow sensor can be a single use flow sensor. In some embodiments, a flow sensor can be a single subject use flow sensor. In some embodiment, a flow sensor can be replaced after each use. In some embodiments, a flow sensor can be replaced after each subject use.

Ambient Air Sensors

A detection unit (130) and/or base station (105) can comprise one or more ambient air sensors. In some embodiments, an ambient air sensor or ambient sensor (10503) can be adapted to sense an ambient air characteristic, e.g. temperature, humidity, or atmospheric pressure. In some embodiments, an ambient air sensor can be a temperature sensor, a humidity sensor (10503), a pressure sensor or a combination thereof. A humidity sensor (10503) can be used to measure an ambient air humidity level, and/or used to approximate an air humidity level at a detection unit (130) or a base station (105). Ambient air pressure at a detection unit (130) or base station (105) can also be measured. In some embodiments, a plurality of ambient air sensors can be located throughout a detection unit (130) or a base station (105) in order to calculate a change in an ambient air characteristic across different areas of a detection unit (130) or a base station (105). In some embodiments, a detection unit or a base station (105) can comprise at least 1, at least 2, at least 3, at least 4, or at least 5 ambient air sensors. In some embodiments, ambient air sensors can be located on a same face of a detection unit (130) or a base station (105). In some embodiments, ambient air sensors can be located on a different face of a detection unit (130) or a base station (105). In other embodiments, ambient air sensors can be located on opposite faces of a detection unit (130) or a base station (105). In some embodiments, ambient air sensors can be used to measure ambient air characteristics at one or more time points. As depicted in FIG. 24, an ambient sensor (10503) can be located in a base station.

Air volume flow can be affected by an amount of ambient humidity, temperature and/or pressure. Devices provided herein can comprise a temperature, humidity and/or pressure sensor. By recording ambient air conditions prior to use of a spirometer by an individual, these conditions can be controlled for and held as consistent as possible. In some embodiments, methods, devices, and computer readable medium provided herein can be used to control for errors, e.g., all errors, that can be associated with changes in an ambient air characteristic. In some embodiments, a temperature sensor can be used to report an ambient temperature in a room, which can then be adjusted by a thermostat. In other embodiments, a humidity sensor can be used to report an ambient humidity in a room, which can then be adjusted by a humidifier. In some embodiments, a spirometer described herein, can compensate and/or adjust spirometric data based on a change in an ambient characteristic, for example humidity, pressure, temperature or a combination thereof. Ambient air sensors can be integrated into a spirometer, or can be attached as peripheral devices to a spirometer.

Breathalyzer

A detection unit (130) or a mouthpiece (135) can further comprise additional sensors for additional applications. In some embodiments, a detection unit (130) or a mouthpiece (135) can comprise a fuel cell sensor for detection of alcohol in a breath sample. In some embodiments, a breath sample can be directed into a fuel cell that can comprise dual platinum electrodes. Alcohol can be oxidized by fuel cells, which can give rise to an electrical current. An amount of electrical current can be proportional to an amount of alcohol in a breath sample, and this electric current differential can be used to calculate blood-alcohol content for an individual. In some embodiments, a device provided herein can comprise one or more sensors to measure one or more gases. In some embodiments, a device provided herein can comprise carbon dioxide ($CO_2$) sensors and/or carbon monoxide (CO) sensors.

Indicator Elements

Figure 4:
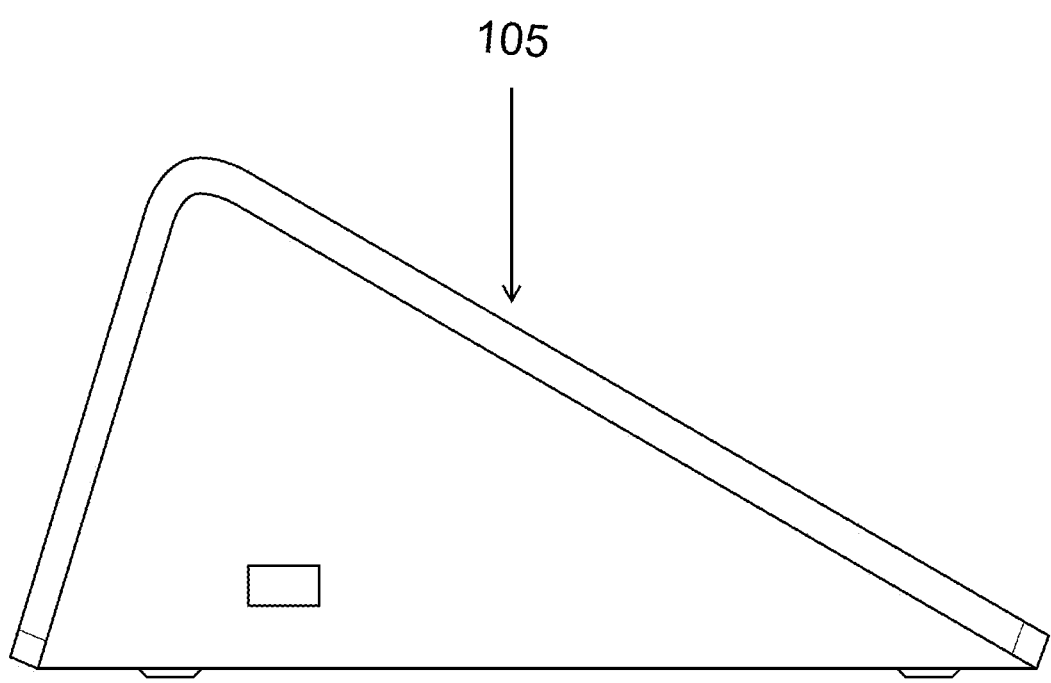
FIG. 4 illustrates a left side view of a base station.
Figure 5:
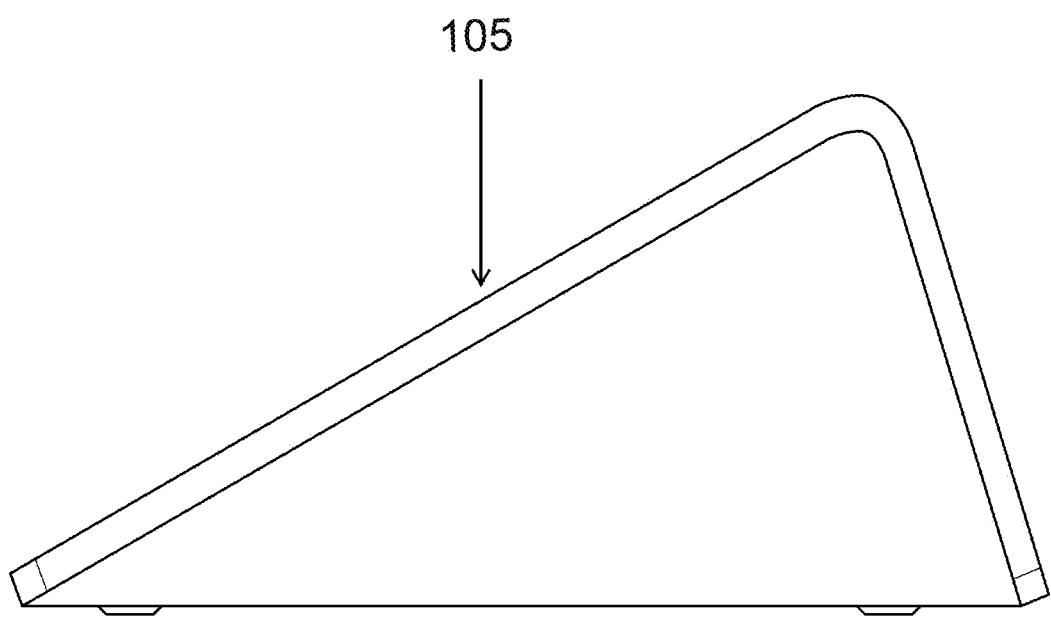
FIG. 5 illustrates a right side view of a base station.
Figure 6:
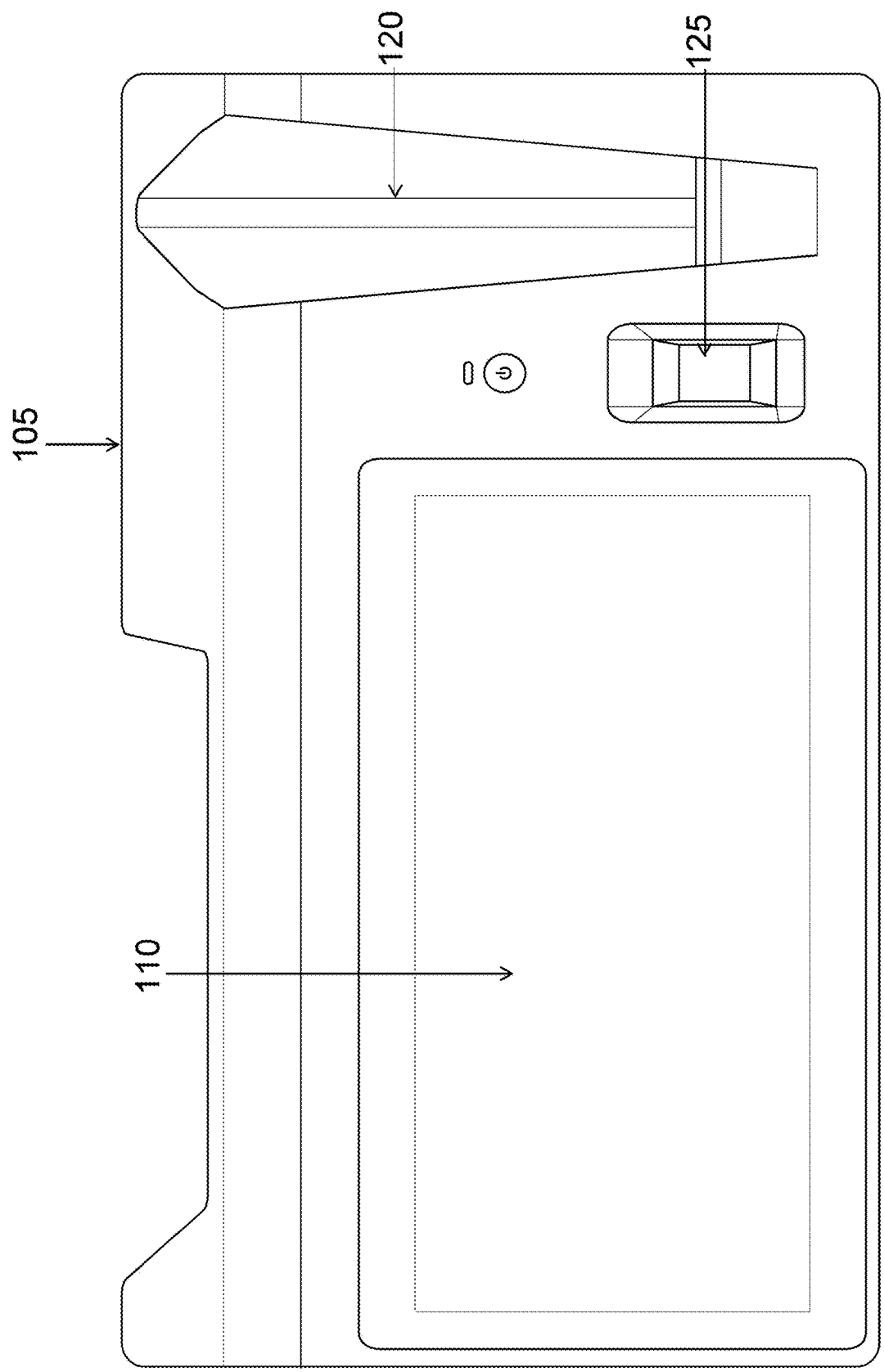
FIG. 6 illustrates a top view of a base station comprising a fingerprint sensor, docking cradle and a visual display.
Figure 7:
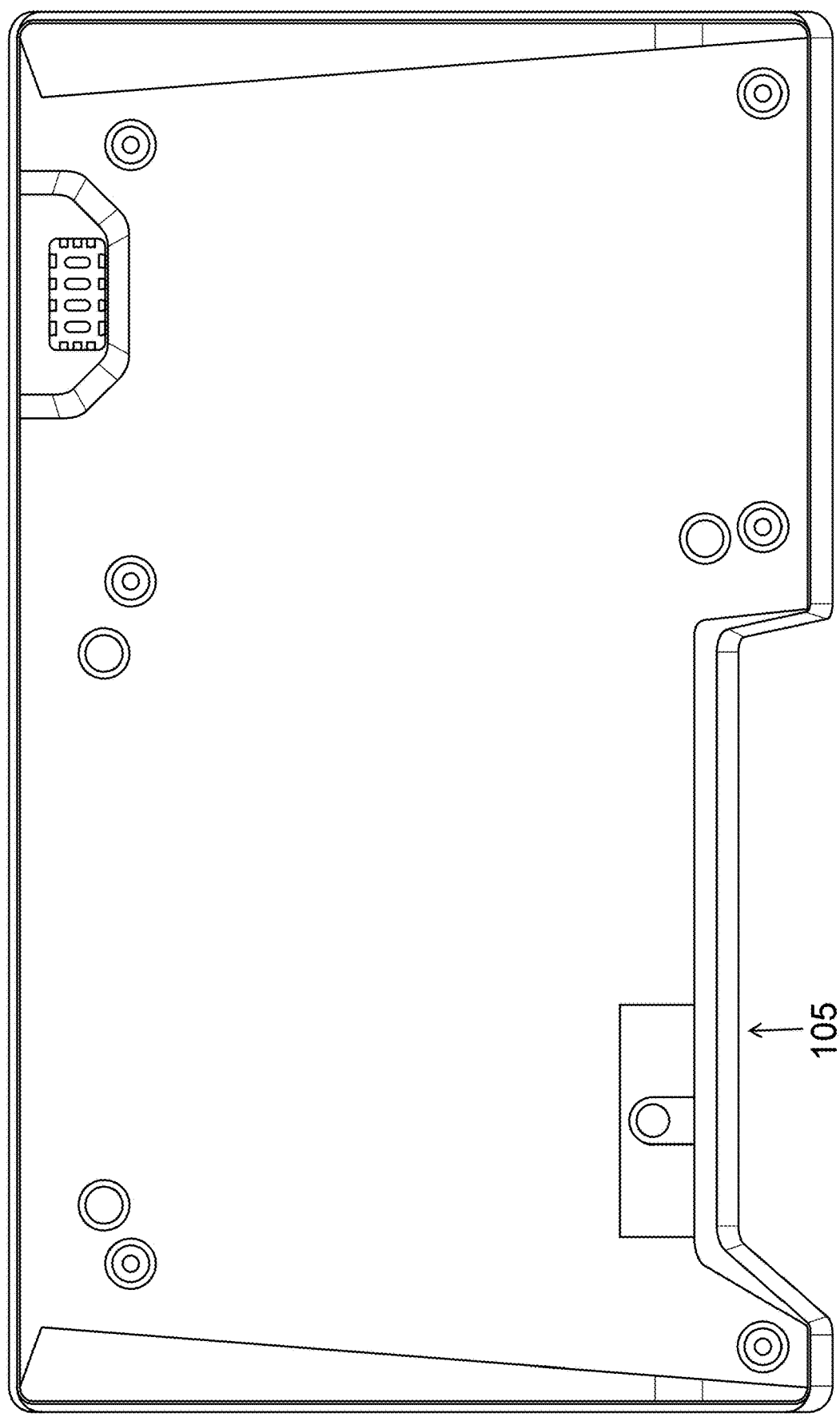
FIG. 7 illustrates a bottom view of a base station.
Figure 8:
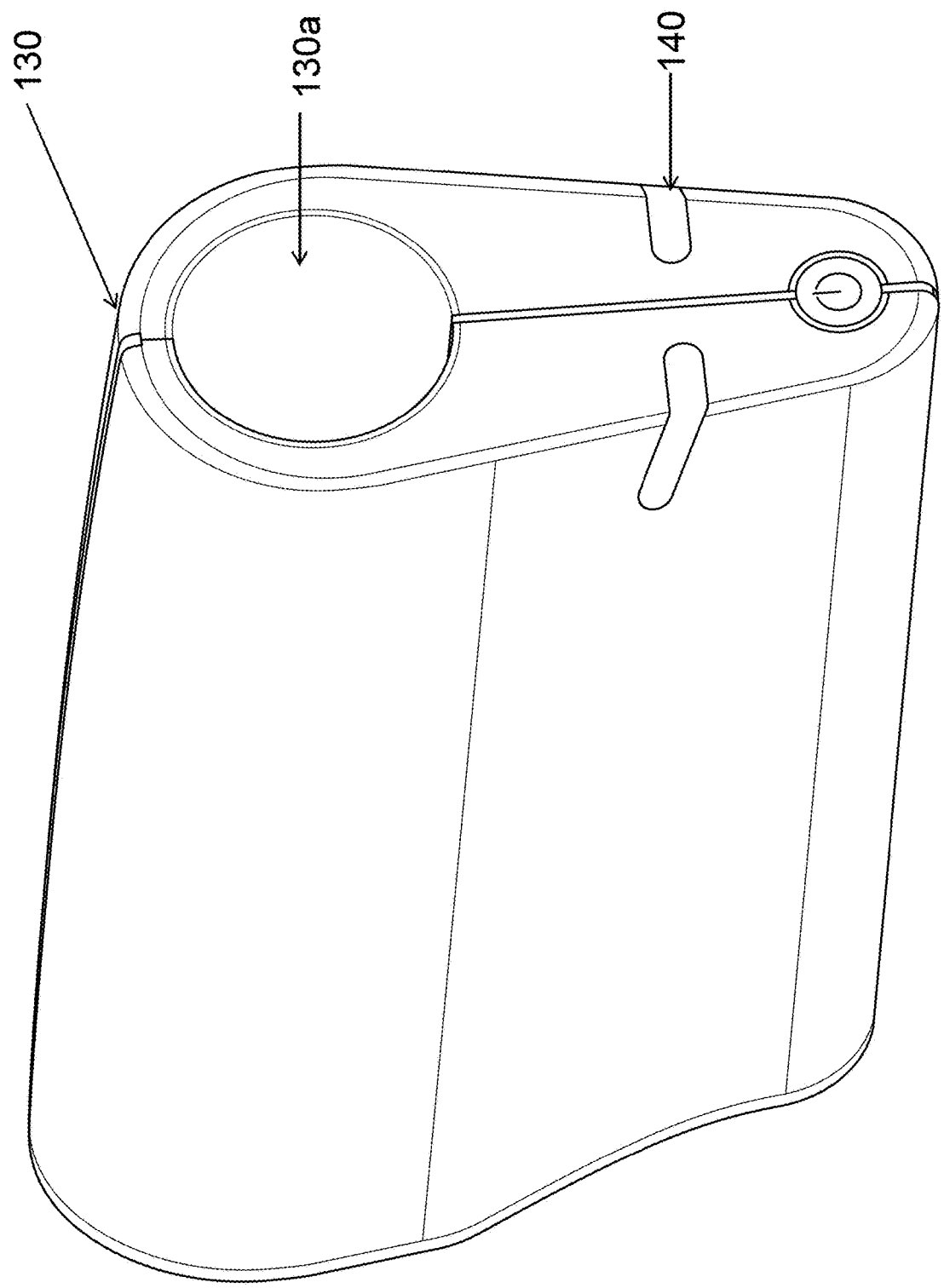
FIG. 8 illustrates a front side view of a detection unit.
Figure 9:
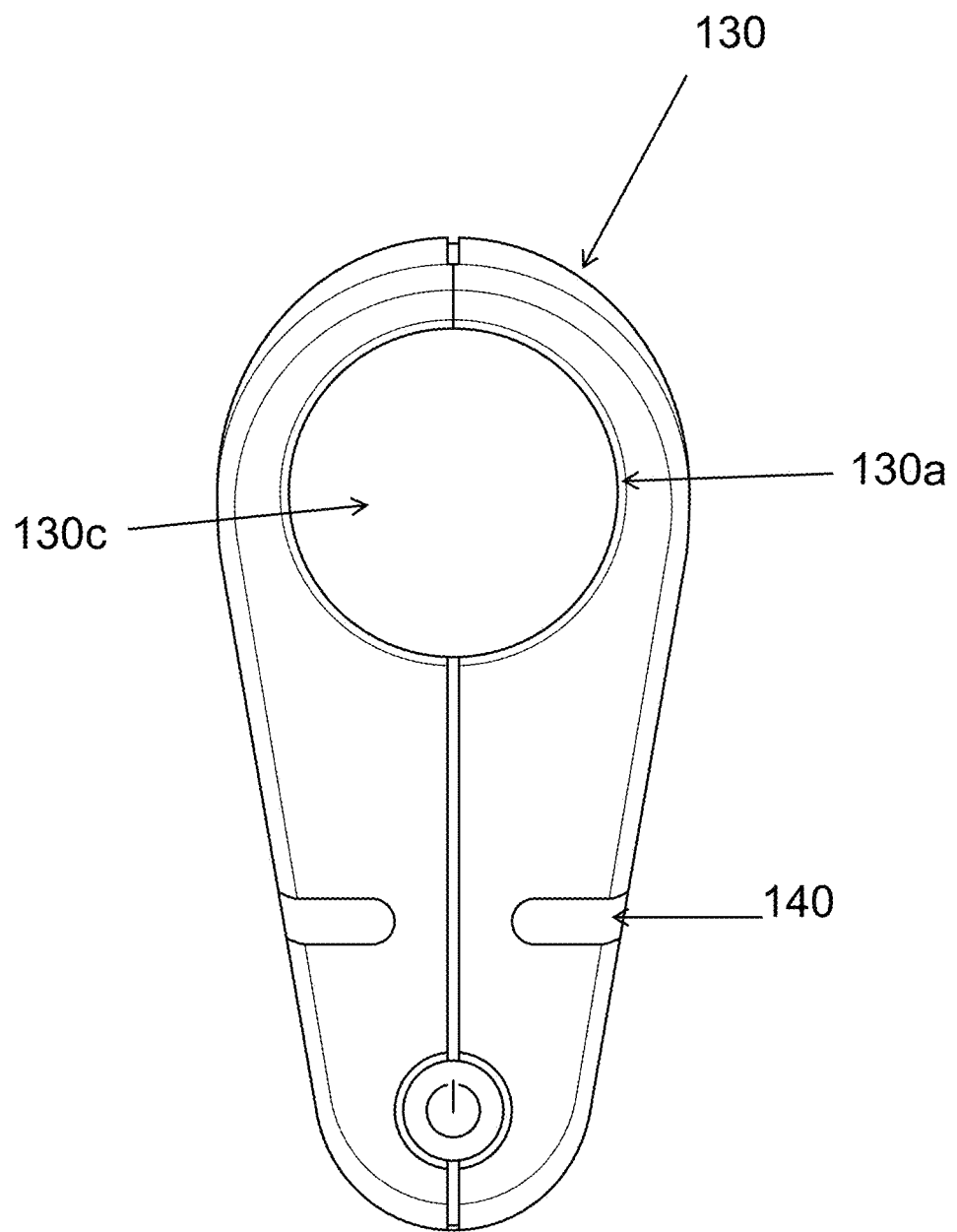
FIG. 9 illustrates a front view of a detection unit.
Figure 10:
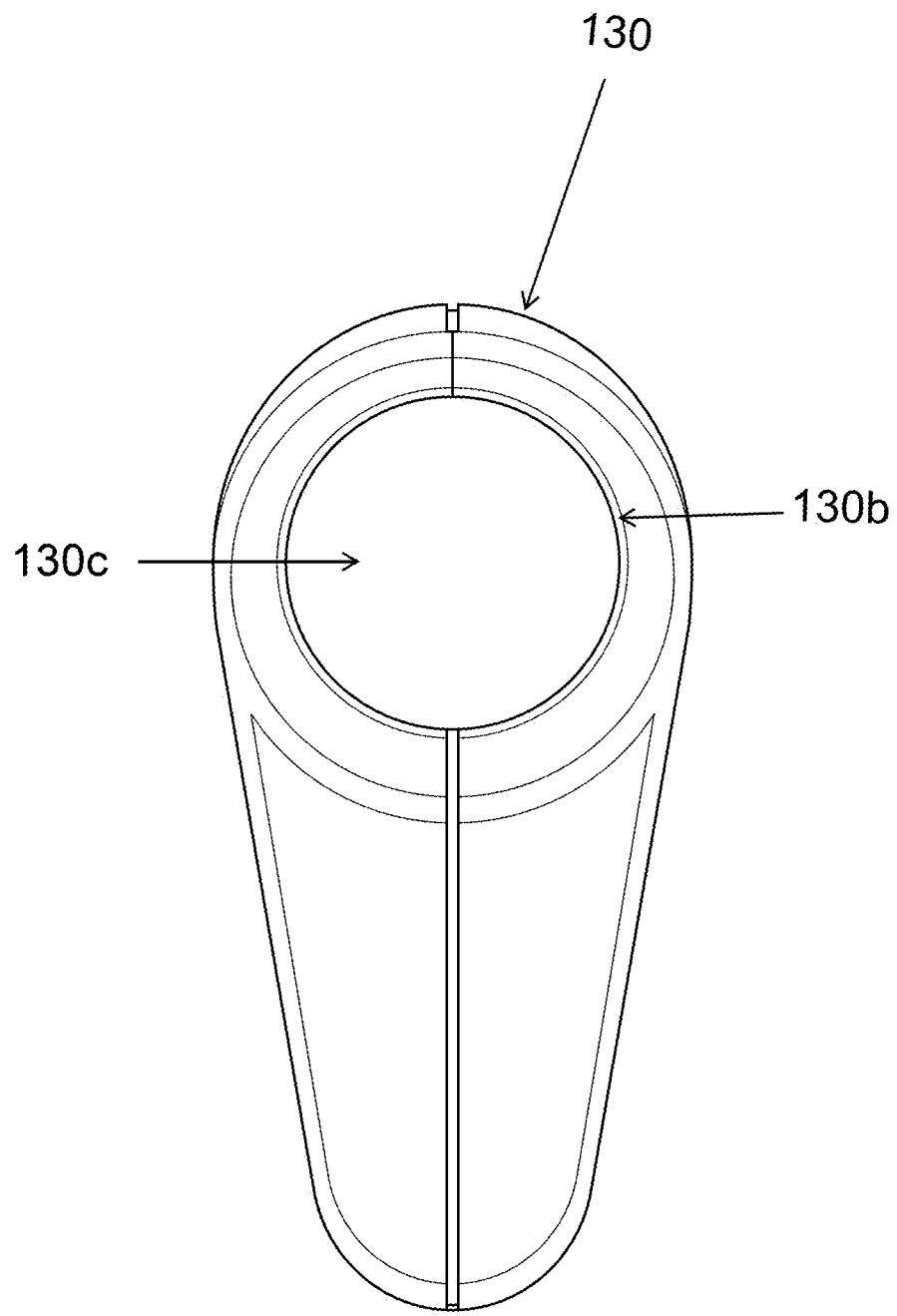
FIG. 10 illustrates a rear view of a detection unit.
Figure 11:
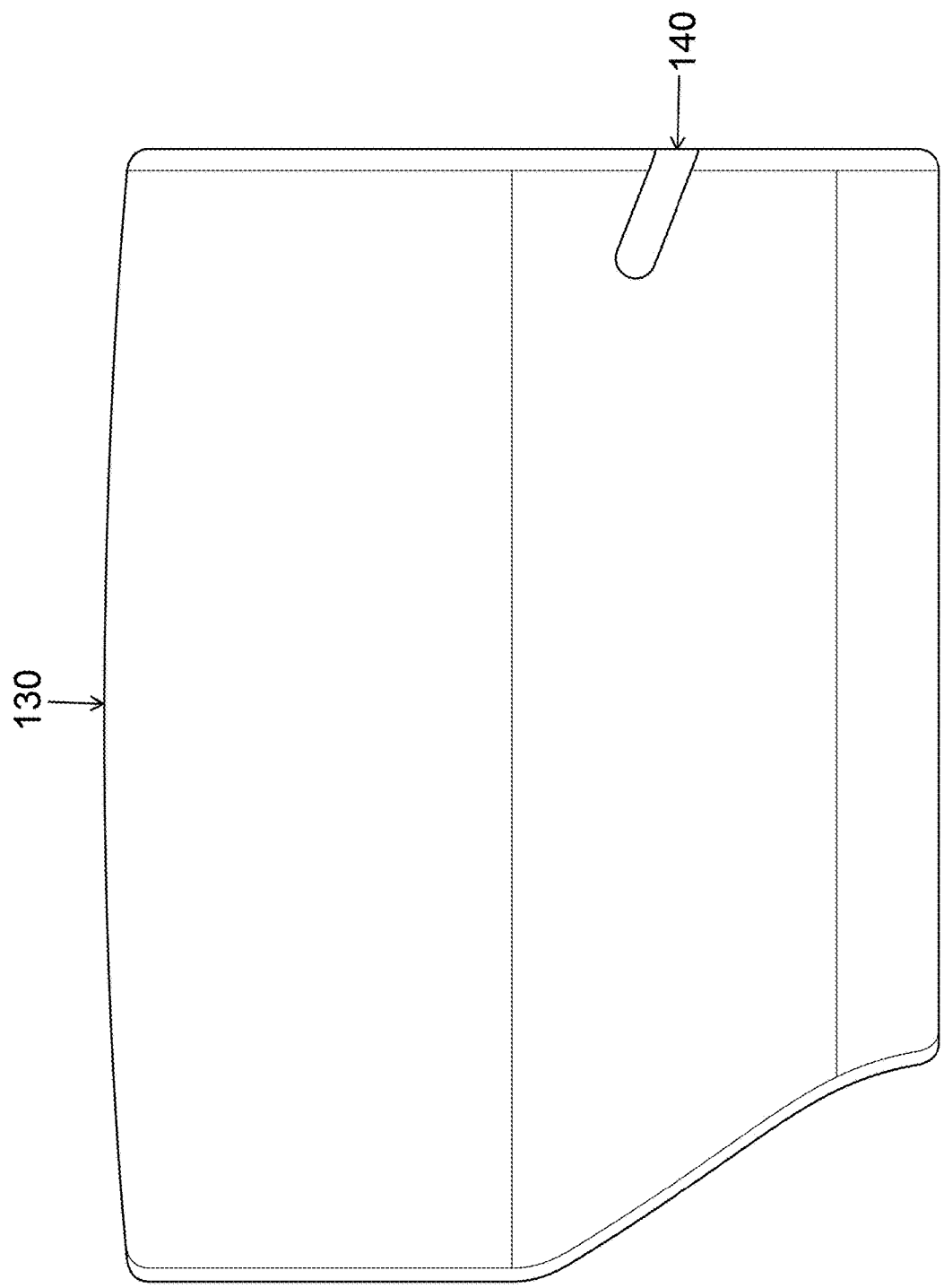
FIG. 11 illustrates a left side view of a detection unit.
Figure 12:
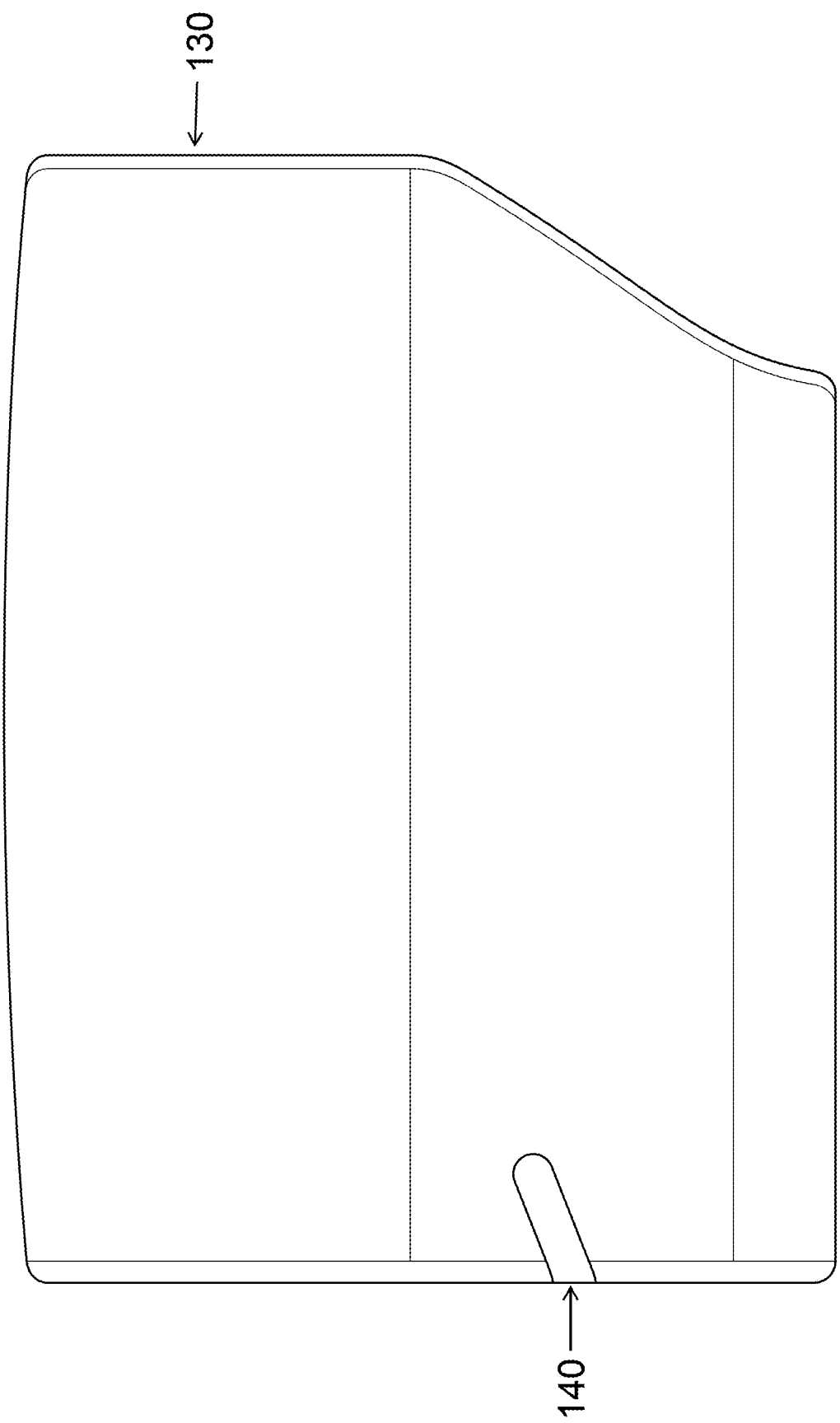
FIG. 12 illustrates a right side view of a detection unit.
Figure 13:
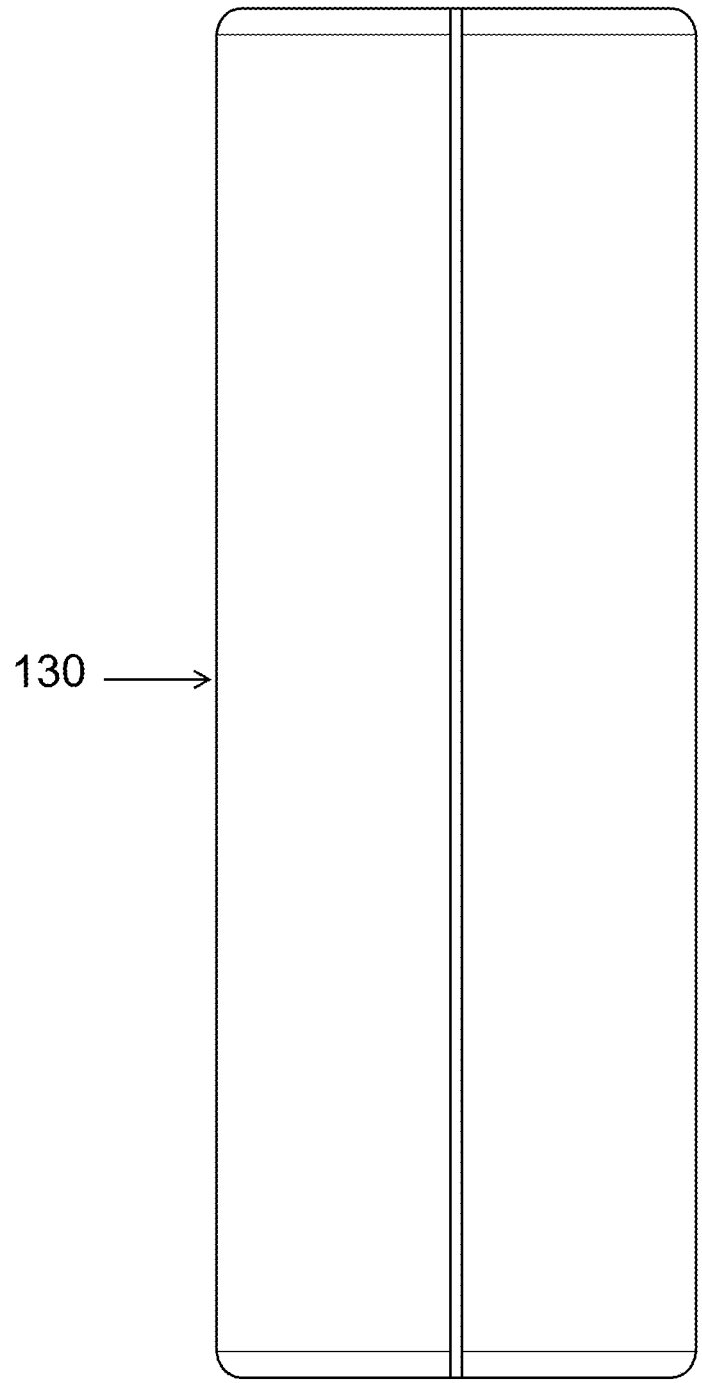
FIG. 13 illustrates a top view of a detection unit.
Figure 14:
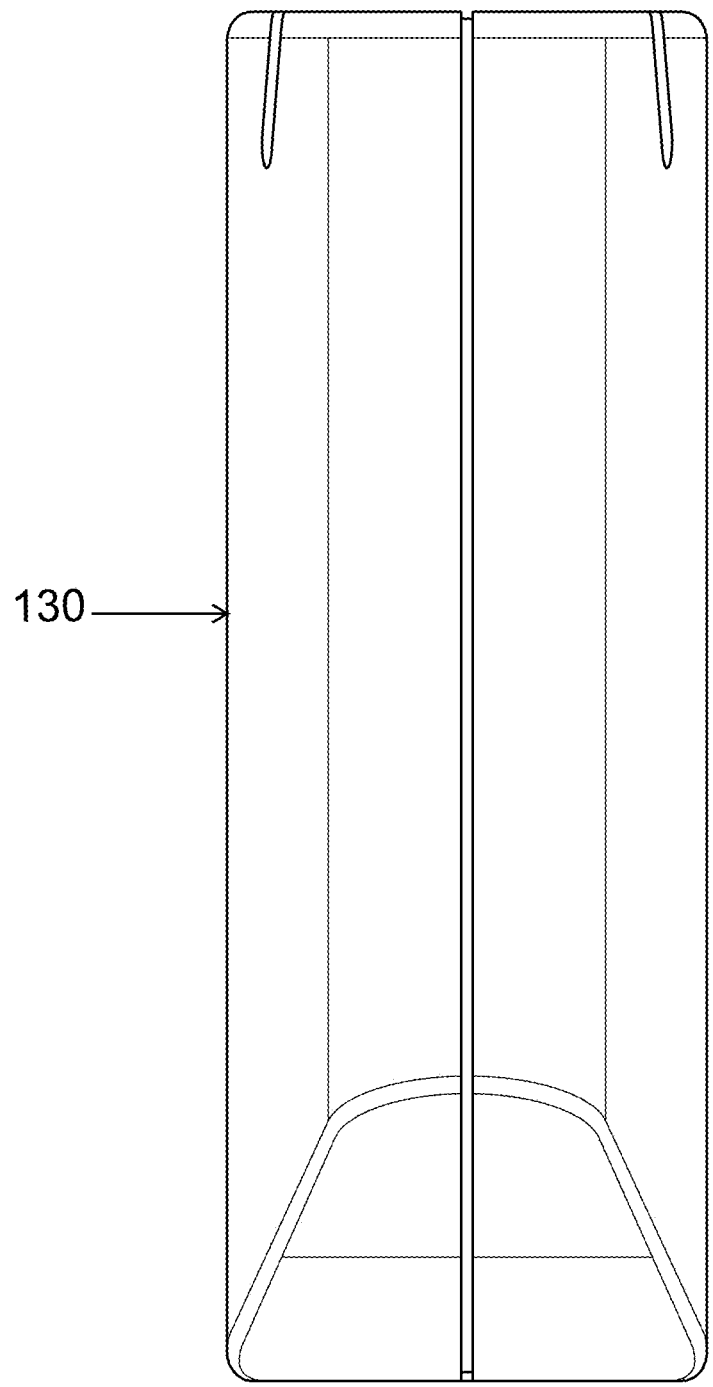
FIG. 14 illustrates a bottom view of a detection unit.
Figure 15:
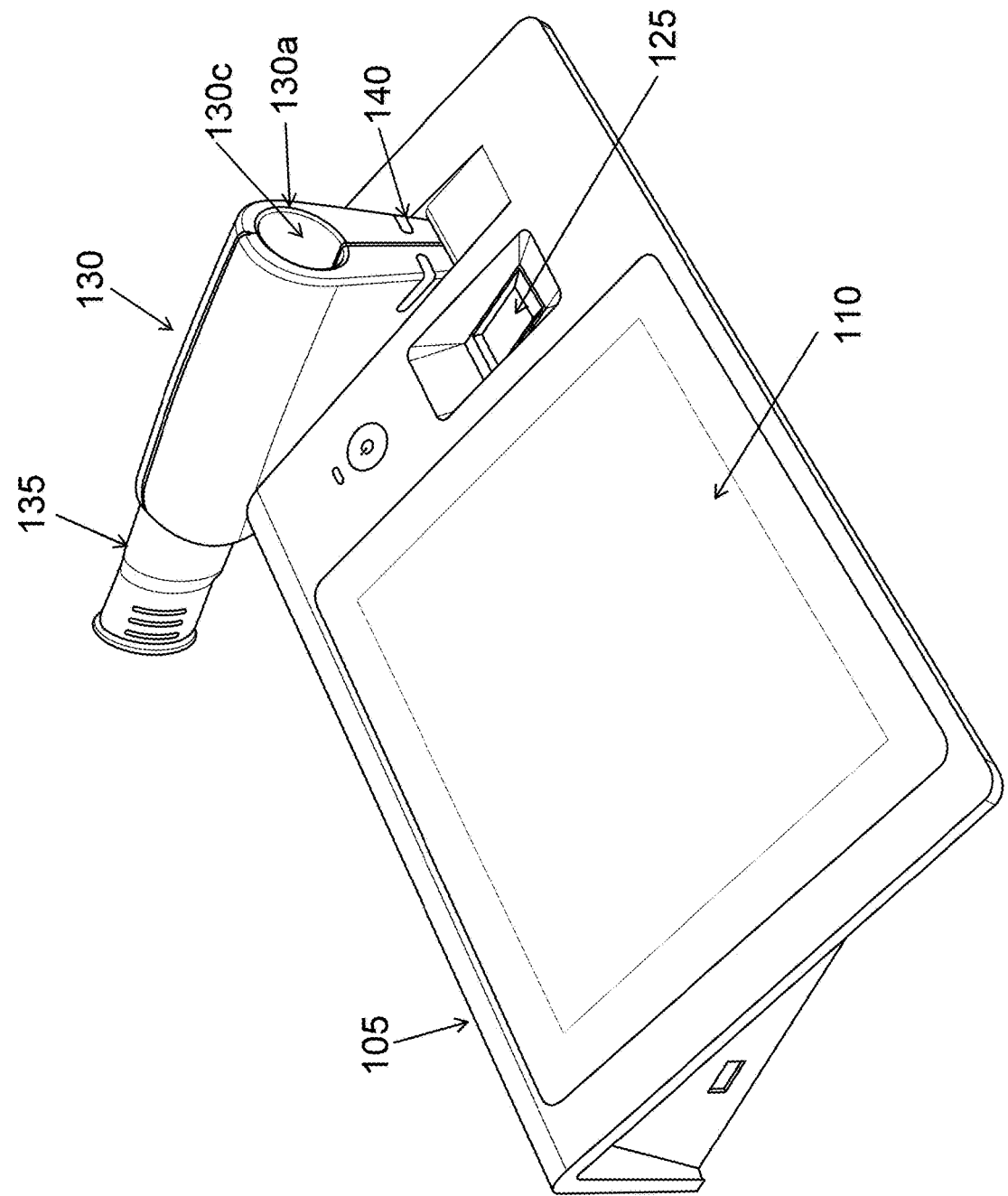
FIG. 15 illustrates a base station comprising a fingerprint sensor with a detection unit inserted in a docking cradle. The detection unit having a mouthpiece.
Figure 16:
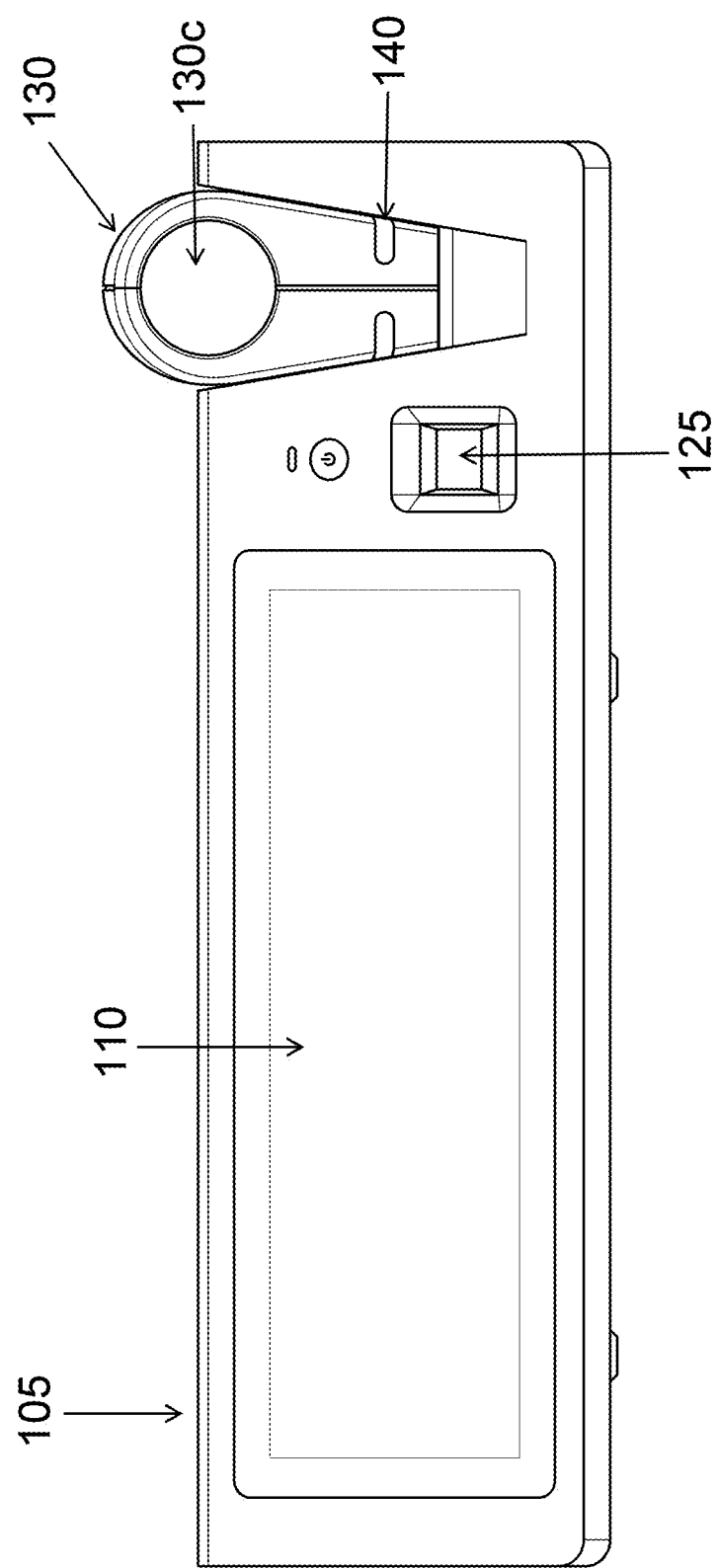
FIG. 16 illustrates a front view of a base station comprising a fingerprint sensor with a detection unit inserted in a docking cradle. The detection unit having a mouthpiece.
Figure 17:
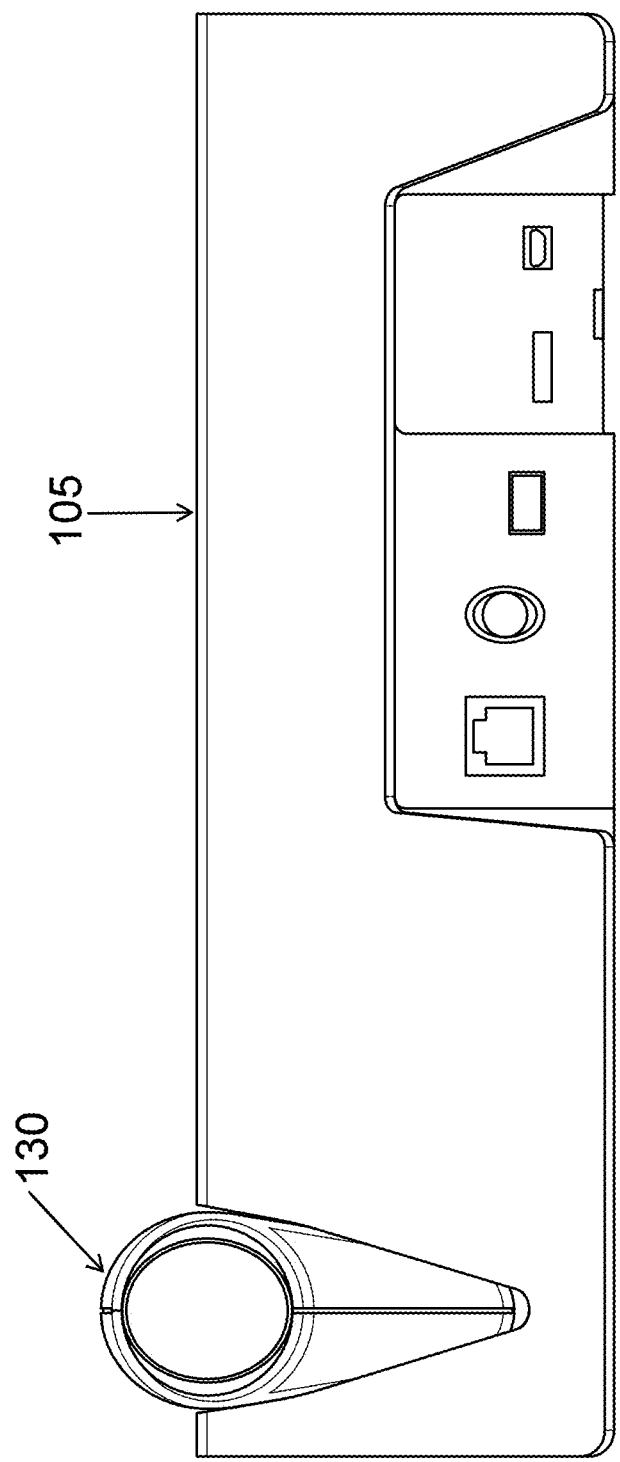
FIG. 17 illustrates a rear view of a base station with a detection unit inserted in a docking cradle. The detection unit having a mouthpiece.
Figure 18:
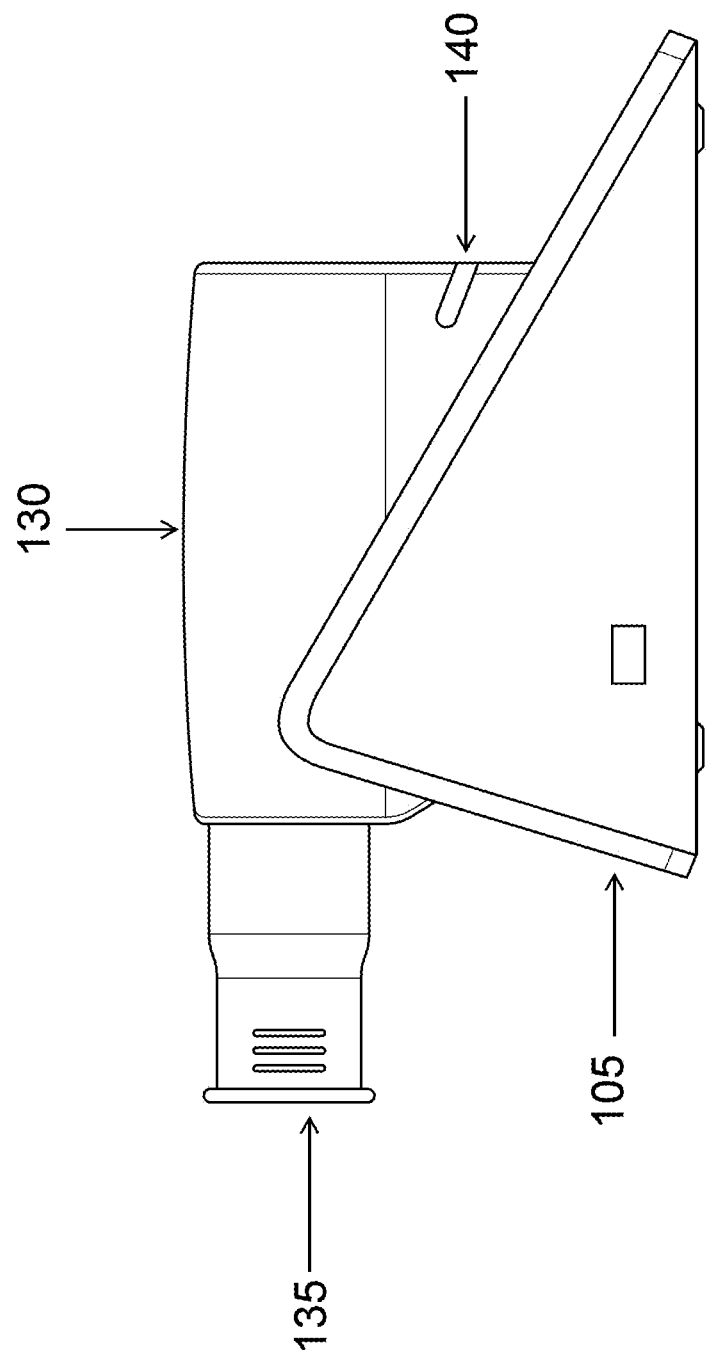
FIG. 18 illustrates a left side view of a base station with a detection unit inserted in a docking cradle. The detection unit having a mouthpiece.
Figure 19:
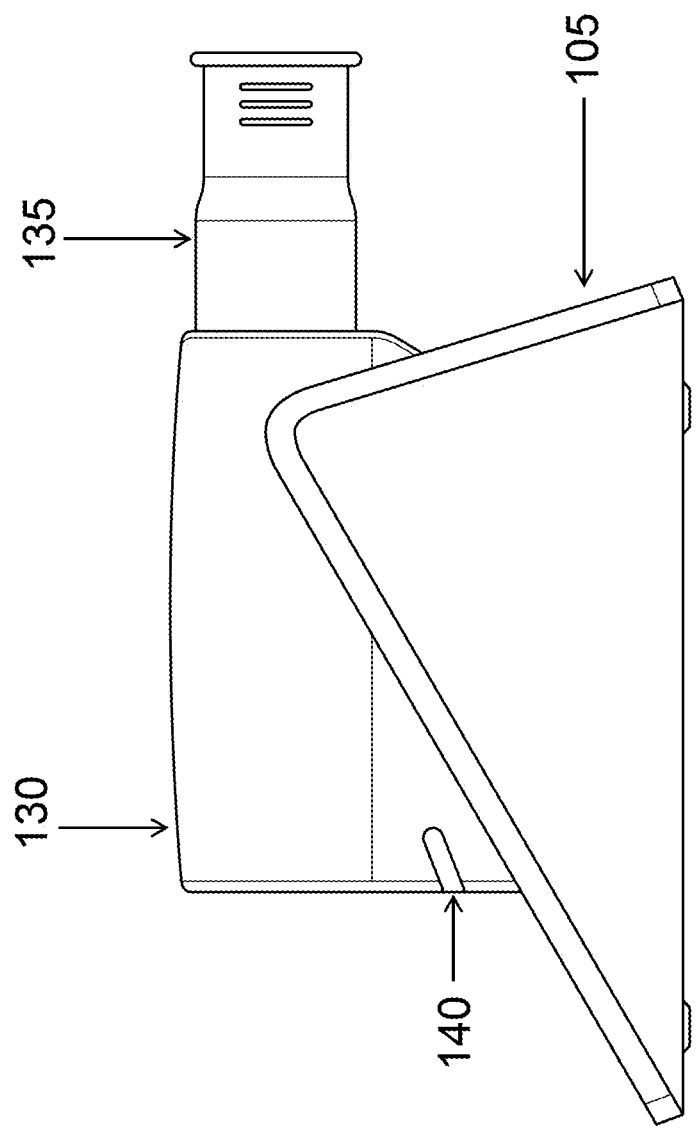
FIG. 19 illustrates a right side view of a base station with a detection unit inserted in a docking cradle. The detection unit having a mouthpiece.
Figure 20:
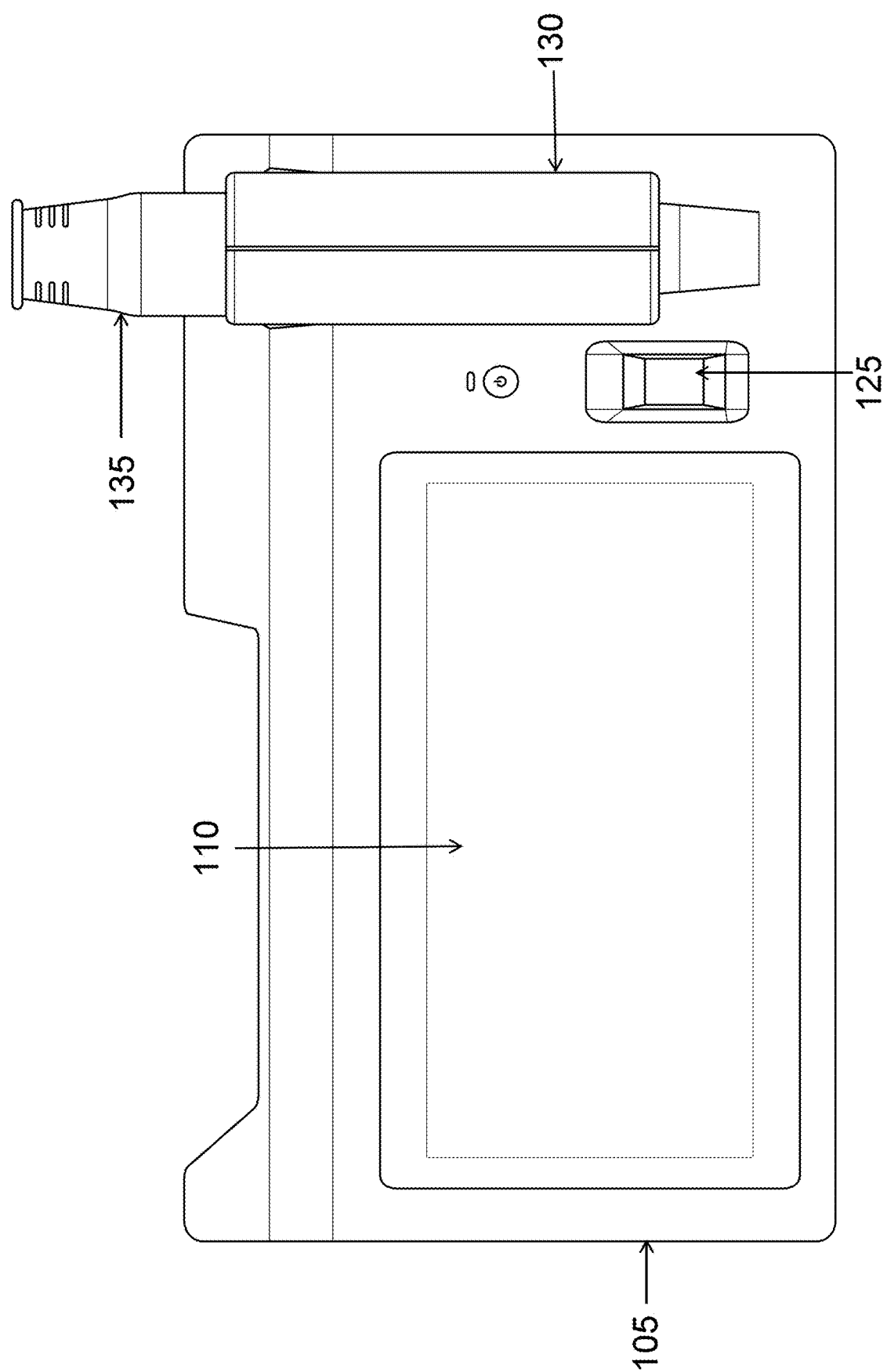
FIG. 20 illustrates a top view of a base station comprising a fingerprint sensor with a detection unit inserted in a docking cradle. The detection unit having a mouthpiece.
Figure 21:
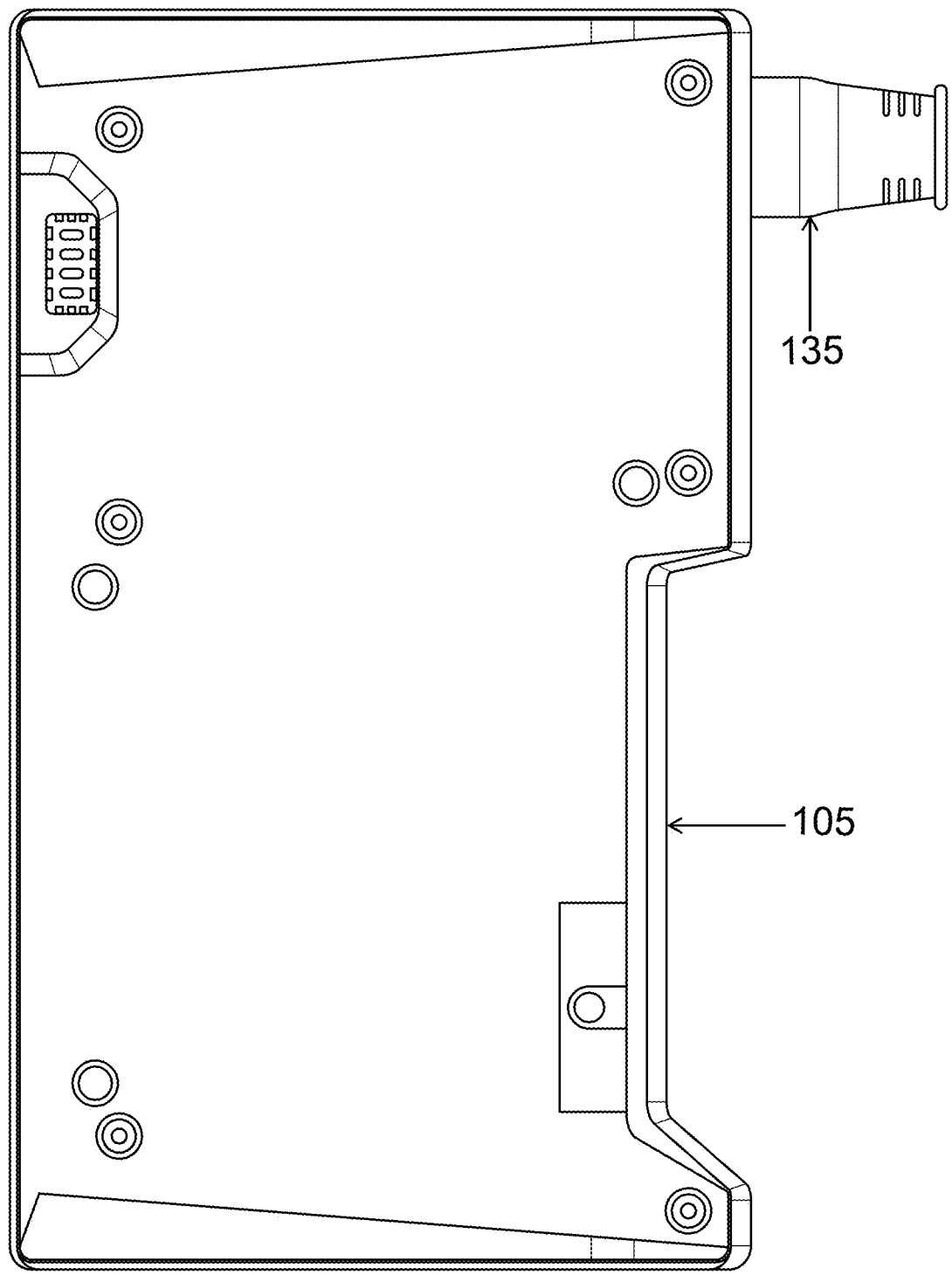
FIG. 21 illustrates a bottom view of a base station with a detection unit inserted in a docking cradle. The detection unit having a mouthpiece.

In some embodiments, a detection unit (130) or a base station (105) can comprise one or more indicator elements (140). Indicator elements (140) can include any mechanical, sound, or light producing component including a vibrator, one or more speakers, bulbs, light emitting diodes (LEDs), or icon displays. One or more indicator elements (140) can be integrated directly into a detection unit (130), as depicted in FIGS. 4A-C. In some embodiments, an indicator element (140) can be configured such that a subject, medical professional or user can monitor an indicator during a test. An indicator element (140) integrated into a base station (105) can be configured to provide feedback to a subject, and/or medical professional and/or a user. One or more indicator elements (140) can be used to coach a subject during a test. In some embodiments, one or more indicator elements (140) can be initiated or activated independently by a detection unit (130). In some embodiments, one or more indicator elements (140) can be initiated by a user at a base station (105). An indicator element (140) can have one or more colors, and a color can be of any frequency within the electromagnetic spectrum including standard colors within the 380 nm-700 nm visible light. Different colors, frequency or intensity of flashing or pattern of flashing can be used to communicate to a subject or a user of a device. In some embodiments, for example, an indicator element (140) of different colors can be used to prompt a subject or user through various actions. For example, a green LED can be used to prompt a subject to begin blowing, while a red LED can be used to prompt a subject to cease blowing. In further embodiments, an indicator element (140) can prompt a subject to perform actions that include any single or combination of inhaling, exhaling, and holding air in lungs. In some embodiments, a number of indicator elements (140) can be present, for example an array of indicator elements (140) can light up sequentially to be used to inform a subject, for example in some instances to track a blow of a subject and notify the subject when the blow is complete. In other instances, indicator elements (140) of different colors can be used, for example a blue LED can be used to inform a subject or user that a detection unit (130) needs to be tilted or repositioned before a test can be performed. In some embodiments, a green LED can be used to indicate to a subject or user that a detection unit (130) component is ready for use. In further embodiments, an indicator element (140) can respond to patient performance during a pulmonary function test; for example, when a subject inhales a sufficient volume, an indicator can flash, produce a sound, and/or vibrate for a predetermined period of time to "coach" a subject through the test. In other embodiments, a subject can be prompted to hold an inspiration of air by, for example, a green LED. A subject can be instructed to hold inspiration of air until a green LED turns off, or another LED such as a red LED turns on.

In other embodiments, a combination of indicator elements (140) can be used in tandem. In some embodiments, a green LED and an audible beep can be used to instruct a patient to begin blowing while a red LED and an audible buzzer can be used to instruct a patient to cease blowing. In some embodiments, a series of LEDs can be arranged such that each LED lights in sequence, e.g., until each one is lit, which can provide an instruction to a subject to both begin and cease blowing into a detection unit. In some embodiments, one more speakers can be used to play an incentive indicator such as a song while a subject blows. This feature can be used in combination with LED lights in order to help coach a subject to blow longer. In some embodiments, an audible signal can be a pre-recorded voice that instructs a subject to begin and cease blowing. This signal can also be accompanied by an additional indicator element (140) such as blinking LED's, additional speakers, or icons.

In some embodiments, one or more indicator elements (140) can be located on a base station (105). In some embodiments, one or more indicator elements (140) can be located on a detection unit (130). In other embodiments, one or more indicator elements (140) can be located both on a base station (105) and a detection unit (130). In some embodiments, both a base station (105) and a detection unit (130) can comprise the same indicator elements (140). In some embodiments, both a detection unit (130) and a base station (105) can comprise LED lights. In some embodiments, both a base station (105) and a detection unit (130) can comprise different indicator elements (140). In some embodiments, LED lights can be located on a detection unit (130) while speakers can be located on a base station (105). In some embodiments, action icons can be present on a base station (105) while LED lights can be arranged on a detection unit (130). In some embodiments, a detection unit (130) can comprise at least 1, at least 2, at least 3, at least 4, at least 5, at least 6, at least 7, at least 8, at least 9, or at least 10 indicator elements (140). In some embodiments, a base station (105) can comprise at least 1, at least 2, at least 3, at least 4, at least 5, at least 6, at least 7, at least 8, at least 9, or at least 10 indicator elements (140).

Base Station

A base station (105) can be configured with a visual display (110). A visual display (110) can be part of an integrated base station, or it can be a separate component. A visual display (110) can be for example, e.g., an organic LED, liquid crystal display (LCD), plasma or cathode ray tube. In some embodiments, a visual display (110) can comprise a touch screen. In some embodiments, a touch screen can allow an operator, user and/or a subject to be able to interact with a visual display (110) directly. In some embodiments, a touch screen can allow an operator, user and/or a subject to manipulate or export a subject's spirogram, compare a spirogram to one or more previous spirograms, or make notes using a touch screen interface. A visual display can have a diameter of at least, at most, or about 1, 2, 3, 4, 5, 6, 7, 8, 9, 10, 11, 12, 13, 14, 15, 16, 17, 18, 19, or 20 inches. In some embodiments, a visual display (110) resolution can be at least 100, 150, 200, 250, 300, 350, 400, 450, 500, 550, 600, 650, 700, 800, 1000, 1200 2000, 3000, or at least 5000 pixels per inch. In some embodiments, an operator, user, and subject can be the same individual. In some embodiments, an operator, user, and subject can be different individuals.

In some embodiments, a spirometer disclosed herein can comprise a backlight: power supply to provide adequate power for a visual display. In some embodiments, a backlight can illuminate a visual display when a spirometer is in use. In some embodiments, a backlight can be turned off in at least 1, 2, 3, 4, 5, 6, 7, 8, 9, 10, 20, 30, 40, 50, 60, 90, 120, 150, 180, 210, 240, 270, or 30 seconds after use of a spirometer. In some embodiments, a backlight can be turned off in a at least 1, 2, 3, 4, 5, 6, 7, 9, 10, 11, 12, 13, 14, 15, 16, 17, 18, 19, 20, 25, 30 or 60 minutes after use of a spirometer.

Figure 25B:
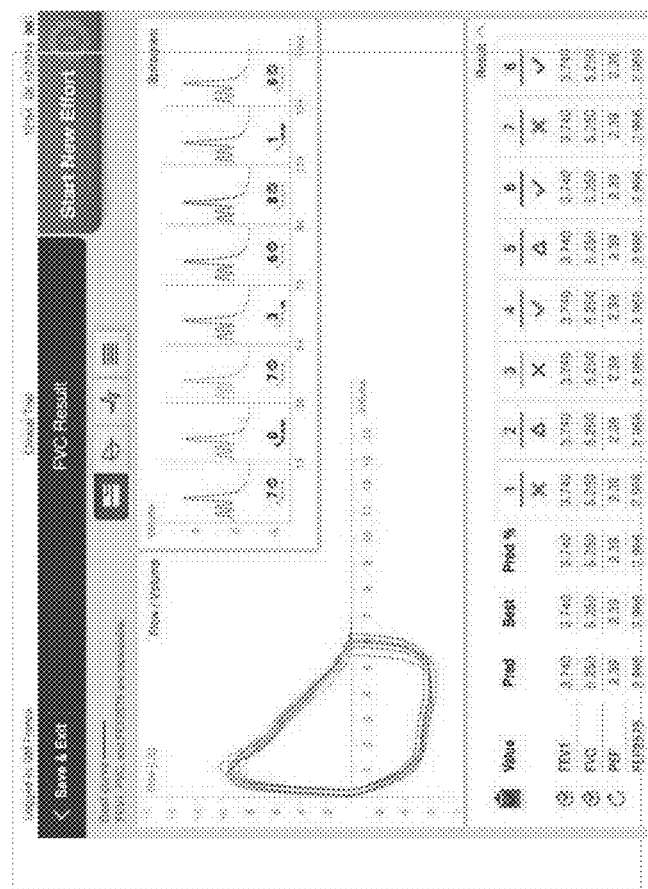
FIG. 25B depicts an example of a graphical display that can be used for the spirometry data.
Figure 25A:
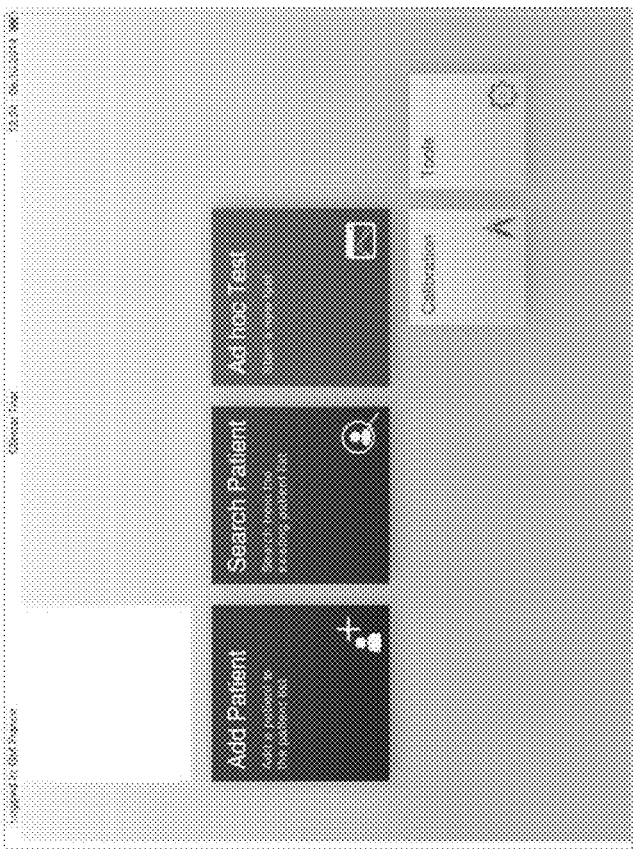
FIG. 25A shows some options available on a home screen of a graphical user interface (GUI).
Figure 26:
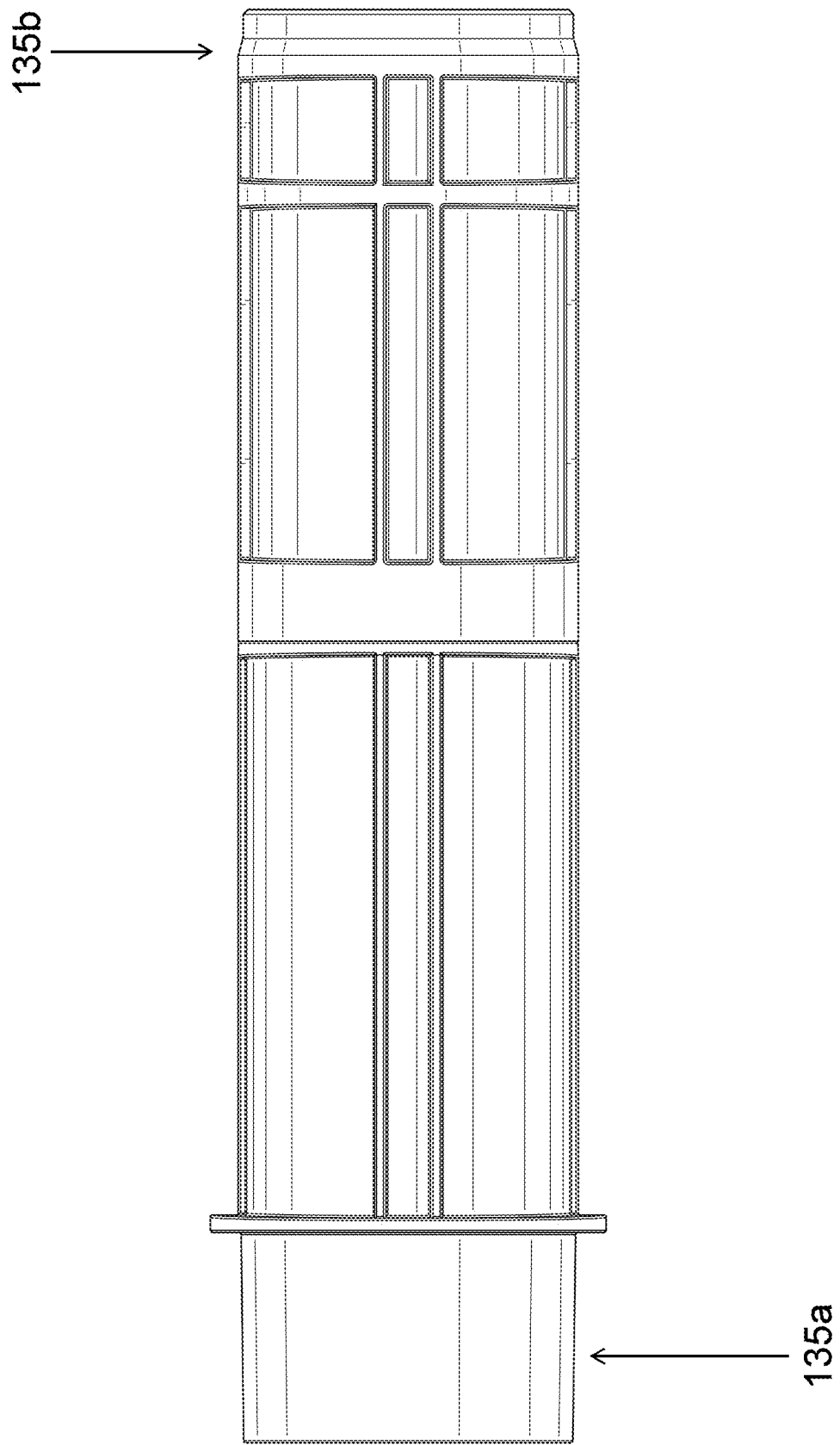
FIG. 26 illustrates a longitudinal view of a mouthpiece.
Figure 27:
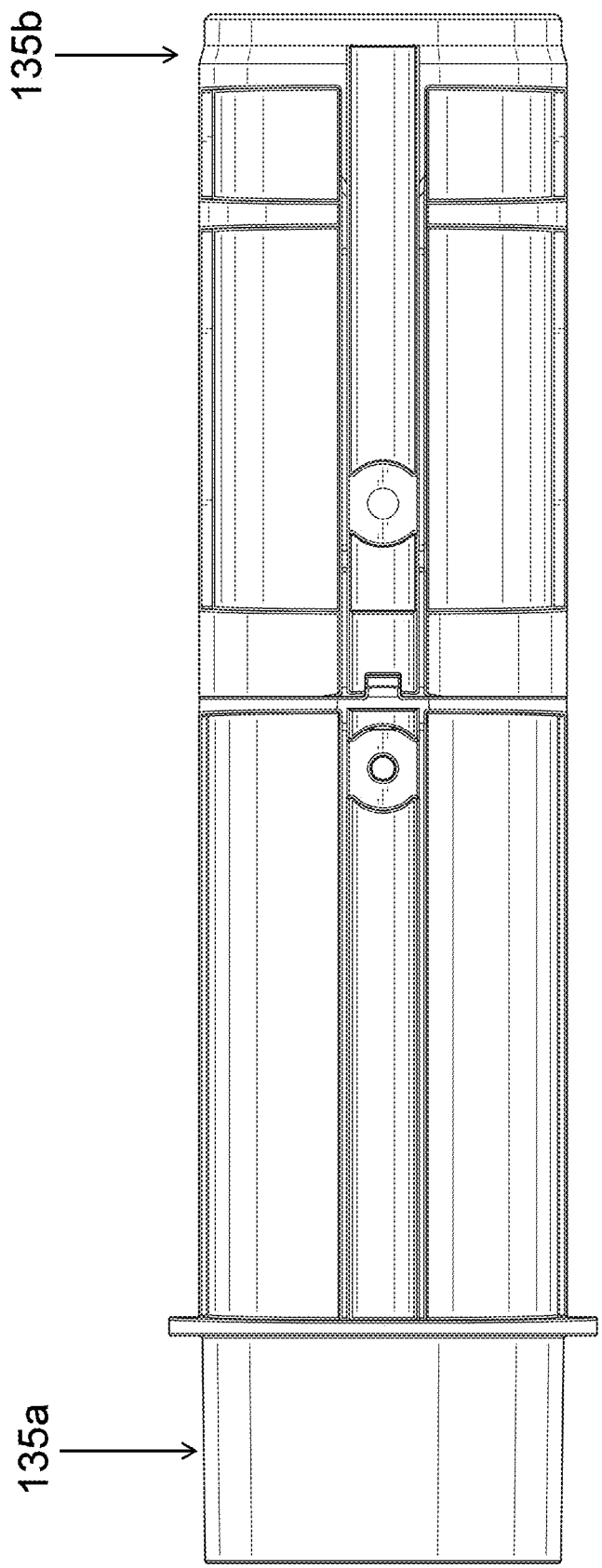
FIG. 27 illustrates a longitudinal view of a mouthpiece.
Figure 28:
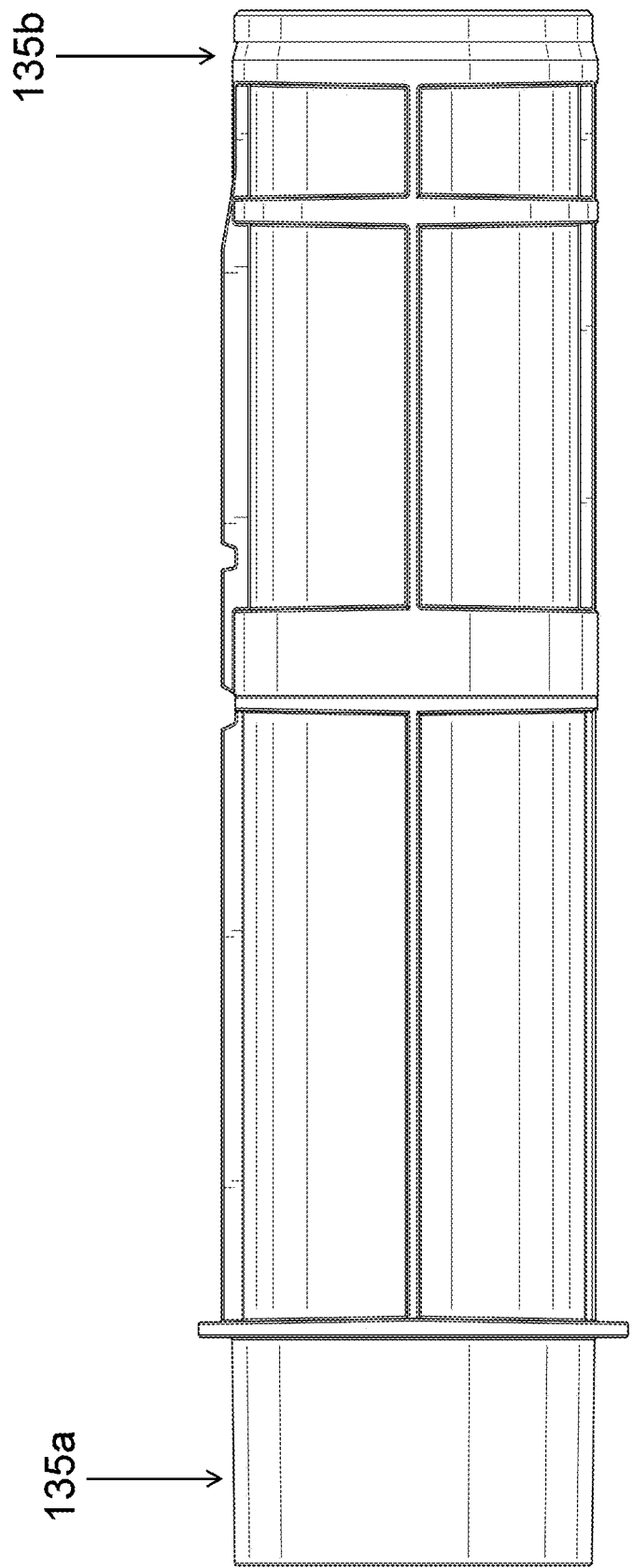
FIG. 28 illustrates a longitudinal view of a mouthpiece.
Figure 29:
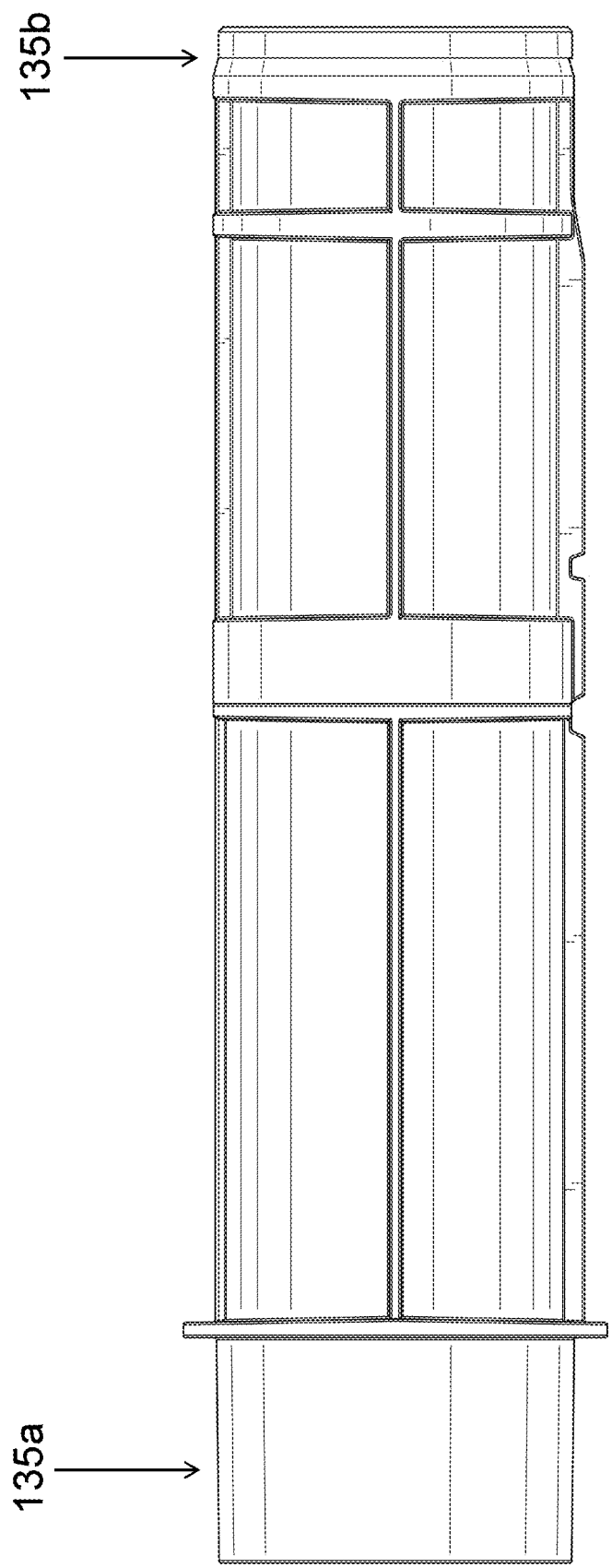
FIG. 29 illustrates a longitudinal view of a mouthpiece.
Figure 30:
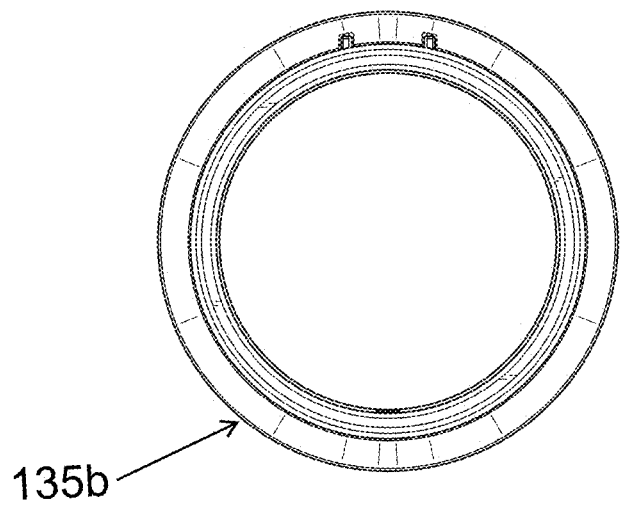
FIG. 30 illustrates a cross sectional view of a mouthpiece.
Figure 31:
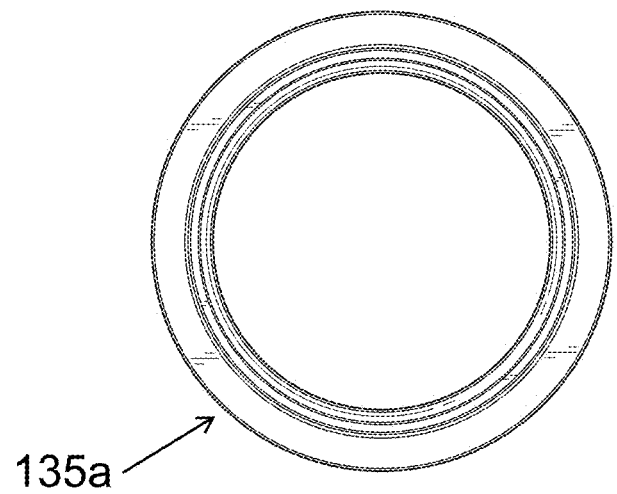
FIG. 31 illustrates a cross sectional view of a mouthpiece.

As shown in FIGS. 25A-25B, spirometry readings and/or spirometric data can be presented on a visual display (110). In some embodiments, a spirometry reading can be presented on a visual display (110) in real time. A visual display (110) can provide a user or subject with feedback. In some embodiments, a user can monitor one or more of an icon, indicator, or other display tools that can inform a user of test validity. In some embodiments, a count of a number of occasions upon which a subject draws a desired volume of air into the lungs can be visually displayed. In some embodiments, spirometry curves can be visible on a visual display (110) while a subject is performing a maneuver. In some embodiments, measurement curves and/or results can be printable.

A base station (105) as disclosed herein can comprise a power source (10501), as in FIG. 24. In some instance, a power source can be a lithium ion battery. In other embodiments, a base station (105) as disclosed herein can comprise a charging transmitter coil. A charging transmitter coil (10502) can charge a detection unit (130) comprising a charging receiver coil (13002) when a detection unit (130) is in close proximity to a base station (105) comprising a charging transmitter coil (10502).

FIG. 24 illustrates a base station (105). A base station (105) can comprise a visual display (110). A visual display (110) can comprise a touchscreen having a front glass (1101) and a display board (10512). A base station (105) can comprise a fingerprint sensor (125). A base station can comprise a top cover (10515) and a bottom cover (10509). A base station can comprise a power button (10504) to power on and off the base station (105). A power button (10504) can have a power button light guide (10505) to illuminate the area around the power button (10504). A power button (10504) can be connected to a power source with a power cable (10508). A base station (105) can comprise a 3G antenna (10506). A 3G antenna (10506) can have a 3G antenna post (10507). A base station (105) can comprise an ambient sensor (10503). An ambient sensor (10503) can be a humidity sensor that can be connected to a humidity sensor cable (10510). A base station (105) can further comprise a speaker (10511) that can provide instructions or feedback to a user or subject. A base station (105) can further comprise a power source (10501), the power source (10501) can be a lithium ion battery. A power source can be encased in a battery compartment case A (10513) and battery compartment case B (10514). A base station (105) can comprise a charging transmitter coil (10502). A charging transmitter coil (10502) can charge a detection unit (130) power source (13001) when a charging transmitter coil (10502) is in close proximity with a charging receiver coil (13002).

In some instances a detection unit (130) and/or a base station (105) can have one or more indicator elements (140), icons or other mechanisms of providing feedback to inform a user or subject of a variety of testing errors. Testing errors can include one or more the following: submaximal inhalation, excessive extrapolated volume, sub-maximal blast, cough within a first second, early termination, variable subject effort, cessation of airflow from glottis closure or breath holding, partially obstructed mouthpiece, leak, extra breaths, positive zero-flow error, negative zero-flow error, or a combination thereof. In some embodiments, a testing error can be displayed on a visual display (110).

In some embodiments, once raw spirometry data is transferred to a base station, several processing steps can be completed before results are obtained and/or displayed. These steps can include sensor zero-flow correction (zero flow drift correction), temperature correction, and quality assessment. In some embodiments, zero flow correction can comprise compensating for changes in a zero flow sensor signal level. For example, by changing an average value of an added signal in an opposite direction to drift of a zero flow sensor signal level, a drift may be corrected.

In some embodiments, a detection unit (130) and/or base station (105) can be integrated for use with any wireless or mobile technology platforms including smartphones, tablets, apps, or for use with a third party devices.

In some embodiments, a base station (105) can comprise an application to process and transmit spirometric data. In some embodiments, spirometric data can comprise all data related to data obtained by a detection unit (130). In some embodiments, an application can be installed onto a base station (105) prior to use. In some embodiments, an application can be pre-installed onto a base station (105). In some embodiments, an application can be used to manipulate patient data using a touch screen interface. In some embodiments, an application can be capable of displaying pulmonary function variables described herein. In some embodiments, an application can be capable of exporting patient data to a cloud-based storage service.

Biometric Sensor

A spirometer described herein can comprise at least one biometric sensor. A biometric sensor can be used to user-authenticate functions of a spirometer, and/or can be used to identify an individual prior to, during or after a use of a detection unit (130) and/or a base station (105).

In some embodiments, a biometric sensor can be a fingerprint sensor (125). Any type of fingerprint sensor (125) known in the art can be used. In some embodiments, a fingerprint sensor (125) can be a capacitive sensor. A capacitive sensor can use array capacitor plates to image a fingerprint. A sensor can measure capacitive coupling of skin of a fingertip as a subject or user's fingerprint is swiped or place over or on a fingerprint sensor. Because ridges of a fingertip can be closer to a detector when swiped, ridges can have a higher capacitance relative to valleys of a fingertip. In some embodiments, a capacitive sensor can apply a small voltage to a finger to enhance a signal and thereby provide a more accurate capacitive image of a fingertip.

In some embodiments, a fingerprint sensor (125) can be an optical sensor. In such an embodiment, a detector can convert energy in light incidence on a detector into an electrical charge. In some embodiments, a detector can be a photodiode array detector. In other embodiments, a detector can be a phototransistor detector. In some embodiments, a sensor can comprise an LED to illuminate a finger and thereby provide a more accurate optical image of a fingertip. In some embodiments, an optical sensor can be a charge-coupled-device based optical imager. In other embodiments, an optical sensor can be a complementary metal-oxide-semiconductor (CMOS)-based optical imager. In some embodiments, a fingerprint sensor (125) can be a thermal sensor. In some embodiments, an individual's finger can be placed on a sensor, where a sensor can comprise a pyro-electric material. A pyro-electric material can then measure a contact temperature of a finger. Ridges of a finger, which can make contact with a pyro-electric material, can be imaged while valleys, which in some cases do not make contact with a pyro-electric material, may not be imaged. A temperature differential between ridges and valleys of a fingertip can be used to create a thermal image of the fingertip.

In some embodiments, a fingerprint sensor (125) can be a pressure sensor. In such an embodiment, a fingerprint can be imaged through physical contact of an individual's fingertip with a thin film in which a physical impression of a fingertip can be recorded. In some embodiments, a pressure sensor can be a conductive film detector. In some embodiments, a sensor can comprise a double-layer electrode on flexible films. In some embodiments, a pressure sensor can be a micro-electro-mechanical device. In some embodiments, a sensor can comprise tiny silicon switches on a silicon chip such that when a fingerprint ridge touches a switch, a switch closes and a ridge can be detected electronically.

In some embodiments, a fingerprint sensor (125) can be a radio frequency (RF) sensor. A low frequency RF signal can be applied to an individual's fingertip. A signal can then be read by a detector array, with each pixel operating like a tiny antenna. This detector array can then be used to provide an image of a fingertip contours pixel by pixel. In some embodiments, a fingerprint sensor (125) can be an ultrasonic sensor. In some embodiments, a sensor uses sound waves to penetrate a surface layer of a skin, which can provide a 3 dimensional image of an individual's fingerprint from the inside out. In some embodiments, an ultrasonic sensor can comprise steel, sapphire, glass or plastic. In some embodiments, any of the fingerprint sensors (125) described above can be employed as a static fingerprint sensor (125). In some embodiments, an individual's finger can be placed motionless on a surface prior to collecting an image. In other embodiments, any of the fingerprint sensors (125) described above can be employed as a swipe fingerprint reader, in which an individual's finger can be dragged across a sensor, and a complete image can be put together by appending partial images of a finger together.

In some embodiments, a biometric sensor can be a retinal scanner. In some embodiments, a biometric sensor can be a facial recognition scanner. In some embodiments, a retinal scanner can comprise a small camera used to capture images of an individual's retina. In some embodiments, a retinal scanner can comprise an infrared light source used to illuminate a retina. In some embodiments, an individual can position his or her eye proximal to a lens of a retinal sensor prior to use. In some embodiments, an infrared light can illuminate an individual's retina, and a camera can then scan a retina of an individual. A sensor can capture and analyze patterns of blood vessels on a thin nerve on a back of an eyeball that processes light. This pattern of blood vessels can be unique among individuals, allowing for accurate identification of an individual.

In some embodiments, an individual can be enrolled during an initial scan. In some embodiments, a first biometric sensor can be used to obtain an individual's biometric information during enrollment. In some embodiments, biometric information obtained during enrollment can be stored on a base station (105) or on a server. In other embodiments, biometric information can be stored in a cloud-based storage system. After enrollment, biometric information can be compared to biometric data captured during enrollment, which can be used to accurately identify an individual. The term "enrolled" as used herein can mean that an individual's biometric data can be collected and stored for future authentication. During enrollment, multiple scans of an individual's retina can be collected from various angles. In some embodiments, images can be stored in a computer storage system comprised in a base station (105). In other embodiments, images can be stored in a cloud-based storage system. After enrollment, subsequent retinal scans cam be compared to scans captured during enrollment, which can be used to accurately identify an individual.

In some embodiments, a biometric sensor can be a voice recognition sensor. A voice recognition sensor can comprise a microphone capable of recording and analyzing an individual's voice. In some embodiments, a base station (105) can comprise a microphone to record and interpret an individual's voice. In other embodiments, a detection unit (130) can comprise a microphone to record and interpret an individual's voice. A digital profile of an individual's voice can be recorded by having an individual speak. A spoken word can then be converted into segments composed of several dominant frequencies, which can be used to construct a digital profile of an individual's voice. In some embodiments, an individual can be instructed to recite an alphabet. In other embodiments, an individual can be instructed to recite a series of numbers. In other embodiments, an individual can be instructed to recite a predetermined series of words. In other embodiments, an individual can be given a unique password to recite, which can be used in subsequent authentication sessions to positively identify an individual.

In some embodiments, one or more biometric sensors described herein can be integrated into a base station (105). These biometric sensors can be electronically connected to a visual display (110). In this configuration, a biometric sensor can send an electrical signal to a visual display (110) after being engaged by an individual. In some embodiments, an electrical signal can cause a visual image to appear on a visual display (110). For example, a retinal scanner can send an electronic signal to a visual display (110) when a retinal scan matches a retinal scan enrolled in a database, and a visual display (110) can then display a picture of an individual as an additional identification check. In other embodiments, a biometric sensor can be electronically connected to one or more indicator elements (140). For example, a fingerprint sensor (125) can send an electronic signal to an audible source when a collected fingerprint image matches an image for an individual in a database, and an audible source can then emit a sound indicating a successful match. In some embodiments, a base station (105) can comprise at least 1, at least 2, at least 3, at least 4, or at least 5 biometric sensors. In some embodiments, at least 1 biometric sensor can be located between a visual display (110) and a docking cradle (120). In other embodiments, at least 1 biometric sensor can be located beneath a docking cradle (120). In some embodiments, at least 1 biometric sensor can be located above or below a visual display (110). In other embodiments, at least 1 biometric sensor can be located on a side or rear face of a base station (105).

In some embodiments, one or more biometric sensors can be integrated into a detection unit (130). In other embodiments, a biometric sensor can be electronically connected to one or more indicator elements (140) on a detection unit (130). For example, a fingerprint sensor (125) can send an electronic signal to a vibrating element indicating successful capture of a fingerprint image, which can cause a vibrating element to vibrate. In some embodiments, a detection unit (130) can comprise at least 1, at least 2, at least 3, at least 4, or at least 5 biometric sensors. In some embodiments, at least 1 biometric sensor can be located along an outer cylindrical wall of a detection unit (130). For example, a fingerprint sensor (125) can be positioned along a cylindrical wall such that a fingerprint sensor (125) can be engaged by an individual's fingers when a detection unit (130) can be gripped by an individual. In another embodiment, a biometric sensor can be attached to a top portion of a detection unit (130) and oriented in the direction of a mouthpiece (135). In some embodiment, the orientation of a biometric sensor can allow for simultaneous collection of biometric information while a patient is engaged in blowing into a mouthpiece (135) of a detection unit (130).

In some embodiments, both a detection unit (130) and a base station (105) can comprise one or more integrated biometric sensors. For example, a detection unit (130) can comprise a fingerprint scanner along a cylindrical wall while a base station (105) can comprise a voice recognition sensor. For example, both a detection unit (130) and a base station (105) can comprise a fingerprint scanner. This example can allow for a patient to biometrically authenticate while holding a detection unit (130) and a physician or medical profession to separately biometrically authenticate into a base station (105).

In some embodiments, at least one biometric sensor can be separate from either a base station (105) or a detection unit (130). In such an embodiment, biometric sensors can be connected modularly to either a base station (105) or a detection unit (130). In some embodiments, at least 1 biometric sensor can be connected to a base station (105) via a Universal Serial Bus (USB) connection. In other embodiments, at least 1 biometric sensor can be connected to a base station (105) via a coaxial cable connection. In other embodiments, at least 1 biometric sensor can be connected to a base station (105) via an Ethernet cable such as a Cat5 or Cat6 cable. In other embodiments, at least 1 biometric sensor can be connected to a base station (105) via a fiber optic cable. In some embodiments, at least 1 biometric sensor can be wirelessly connected to a base station (105) via a Wi-Fi connection. In other embodiments, at least 1 biometric sensor can be connected to a base station (105) via a mobile data signal such as a 3G or 4G LTE data signal. In other embodiments, at least 1 biometric sensor can be connected to a base station (105) via a Bluetooth signal. In some embodiments, at least 1 biometric sensor can be connected to a detection unit (130) via a Universal Serial Bus (USB) connection. In other embodiments, at least 1 biometric sensor can be connected to a detection unit (130) via a coaxial cable connection. In other embodiments, at least 1 biometric sensor can be connected to a detection unit (130) via an Ethernet cable such as a Cat5 or Cat6 cable. In other embodiments, at least 1 biometric sensor can be connected to a detection unit (130) via a fiber optic cable. In some embodiments, at least 1 biometric sensor can be wirelessly connected to a detection unit (130) via a Wi-Fi connection. In other embodiments, at least 1 biometric sensor can be connected to the detection unit (130) via a mobile data signal such as a 3G or 4G LTE data signal. In other embodiments, at least 1 biometric sensor can be connected to a detection unit (130) via a Bluetooth signal.

Biometrically-Controlled Access

In some embodiments, biometric authentication by an individual can be necessary for operation of certain functions of a spirometer provided herein. In some embodiments, authentication by a patient can be necessary for a spirometer to function. For example, a patient can perform a fingerprint scan on a detection unit (130) prior to blowing air into a mouthpiece (135) for a patient's airflow to be calculated. In another example, a patient can perform both a fingerprint scan on a base station (105) and a voice recognition scan on a detection unit (130) prior to blowing air into a mouthpiece (135) for a patient's airflow to be calculated. In some embodiments, a user can be a healthcare provider. A healthcare provider can first biometrically authenticate prior to use of a spirometer by a patient. In some embodiments, a healthcare provider and a patient can both biometrically authenticate prior to a patient using a spirometer. In some embodiments, a law enforcement official can biometrically authenticate prior to use of a spirometer by another individual. In some embodiments, a law enforcement official and a second individual can both biometrically authenticate prior to a second individual using a spirometer.

In some embodiments, access to the use of certain features of a spirometer described herein can be biometrically restricted to certain individuals. Spirometers provided herein can be configured to allow defined rights to certain individuals based on the use of a spirometer. For example, a patient may only have the ability to activate and use a spirometer after biometric authentication while a healthcare provider may have additional abilities after biometric authentication such as an ability to review patient information, transmit patient data, etc. Additionally, a patient may only have an ability to view and manage his or her own patient records after biometric authentication while a healthcare provider may have an ability to review all patient records collected by a spirometer. In some embodiments, biometric authentication can be used to access database servers either locally or cloud-based. This integration can be used to eliminate the need for a separate database authentication, thereby providing a user-friendly interface.

Figure 22:
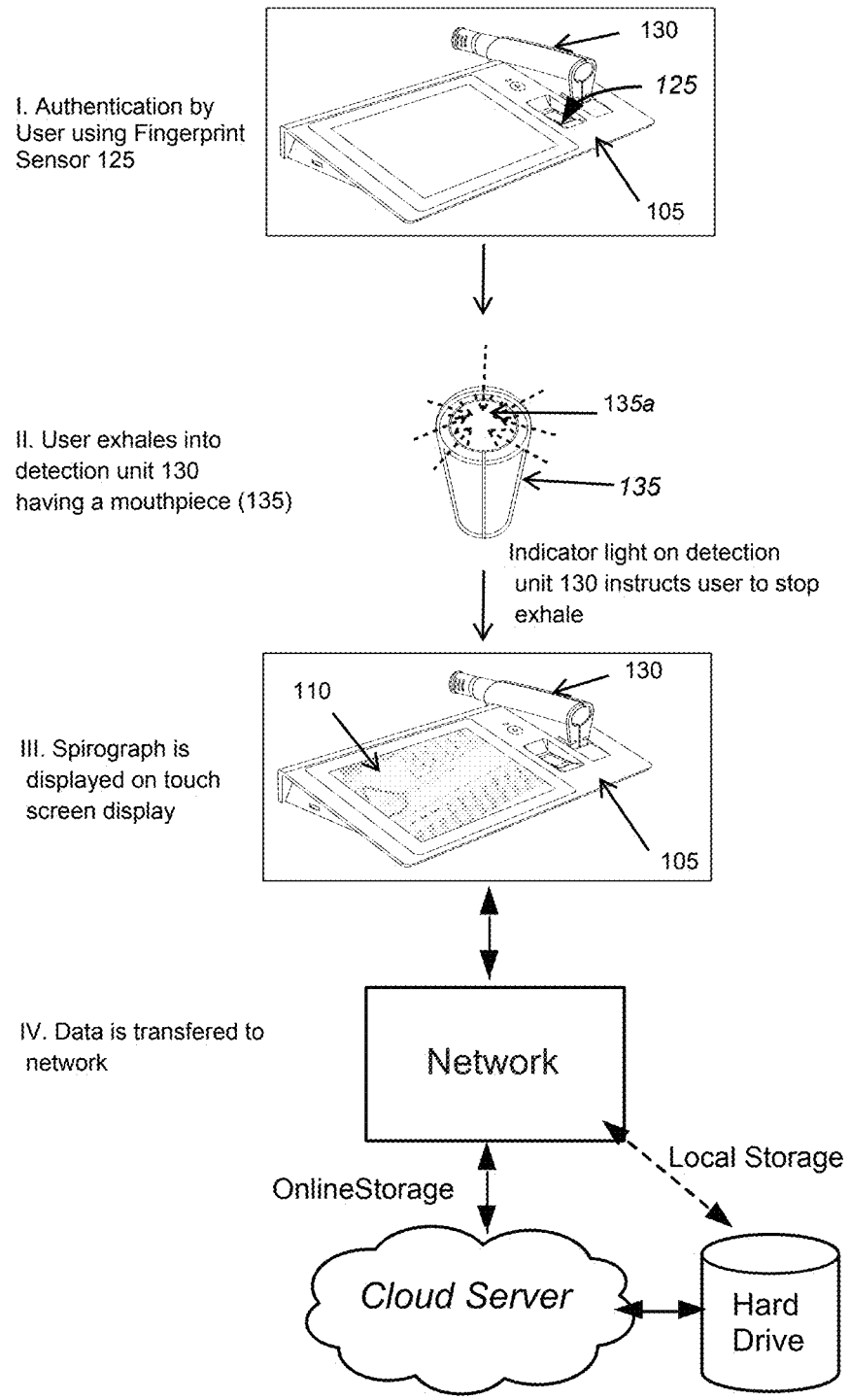
FIG. 22 illustrates a user activated workflow.
Figure 32:
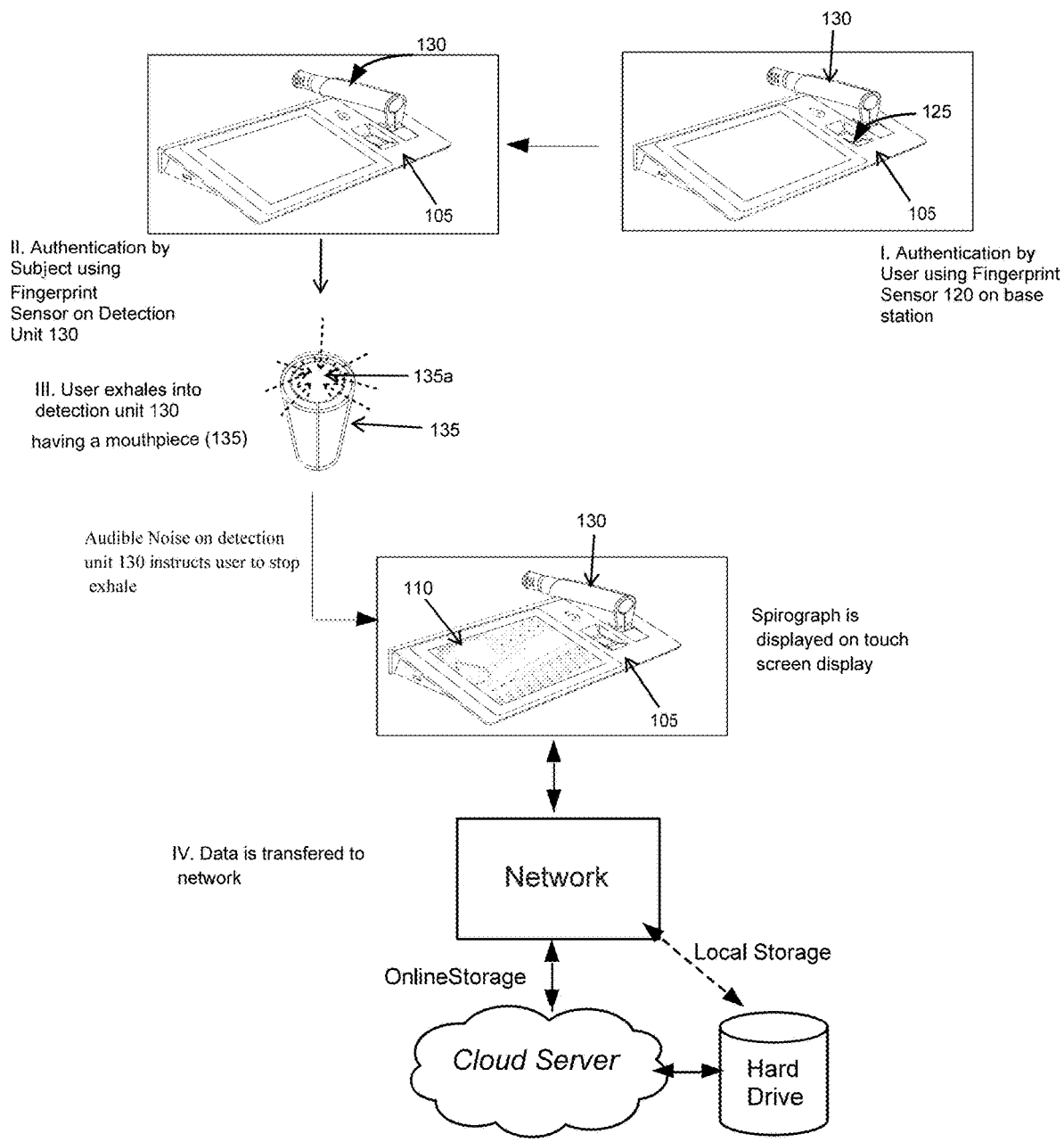
FIG. 32 illustrates a user and subject activated workflow.

FIGS. 22 and 32 depict exemplary workflows utilizing biometric authentication. FIG. 22 shows a single user experiment in which a user and a subject can be the same individual. The user can biometrically authenticate by swiping a fingerprint over a fingerprint sensor (125), which can be located on a base station (105). After authentication, a user can exhale into a mouthpiece (135) wirelessly connected to a base station (105) through a first end of a mouthpiece connected to a detection unit (130) until prompted by an indicator light to cease exhalation. A spirograph can be displayed on a touch screen visual display (110) on base station (105). Upon review, a user can export data locally to a local storage, such as a hard drive; or can export data to a cloud based storage server.

FIG. 32 illustrates a single user, single subject experiment in which a user and a subject can be different individuals. The user can biometrically authenticate by swiping a fingerprint over a fingerprint sensor (125), which can be located on a base station (105). After the user authentication, a subject can authenticate using a fingerprint sensor (125) located on detection unit (130). A subject can exhale into a mouthpiece (135) connected to a detection unit (130) that is wirelessly connected to a base station (105) until prompted by an audible noise to cease exhalation. A spirograph can be displayed on a touch screen visual display (110) on base station (105). Upon review, a user can export data locally to a local storage, such as a hard drive; or can export data to a cloud based storage server. As described above, a workflow as depicted in FIG. 32 can provide enhanced security by restricting access to certain functionalities to a user, and by confirming an identity of a subject prior to the experiment.

Patient data collected via a spirometer described herein can be secured using biometric authentication as described herein. In some cases, collection, back-up and/or security of the patient data can be performed in compliance with HIPAA regulations. In some cases, collection, back-up, and/or security of the patient data can be performed in compliance with FDA regulations.

Data Storage

Data collected from individuals using or who have used a spirometer can be stored through a variety of different mediums. In some embodiments, an integrated hard drive can be used to store data. In some embodiments, an integrated hard drive can be electronically connected to a base station (105). In some specific embodiments, an integrated hard drive can be a solid state hard drive. In some embodiments, an integrated hard drive can be a SATA hard drive. In some embodiments, a hard drive can be an eSATA hard drive. In some embodiments, an integrated hard drive can be removed from a base station (105).

In some embodiments, an external hard drive can be used to store data. In some embodiments, an external hard drive can be connected to a base station (105). In some embodiments, an external hard drive can be connected using a USB connection. In some embodiments, a USB connection can be a USB 2.0 connection. In some embodiments, a USB connection can be a USB 3.0 connection. In some embodiments, an external hard drive can be a solid state hard drive. In some embodiments, a base station can comprise an SD card slot. In some embodiments, data can be stored on an SD card.

In some embodiments, a removable storage medium can be used to store data. In some embodiments, a removable storage medium can be a USB flash drive, e.g., in which a USB flash drive can be electronically connected to a base station (105) via a USB port. In some embodiments, a removable storage medium can be a memory stick. In such an embodiment, a memory stick can be electronically connected to a base station (105) via a memory stick adapter. In some embodiments, a removable storage media can be a compact disk (CD). In some specific embodiments, a CD can be a DVD or Blu-ray disk, e.g., a CD writer can be electronically connected to a base station (105) via a USB port.

In some embodiments, data can be stored wirelessly. In some embodiments, data can be stored on a wireless hard drive. In some embodiments, data can be stored on a network-attached storage (NAS). In some embodiments, data can be stored using a cloud-based storage service. In some embodiments, spirometric data can be transmitted to one or more servers, databases, storage units including network attached storage units, volumes, or any combination thereof.

Multiple Detection Units

In some embodiments, a base station (105) can be in communication with one or more detection units (130) at the same time. In some embodiments, a base station (105) can be in communication with at least 1, at least 2, at least 3, at least 4, or at least 5 detection units (130). In some embodiments, each detection unit can comprise multiple different biometric sensors such as those described above. In some embodiments, each detection unit can comprise multiple air flow sensors such as those described above. In some embodiments, detection units (130) can be electronically connected to a base station (105) using a USB connection. In some embodiments, detection units (130) can be electronically connected to a base station (105) using a coaxial cable. In some embodiments, detection units (130) can be connected to a base station (105) using a fiber optic cable. In some embodiments, detection units (130) can be connected to a base station (105) through a wireless connection. In some embodiments, a wireless connection can be a mobile data signal. In some specific embodiments, a mobile data signal can be a 3G or 4G LTE signal. In some embodiments, a wireless connection can be a Wi-Fi connection. In some embodiments, a wireless connection can be a Bluetooth connection.

In some embodiments, multiple detection units can be paired with a base station prior to use. In some embodiments, a pairing can be carried out by docking a detection unit (130) onto a docking cradle (120) on a base station (105). In some embodiments, a base station (105) can comprise multiple docking cradles (120) to dock multiple detection units (130). In some embodiments, a base station (105) can comprise at least 1, at least 2, at least 3, at least 4, or at least 5 docking cradles (120).

In some embodiments, physical contact of a detection unit (130) to any surface of a base station (105) can be used to pair a detection unit (130) to a base station (105) though a use of a proximity sensor as described above. In some embodiments, a detection unit (130) can be pair with a base station (105) when it is at a distance of at least, at most, or about 1 cm away, at least at most, or about 2 cm away, at least at most, or about 5 cm away, at least at most, or about 10 cm away, at least at most, or about 15 cm away, at least at most, or about 20 cm away, at least at most, or about 25 cm away, at least at most, or about 50 cm away, at least at most, or about 75 cm away, at least at most, or about 100 cm away, at least at most, or about 150 cm away, at least at most, or about 200 cm away, at least at most, or about 250 cm away, at least at most, or about 300 cm away, at least at most, or about 350 cm away, at least at most, or about 400 cm away, at least at most, or about 450 cm away, at least at most, or about 500 cm away, at least at most, or about 600 cm away, at least at most, or about 700 cm away, at least at most, or about 800 cm away, at least at most, or about 900 cm away, at least at most, or about 1,000 cm away, at least at most, or about 1,100 cm away, at least at most, or about 1,200 cm away, at least at most, or about 1,300 cm away, at least at most, or about 1,400 cm away, at least at most, or about 1,500 cm away, at least at most, or about 1,750 cm away, at least at most, or about 2,000 cm away, at least at most, or about 2,250 cm away, at least at most, or about 2,500 cm away, at least at most, or about 2,750 cm away, at least at most, or about 3,000 cm away, at least at most, or about 5 m away, at least at most, or about 10 m away, at least at most, or about 50 m away, or at least at most, or about 100 m away from a base station (105). In some embodiments, a detection unit (130) can be paired with a base station (105) when it is at a distance of 0 to about 100 m away, 0 to about 50 m away, 0 to about 25 m away, 0 to about 10 m away, about 1 cm to about 5,000 cm away, about 1 cm to about 4,000 cm away, about 1 cm to about 3,000 cm away, about 1 cm to about 2,000 cm away, about 1 cm to about 1,000 cm away, about 1 cm to about 500 cm away, about 1 cm to about 250 cm away, about 1 cm to about 200 cm away, about 1 cm to about 150 cm away, about 1 cm to about 100 cm away, about 1 cm to about 50 cm away, about 1 cm to about 25 cm away, about 1 cm to about 20 cm away, about 1 cm to about 15 cm away, about 1 cm to about 10 cm away, or about 1 cm to about 5 cm away from a base station (105).

In some embodiments, pairing a detection unit (130) with a base station (105) can produce a visual indication on either a detection unit (130) or base station (105) though a use of indicator elements (140) such as LEDs as described above. In some embodiments, pairing a detection unit (130) with a base station (105) can produce an audio indication on either a detection unit (130) or base station (105) though a use of indicator elements (140) such an audible source as described above.

Power Supply

In some embodiments, a base station (105) can comprise a power supply unit. A power supply unit can be capable of converting AC current into low-voltage regulated DC power for internal components of a base station (105). In some embodiments, a power supply unit can be a universal power supply (e.g. 110V 50/60 Hz). In some embodiments, a power supply unit can be an original IBM power supply unit. In other embodiments, a power supply unit can be an ATX standard power supply unit. In some embodiments, an ATX standard supply unit can be an ATX12V standard power supply unit.

In some embodiments, a detection unit (130) can comprise at least one battery. In some embodiments, a base station (105) can comprise at least one battery. In some embodiments, both a base station (105) and a detection unit (130) can comprise at least one battery. In some embodiments, a battery can be a cylindrical cell battery. In some embodiments, a cylindrical cell battery can be an AAA battery. In some embodiments, a cylindrical cell battery can be an AA battery. In some embodiments, a cylindrical cell battery can be a C battery. In some embodiments, a cylindrical cell battery can be a D battery. In some embodiments, a battery can be a non-cylindrical cell battery. In some embodiments, a non-cylindrical battery can be a 4.5-volt battery. In some embodiments, a non-cylindrical battery can be a 9-volt battery. In some embodiments, a non-cylindrical battery can be a 6-volt lantern battery. In some embodiments, a non-cylindrical battery can be a coin-type battery. In some embodiments, a coin-type battery can be a CR927 battery. In some embodiments, a coin-type battery can be a CR1216 battery. In some embodiments, a coin-type battery can be a CR1220 battery. In some embodiments, a coin-type battery can be a CR1225 battery. In some embodiments, a coin-type battery can be a CR1616 battery. In some embodiments, a coin-type battery can be a CR1620 battery. In some embodiments, a coin-type battery can be a CR2016 battery. In some embodiments, a coin-type battery can be a CR2025 battery. In some embodiments, a coin-type battery can be a CR2032 battery. In some embodiments, a coin-type battery can be a CR2450 battery. In some embodiments, a coin-type battery can be a CR2477 battery. In some embodiments, a coin-type battery can be a CR927 battery.

In some embodiments, a battery can be a rechargeable-type battery. In some embodiments, a battery can be a non-rechargeable type battery. In some embodiments, a battery can be an alkaline battery. In some embodiments, a battery can be a nickel cadmium battery. In some embodiments, a battery can be a nickel metal hydride battery. In some embodiments, a battery can be a carbon-zinc battery. In some embodiments, a battery can be a lithium ion battery. In some embodiments, a battery can be a zinc-air battery.

A spirometer can comprise an indication or indicia of an amount of power remaining in the power source if applicable. For example, a spirometer comprising a rechargeable battery can comprise an indication of an amount of power remaining, and/or a charge state when in a charging configuration.

Accelerometer

In some embodiments, a base station (105) can comprise an accelerometer. In some specific embodiments, an accelerometer can be comprised on a visual display (110). This configuration can allow an individual to interact with a visual display (110) in either a landscape or portrait mode dependent upon the orientation of a visual device.

In some embodiments, a detection unit (130) can comprise an accelerometer. In some embodiments, a detection unit (130) can comprise a gyroscope. In some embodiments, a detection unit (130) can comprise both a gyroscope and an accelerometer. In each configuration, the orientation of a detection unit (130) can be determined. A combination of an accelerometer and a gyroscope can provide a more accurate measurement of an orientation of a detection unit (130) in 3 dimensional spaces. For example, a combination of an accelerometer and gyroscope can provide an indication of when a detection unit (130) is in a proper orientation relative to a base station (105) to provide efficient wireless charging. This can be electronically coupled with an indicator element (140) as described above to provide a visual, audible or mechanical indication of achieving a proper orientation of a detection unit (130) relative to a base station (105).

Peripheral Devices

A spirometer provided herein can be configured for connection to one or more peripheral devices. A peripheral device can be, e.g., a monitor, printer, computer, tablet, smartphone, other spirometer, fax machine, etc. A peripheral device can be connected to a spirometer provided herein by any means of connections described herein. In some embodiments, a spirometer provided herein can interface with one or more peripheral devices. In some embodiments, a peripheral device can include health (e.g., medical) sensors/devices and or environmental sensors/devices. For example, health sensors can include a blood pressure meter, pulse meter, scale, thermometer, glucometer, oxymeter, and other similar devices and or sensors. Environmental sensors/devices can include smoke detectors, CO detectors, and temperature sensors. In some embodiments, a peripheral device can comprise a video capture device, a kinematic orientation/motion tracker, an accelerometer, a gyroscope, an attitude sensor, a global positioning system, a temperature monitor, a blood pressure monitor, a biometric security device, an electrocardiography (EKG/ECG) sensor, or an electroencephalography (EEG) sensor. In some aspects, a ECG can be a 12-lead ECG.

Language Support

A spirometer provided herein can provide audible or visual messages in one or more languages, e.g., English, Spanish, French, Mandarin, Dutch, etc. In some embodiments, a spirometer provided herein can support multiple languages including but not limited to German, English, French, Italian, Spanish, Polish, Portuguese, Swedish, Norwegian, Danish, Finnish, Lithuanian, Latvian, Estonian, Dutch, Greek, Catalan, Basque, Czech, Slovak, Arabic, Japanese, Chinese, Russian, Serbian, Croatian, Icelandic languages, Swahili, Bantu languages. Hindi and other languages of the world.

Device Settings

A spirometer described herein can be configured to require minimal user setup. In some cases, a spirometer can be configured to allow for a "quick start" mode, whereby a spirogram can be captured without entering a patient's demographic information. In some cases, a spirometer can be configured with default setting that can be modified by a user. In some cases, a spirometer can prompt a user to input parameters such as language, date, time, date/time format, timezone, daylight savings compliance, site information, user information, etc. In some cases, a spirometer can comprise a calendar feature that can track patient visits; whether scheduled or unscheduled. A spirometer may prompt a user to input and/or control for ambient conditions. In some cases, a spirometer may prompt a user to perform a calibration. In some cases, a spirometer can perform a calibration automatically.

Depending on input settings, a spirometer can be configured to operate under specific workflows by altering an operating protocol. A spirometer can choose a proper reference value depending upon input settings. A spirometer can be configured to allow for multiple patient studies. In some cases, a spirometer can calculate criteria for inclusion, randomization, withdrawal and notifications in a clinical trial for a specific workflow. In some cases, different components of a clinical trial (e.g. screening, treatment, follow-up) can be individual workflows.

A device or system described herein can be configured to be operated by a right handed or a left handed individual. In some cases, a user can adjust a brightness or a volume of a visual display. In some cases, device settings can be reset to factory default.

Device and Systems

Devices and systems provided herein can be used for spirometry, or a spirometry test, or a pulmonary function test. A device or system as described herein can have mass of less than 1000 g, less than 900 g, less than 800 g, less than 700 g, less than 600 g, less than 500 g, or less than 400 g.

A spirometry test can quantify how well a subject is breathing. The process of breathing, also referred to as respiration, can be broken into two phases—inspiration and expiration. Inspiration can involve inhalation of air into the lungs. Expiration can involve exhalation of air out of the lungs. During a test using a device or system provided herein, a subject can breathe into, out of, or through a mouthpiece (135) and a flow sensor as described herein can measure the volume and/or flow rate during inspiration, expiration or both inspiration and expiration. Data from a spirometry test, also referred to as spirometric data, can be used to assess pre-disease states, delineate risk facts, and assess lung growth. Spirometric data can also be used in clinical trials or for healthcare purposes by, for example, providing information that can be used to: diagnose conditions, monitor or assess the prognosis of a subject or patient, quantify a severity of an airway disease, or assess an effect of a course of treatment. Spirometric data can also be used to monitor, screen, or survey workers exposed to respiratory hazards.

In some instances spirometry data can be collected by a single organization from multiple users, for example in clinical trials, hospitals, health care facilities and from other organizations that perform healthcare related services. Clinical trial organizations include pharmaceutical companies, contract research organizations, and biotech companies, for example, and these organizations can conduct global clinical trials in the area of respiratory therapy. The healthcare market, including research institutes and healthcare organizations, for example hospitals and clinics, can collect spirometry data from a diverse group of users from around the world. Spirometers provided herein can also be used for private personal use, for example by patient that have a chronic condition or are chronically exposed to agents or chemicals that can cause a chronic condition.

In some instances a spirometry test can be conducted on a test subject or patient by a clinical trial professional or healthcare professional.

Spirometers provided herein can be a device or system that can be used to perform pulmonary function tests, or collect spirometry data. Spirometers can be used to diagnose a number of diseases including asthma, bronchitis pulmonary fibrosis, cystic fibrosis, chronic obstructive pulmonary disease and emphysema. In some embodiments, individual spirometric measurements can be compared to standards. In some instances, these standards can be calculated based on an individual's age, height, sex, and race/ethnicity since diagnostic thresholds for obstructive lung disease differ by body size and by demographic subgroups. In some instances, spirometric data can be viewed as graphs called spirograms. In some embodiments, to diagnose a particular obstructive disease, at least three spirograms can be generated. In some embodiments, a spirogram can comprise a volume-time spirogram. A basic volume vs. time curve can contain points corresponding to the FEV1 and FVC. In some embodiments, a spirogram can comprise a flow-volume spirogram: An expiratory flow vs. volume curve can display instantaneous airflow rates as a function of volume exhaled. This curve can also contain points corresponding to PEF and FVC. To generate a spirogram, a patient can exhale into a mouthpiece (135) for a period of time. In some embodiments, a patient or subject can exhale into a mouthpiece (135) for at least about 1, 2, 3, 4, 5, 6, 7, 8, 9, 10, 20, 30, 40, 50, 60, 100, or about 300 seconds. In some embodiments, a patient or subject can exhale into a mouthpiece (135) for at least 6 seconds and stop when there is no volume change for 1 second. A forced vital capacity (FVC), which can be the total volume of air that can be exhaled during maximal expiration effort and a forced expiratory volume in one second ($FEV_1$), which can be the volume of air exhaled in a first second under force of maximal inhalation can then be calculated based on the spirograms. If both FVC and $FEV_1$ values are decreased, but the ratio of $FEV_1$ to FVC is normal, a restrictive ventilator impairment such as asthma, bronchitis or emphysema can be present.

TABLE 1-1

Lung diseases and spirometry results

| Interpretation | FVC | FEV1 | FEV1/FVC % |
|---|---|---|---|
| Normal spirometry | Normal | Normal | Normal |
| Airway obstruction | Low or normal | Low | Low |
| Lung restriction | Low | Low | Normal |
| Combination of obstruction and restriction | Low | Low | Low |

In some instances, a spirometer described herein can be used to diagnose, manage, or assess impairment from a lung disorder or disease. A spirometers provided herein can be used to monitor a progress of disease and/or an efficacy of a particular course of treatment. A spirometer provided herein can be used to find a cause of shortness of breath; for example, in some instances, a spirometer can be used on patients with symptoms of breathlessness to distinguish a respiratory condition from a cardiac condition in patients. In some instances, a spirometer can be used to differentiate obstructive lung diseases for example asthma, bronchiectasis, bronchitis, or chronic obstructive pulmonary disease (COPD) from restrictive lung diseases. A spirometer can also be used to assess a subject's risk of injury or exposure to contaminants or chemical agents; for example, it can be used to assess risk for barotrauma in scuba diving or to assess potential risks or effect of exposure to an agent associated with occupational asthma. Spirometers can further be used to assess pre-operative risk before anesthesia or surgery, to measure an efficacy of treatment for lung-related conditions and even to diagnose vocal cord dysfunction.

Reducing Error

Provided herein are spirometers that include one or more mechanisms for overcoming error sources. Overcoming error sources can be a requirement for use in treatment or clinical trials. Spirometry data can, for example, result from systematic error, and may not be reduced when observations or tests are averaged—thus making it a problem for clinical trials applications. Systematic error in spirometry tests can include error resulting from instrument malfunction, observational error, operator error and environmental error. Observational error can result from errors made during measurement or recording of data—these errors can cause disparity between a measured value and the quantity of a true value. Operator error can result from errors made by a user or individual conducting a spirometry test, or from a subject or participant that a test is being performed on; for example, invalid spirometry readings can result from an improperly performed test, for example if a subject does not perform a test correctly and/or if a user or test administrator does not inform a subject that they performed a test incorrectly. A spirometer described herein can employ a training or proficiency mode to allow a user to train and/or demonstrate proficiency with operation of a spirometer prior to use; thereby reducing operator error. Environmental variables including temperature, humidity, and air turbidity can also impact a quality, and/or variability of a spirometry test result.

Spirometers can comprise one or more mechanisms for reducing systematic error. Mechanisms for reducing systematic error can include a biometric sensor for identifying a user, test administrator or subject. A biometric sensor can be, e.g., a fingerprint sensor (125). Biometric sensors, e.g., fingerprint sensor (125), can allow easy error identification and correction; for example a spirometry data collected by a specific test administrator or user can be analyzed relative to the rest of the collected data to determine if a test administrator or user is properly conducting the spirometry tests. In some embodiments mechanisms for reducing error can also include improved sensors, for example sensors that detect a position of a subject during a test to determine if a subject is leaning forward which may cause lung collapse and incorrect readings. Additional sensors can be included for detecting environmental factors, for example temperature, humidity, and air turbidity. In some embodiments a test can be conducted and displayed in real-time on a screen that a user or test administrator can monitor. A system or device can in some instances be configured to be calibration-free to avoid errors resulting from user or subject error. A system or device can comprise features that improve the quality of user coaching by including an accelerometer, gyroscope or other sensor that can detect movement, orientation, or changes in a position of a mouthpiece (135) or detection unit (130). Data transfer can occur directly from a detector unit to a dedicated base station (105) or system where it can be processed without additional error-prone transfer steps. A device or system can be configured with an easy to interact with user interface, which can reduce operator error. A device or system can be configured to comprise a base station (105) and a wireless detection unit (130), to reduce testing errors resulting from a subject being restrained by a cord or confined to a limited position during a spirometry test. To identify sources of error, a base station (105) can be configured to analyze or average data by a given variable for example by date, user/test administrator, ambient conditions or other potentially variables.

A system of device provided herein can integrate error reducing features into an easy to use platform for analyzing clinical trials or healthcare data. A user interface can be simple to use such that a user, clinician, or clinical trials professional can use the variables to do a rigorous error analysis. In some embodiments error analysis can be conducted manually by an individual, for example a clinician, or clinical trials profession. In further embodiments a system can comprise user friendly or automated mechanisms for error analysis or cross-correlation analysis of results taken for example under different environmental conditions or from a particular user. A system or device can be configured for automatically conducting an error analysis or cross-correlation analysis between different variables or across different tests, for example a statistical distribution can be calculated from results for all users and compared with a distribution of results collected from a specific user or test administrator. A device or system that integrates inputs for multiple variables, for example user identity, ambient conditions, and test validity, can facilitate more efficient methods and mechanisms for facilitating identification of error, improving reproducibility within clinical trials, amongst different demographics and across different climate conditions. Improved devices and systems for use with integrated detection and user quality mechanisms can improve the diagnostic quality of results by reducing noise contributions and allowing comparison between cleaner more standardized data sets; a set of improvements that can be critical to health based studies which can struggle with reproducibility of results.

In the event of errors caused by dysfunction of a spirometer described herein, a spirometer can a function that can allow technical support personnel to adjust workflow status.

Types of Tests

Different types of spirometers can be used alone or in combination, depending on the type of test being conducted. As described above, devices and systems provided herein allow for the integration of multiple detection units (130) with a single base station (105), which can allows for the use of multiple spirometers. In some embodiments a spirometer can be a pneumotachometer for measuring a flow rate of gasses across a fine mesh. In other embodiments, a spirometer can be a whole body plethysmograph, wherein a subject can be enclosed in a small space during a measurement. In yet other embodiments, a spirometer can be fully electronic, without the need for a fine mesh to detect pressure differences. A spirometer can be an incentive spirometer for training or improving pulmonary function. In other embodiments a spirometer can be a peak flow meter for measuring a subject's ability to exhale. In yet other embodiments a spirometer can be a windmill-type, using a rotating disk to measure pulmonary function. A spirometer can be a tilt-compensated spirometer that assesses and/or compensates for the position of a subject during a spirometry measurement. A spirometer can comprise a fuel cell sensor capable of measuring an amount of alcohol in a breath sample, which can be used to calculate a blood-alcohol content of an individual. In some cases, a spirometer described herein can measure and generate a baseline for a user with or without a disease or condition.

Pulmonary Function Variables

A spirometer described herein can be operated in compliance with the American Thoracic Society (ATS) and/or the European Respiratory Society (ERS) guidelines. Spirometers provided herein can measure multiple pulmonary function variables include the non-limiting list of pulmonary function variables disclosed herein. A spirometer can measure forced vital capacity (FVC), which can measure an amount of air a subject can exhale with force after a subject inhales as deeply as possible. A spirometer can also measure forced expiratory volume (FEV), which can be a measure of an amount of air a subject can exhale with force in one breath. An amount of air exhaled by a subject can be measured at 1 second ($FEV_1$), 2 seconds ($FEV_2$), or 3 seconds ($FEV_3$). In some embodiments, an amount of air exhaled by a subject can be measured for at least 1 second, at least 2 seconds, at least 3 seconds, at least 4 seconds, or at least 5 seconds as appropriate for a spirometric test being conducted. FEV1 divided by FVC can also be determined by a spirometer. A spirometer can be equipped to measure air flow part way through an exhale can be measured using forced expiratory flow 25% to 75%. A spirometer can measure Peak expiratory flow (PEF), which can be a measure of how much air a subject can exhale when a subject exerts most effort. PEF can be measured at the same time as forced vital capacity (FVC). Maximum voluntary ventilation (MVV), which can be a measure of a greatest amount of air a subject can breathe in and out during 1 minute, can also be measured by a spirometer. In some embodiments, an MVV can be measured for at least 15 seconds, at least 30 seconds, at least 45 seconds, at least 1 minute, at least 2 minutes, at least 3 minutes, at least 4 minutes, or at least 5 minutes as appropriate for a spirometric test being conducted. A spirometer can also measure slow vital capacity (SVC), which can be a measure of an amount of air a subject can slowly exhale after a subject inhales as deeply as possible. A spirometer can measure total lung capacity (TLC), which can be a measure of an amount of air in a subject's lungs after a subject inhales as deeply as possible. TLC can be the sum of VC and RV. In additional embodiments a spirometer can measure functional residual capacity (FRC), which can be a measure of an amount of air in a subject's lungs at the end of a normal exhaled breath. A spirometer can further be equipped to measure residual volume (RV), which can be a measure of an amount of air in a subject's lungs after a subject has exhaled completely; this test can be done by breathing in helium or nitrogen gas and seeing how much is exhaled. A spirometer can be configured to further measure expiratory reserve volume (ERV), which can be a measure of a difference between an amount of air in a subject's lungs after a normal exhale (FRC) and an amount after a subject exhales with force (RV). Inspiration capacity (IVC) can also be measured, providing input into a volume change of the lung between maximal expiration to residual volume and full inspiration to total lung capacity. Slow vital capacity (SVC) can be a measure using an amount of air a subject can exhale after inhaling as deeply as possible.

Total lung capacity (TLC) can be the volume in the lungs at maximal inflation, the sum of VC and RV. Tidal volume (TV) can be that volume of air moved into or out of the lungs during quiet breathing. TV can indicate a subdivision of the lung. In some instances when tidal volume is measured as a gas exchange calculation, the symbol TV or $V_T$ can be used. Residual volume (RV) can be the volume of air remaining in the lungs after a maximal exhalation. Expiratory reserve (ERV) volume can be the maximal volume of air that can be exhaled from the end-expiratory position. Inspiratory reserve volume (IRV) can be the maximal volume that can be inhaled from the end-inspiratory level. Inspiratory capacity (IC) can be the sum of IRV and TV. Inspiratory vital capacity (IVC) can be the maximum volume of air inhaled from the point of maximum expiration. Vital capacity (VC) can be the volume of air breathed out after the deepest inhalation. Functional residual capacity (FRC) can be the volume in the lungs at the end-expiratory position. Residual volume can be expressed as a percent of TLC (RV/TLC %). Forced expiratory flow ($FEF_x$) can be related to some portion of the FVC curve, where $x$ modifiers can refer to amount of FVC already exhaled. $FEF_{max}$ can be the maximum instantaneous flow achieved during a FVC maneuver.

In some embodiments, spirometric data can be plotted as a spirogram. In some embodiments, a spirogram can be depicted as a volume-time tracing. In other embodiments, a spirogram can be depicted as an air flow rate-volume tracing. In some embodiments, a spirogram can be used to derive numerical data regarding mechanical properties of lungs. In some embodiments, airflow parameters can be derived from a spirogram. In some embodiments, airflow parameters can be an individual's $FEV_1$, $FEV_2$ or $FEV_3$. In other embodiments, exhaled lung volume parameters can be derived from a spirogram. In some embodiments, an exhaled lung volume parameter can be an individual's FVC or SVC. In some embodiments, these derived values can be corrected for variations in ambient temperature or humidity between subsequent measurements.

A spirogram can be visually displayed in a visual display. In some cases, a spirogram can be displayed upon completion of a spirometry experiment. In some cases, a spirogram can be displayed in real time while a subject is performing a spirometry maneuver. A spirogram can be transferred to a storage device a described herein, and/or can be printed using a printer in communication with the spirometer. In some embodiments, data transfer across devices can be a secure transfer. In some embodiments, transferred data can be encrypted. In some cases, data can be transferred and/or printed individually. In some cases, data can be transferred and/or printed in batch. In some cases, data can be sent from a spirometer via email. A spirometer can convert data to a computer readable format such as a png, pdf, jpeg, etc. A spirometer can be capable of capturing, saving, and/or printing a screenshot.

A spirometer can support branching of an action sequence or a workflow. Furthermore, a spirometer can compile a listing of all patient for which data has been collected. A spirometer can toggle between patient data collected. In some cases, a spirometer can employ a waiting room function to toggle between patients which are active within a visit workflow. A spirometer can allow for deactivation of a patient's data from an active workflow.

A spirogram can display a medication and/or dosage of a medication that has been administered to a patient. Upon completion of a spirometry maneuver, a spirometer can display a reversibility change from predose to postdose. In some cases, a reversibility change can be determined as a percentage. In some cases, a reversibility change can be determined as an absolute value. In some cases, a spirometer can display a predicted value of an airflow parameter. In some cases, a spirometer can display a percent deviation from a predicted value. A spirometer can allow a choice of authors for a predicted value for a specific patient. A spirometer can display an error such as noncompliance with ATS or ERS guidelines.

Upon completion of a spirometry maneuver, a user can manipulate a spirometry data. In some cases, a user can select or deselect specific spirograms. In some cases, a user can append or deleted data. In some cases, a user can annotate or provide comments. In some cases, a user can amend patient demographics such as a patient's date of birth, age, medication dosage, site information, etc. In some cases, a spirometer can recalculate an airflow parameter based on any changes to a patient's demographics. Based on manipulation by a user, a spirometer can generate a customized report. In some cases, a report can have a header section, a body section displaying the specific data for the defined report, footer section, or a combination thereof.

In some cases, a user can configure a format or a unit in which a patient's data is displayed. In some cases, a patient's data can be filterable.

Pre-Calibration

In some embodiments, calibration of spirometers can be required at regular time intervals, and can be performed by a person specially trained for such calibrations. Calibration can require shipment of a spirometer unit to a third party calibrator or to a manufacturer for regular calibration, which can result in instrument downtime as well as increased costs. Provided herein are pre-calibrated sensors, which can be shipped in a calibrated state and therefore need not be initially calibrated. Because regular use of each sensor can result in the need for recalibration, replacement of each sensor with a new, pre-calibrated sensor can eliminate the need for regular calibration.

In some embodiments, a pre-calibrated pneumotach tube can be built on JAEGER technology. In some aspects a pre-calibrated sensor can be built on JAEGER technology. In some embodiment, a pneumotach tube can be attached to a mouthpiece. In some embodiments, a mouthpiece can comprise a pneumotach tube.

In some embodiments, air flow sensors and/or alcohol sensors in a detection unit (130) described herein can be standardized with respect to a set standard. In such an embodiment, each sensor can be pre-calibrated prior to initial use by an individual. Multiple pre-calibrated sensors can be swapped out for sensors that need recalibration, thereby eliminating the need for routine calibration. In some embodiments, individual sensors can be specifically calibrated to a certain individual, e.g., sensors can be swapped out between individuals such that each individual has their own set of sensors. Prior to subsequent use by a same individual, sensors previously calibrated for that individual can be swapped into a detection unit (130) such that recalibration for that individual may not necessary.

Correlating Biometric and Spirometric Data

In some embodiments, an individual can biometrically authenticate prior to operating a spirometer provided herein. In some embodiments, a biometric authentication can be used to create a biometric profile of an individual. In such an embodiment, an individual's biometric data (e.g., finger print, retinal scan, etc) can be correlated to an individual's spirometric data after operating a spirometer. Subsequent biometric authentication sessions can then be used to build a profile of spirometric data for an individual, which can be accessed readily by, for example, a health care provider or a law enforcement agent. This process can allow for continuous monitoring of an individual's spirometric data over time on the same instrument, which can be used to assess an effectiveness of a given treatment, or a progression of a pulmonary obstructive condition.

Although described with reference to preferred embodiments of the invention, it should be readily understood that various changes and/or modifications can be made to the invention without departing from the spirit thereof.

In some embodiments, a spirometer disclosed herein can have one or more of the technical features disclosed in Table 2-2.

TABLE 2-2

| Technical features | |
| --- | --- |
| Flow measurement | High-quality pneumotach |
| Flow range | 0.1 to ± 16 L/s |
| Flow accuracy | 0.1 to 14 L/s: +/−5%/0.2 L/s |
| Flow resolution | 5 mL/s |
| Resistance | 0.05 kPa/(L/s) at 10 L/s |
| Volume measurement | Digital integration |
| Volume range | 0.1 to 8 L |
| Volume accuracy | 0.5 to 8 L: +/−3 %/0.05 L |

TABLE 2-2-continued

| Technical features | |
|---|---|
| Volume resolution | 1 mL |
| Display | High-resolution graphical LCD touchscreen, backlit |
| L × W × H | 31.7 cm × 19.3 cm × 10.2 cm |
| Screen Display | 16.2 cm × 12.2 cm, color, touchscreen, 1024 × 800 pixels |
| Power Supply Input | 100-240 VAC, 50/60 Hz, 1.5 A |
| Power Supply Output | 5 V, 6 A |

IV. EXAMPLES

Example 1

Fingerprint Biometric Enrollment

Prior to initial use of a spirometer, fingerprint biometric data can be collected from a patient. A patient can swipe or place his or her fingertip over or on an optical fingerprint sensor on a base station. After swiping, an audible chime can sound that indicates successful capture of the patient's fingerprint. The process can be repeated 3 to 5 more times in order to produce accurate fingerprint enrollment data, which can be stored on a cloud-based server for future biometric authentication.

Example 2

Retinal Biometric Enrollment

Prior to initial use of a spirometer, retinal biometric data can be collected from a patient. A patient or a medical profession can hold a detection unit that can comprise a retinal sensor such that an infrared light can be centered on the patient's eyeball. A patient or a medical profession can hold a detection unit in place centered on the eye until an audible chime sounds that indicates successful capture of a patient's retina image. The process can be repeated 3 to 5 more times in order to produce accurate retinal enrollment data, which can be stored on a cloud-based server for future biometric authentication.

Example 3

Voice Recognition Biometric Enrollment

Prior to initial use of a spirometer, voice recognition biometric data can be collected from a patient. A patient can be given a unique pass phrase, which a patient can recite into a microphone attached to a base station. An audible chime can indicate successful capture of the patient's voice. The process can be repeated 3 to 5 more times in order to produce accurate voice recognition enrollment data, which can be stored on a cloud-based server for future biometric authentication.

Example 4

Activation of Spirometer Base Station

Prior to use by a patient, a physician or health care professional can swipe or place his or her finger across or on a thermal or optical fingerprint scanner. Successful biometric authentication can permit activation of a spirometer base station prior to use by a patient. Successive unsuccessful biometric authentication attempts can result in a spirometer base station being locked, in which case other forms of authentication can be used to unlock a base station.

Example 5

Activation of a Spirometer Detection Unit

Prior to use by a patient, a spirometer detection unit can be wirelessly connected to a spirometer base station. A base station can be activated by biometric authentication by a patient. A patient can grip a detection unit such that a finger is making contact with an optical fingerprint scanner located along an outer cylindrical face of a detection unit. Successful authentication can result in an audible chime sounding from a speaker on a detection unit, followed by a picture of a patient appearing on a visual display to allow a healthcare provider an additional physical check to ensure proper authentication. Unsuccessful authentication can result in a buzzer sounding from a speaker, indicating a need to re-attempt authentication.

Example 6

Collection of Expiration Data

After activation of a spirometer detection unit by biometric authentication, a green LED on a detection unit can prompt a patient to place a mouthpiece of a detection unit in his or her mouth and exhale through a mouthpiece into a detection unit. The entirety of the air can flow through a detection unit, where the exhaled air makes contact an ultrasonic flow rate sensor in a detection unit. A red LED can illuminate in place of a green LED after 5 seconds of expiration, prompting a patient to cease exhaling. A flow rate can then be plotted as a function of time to construct a spirogram, which can then appear on a visual display.

Example 7

Collection of Inspiration Data

After activation of a spirometer detection unit by biometric authentication, a green LED on a detection unit can prompt a patient to place a mouthpiece of a detection unit in his or her mouth and exhale through a mouthpiece into a detection unit. The entirety of air can flow through a detection unit, where the inhaled air makes contact an ultrasonic flow rate sensor and pitot tube in a detection unit. A red LED illuminates in place of a green LED after 5 seconds of inspiration, prompting a patient to cease inhaling. A flow rate can then be plotted as a function of time to construct a spirogram, which can then appear on a visual display.

Example 8

Manipulation of Patient Spirometric Data

After collecting spirometric data from a patient, a healthcare provider can review a patient's data by direct interaction with a touch screen visual display on a base station. A healthcare provider can make appropriate notes about the current spirometric data, compare data to spirometric data collected at previous times by a same individual, and export the patient data to a cloud based storage service, where the patient data can be linked to the biometric data collected during enrollment from the patient.

Example 9

Spirometric Detection of Blood Alcohol Content (BAC)

A law enforcement official can biometrically activate a base station of a spirometer prior to use. A detection unit, which can be wirelessly connected to a base station, can then be brought to an individual to determine a BAC of the individual. The individual can exhale into a mouthpiece of a detection unit, where the entirety of the exhaled air makes contact with duel platinum fuel cells within a detection unit. The oxidation of alcohol in the exhaled air, if any, gives rise to an electric current. This electric current can then be converted into a blood alcohol content, which can be transferred wirelessly to a base station and can be displayed on a visual display of a base station. A BAC data can be exported and saved to a cloud-based server, or can be stored on an integrated hard drive comprised on a base station for later retrieval.

Example 10

Error Reduction

Prior to use in a clinical trial setting, various parameters can be controlled for in order to reduce error to an appropriate level. Prior to collecting spirometric data, a temperature and/or humidity and/or barometric pressure can be recorded through use of ambient temperature sensors on a spirometer detection unit. A thermostat and/or humidifier can be used to keep the levels consistent throughout a clinical trial.

Each patient enrolled in a clinical trial can use separate, pre-calibrated air flow sensors. Prior to use of a spirometer, the appropriate sensors can be installed into a detection unit. At least 2 forms of biometric authentication include a retinal scan and finger print scan can be used to positively identify a patient and eliminate a possibility of misidentification of a patient. During a spirometric data collection, the proper orientation of a detection unit can be monitored through the use of a gyroscope and accelerometer on a detection unit. A spirometric data can be transferred wirelessly in real time to a base station, where a spirometric data can be displayed on a visual display. A healthcare provider can approve or disapprove of a spirogram in the event of faulty reads or instrument malfunction prior to exporting the data to a cloud based server. Air flow sensors can be removed and stored for later use by the same patient to minimize the effect of sensor differences.

Example 11

Monitoring the Progression of a Restrictive Ventilator Impairment

Patients suspected of having a restrictive ventilator impairment such as asthma or emphysema can be examined using spirometry. After biometrically authenticating, a patient can exhale into a mouthpiece for at least 6 seconds through prompting by a presence of a green LED, and stops when there is no volume change for 1 second through prompting of a red LED. A forced vital capacity (FVC), which is a total volume of air that is exhaled during maximal expiration effort and a forced expiratory volume in one second ($FEV_1$), which is a volume of air exhaled in a first second under force of maximal inhalation can be calculated based on a spirograms. If both the FVC and $FEV_1$ values are decreased, but the ratio of $FEV_1$ to FVC is normal, a restrictive ventilator impairment such as asthma, bronchitis or emphysema may be present. A patient can then continue to be monitored over time, and successive spirograms can be compared by a healthcare provider to monitor a progression of a restrictive ventilator impairment through a decrease in FVC and $FEV_1$ values, or monitor an effectiveness of a treatment through an increase in FVC and $FEV_1$ values. While exemplary embodiments have been shown and described here, it will be obvious to those skilled in the art that such embodiments are proved by way of example only. Numerous variations, changes, and substitutions will occur to those skilled in the art. It should be understood that various alternatives to the embodiments described herein may be employed. It is intended that the following claims define the scope of the disclosure and that methods and structures within the scope of these claims and their equivalents be covered thereby.

What is claimed is:

1. A system for assessing pulmonary function comprising:
    (a) a mouthpiece having a cylindrical body and plural flow sensors, each flow sensor being disposed at a different location along a flow path of the cylindrical body, the cylindrical body having a first end and a second end, wherein the first end is opposite from the second end and at least the first end is configured to interact with a human mouth, wherein each flow sensor can generate pulmonary function data from a breath sample provided by a subject;
    (b) a wireless detection unit having an interface for receiving at least the second end of the mouthpiece, wherein the mouthpiece is removable from the wireless detection unit;
    (c) a base station configured to communicate with the wireless detection unit;
    (d) a first biometric sensor on the base station configured to collect biometric data of the user and a second biometric sensor on the wireless detection unit configured to collect biometric data of the subject, wherein the user and the subject are not a same individual; and
    (e) a non-transitory computer readable medium including instructions,
    wherein the mouthpiece in combination with the plural flow sensors form a pneumotach tube,
    wherein the instructions, when executed by the system, i) cause the base station to receive the pulmonary function data, ii) cause the system to authenticate the user based on the biometric data of the user, iii) cause the system to allow different defined rights to different users authenticated using the biometric data of the user, iv) cause the biometric data of the user collected by the first biometric sensor to control access to an application, wherein the application provides access to operate the wireless detection unit, and (v) cause the system to authenticate the subject based on the biometric data of the subject,
    wherein the wireless detection unit or the base station includes one or more indicator elements to direct the subject through a sequence for providing the breath sample,
    wherein the system is configured to determine a validity of the pulmonary function data based on the sequence for providing the breath sample, wherein the system is configured to perform a cross-correlation analysis that cross-correlates the pulmonary function data generated by the subject with stored pulmonary function data, wherein the system is configured to select the stored pulmonary function data based on identifying information of one or more subjects or select the stored pulmonary function data based on plural variables, the plural variables including the identifying information of one or more subjects and at least one of: an identity of the authenticated user, one or more ambient conditions measured when the breath sample is provided, and the determined validity of the pulmonary function data, and wherein the system is configured to standardize the pulmonary function data of the subject based on the cross-correlation analysis, the standardized pulmonary function data being used to assess pulmonary function of the subject.

2. The system of claim 1, wherein the wireless detection unit further comprises a power source.

3. The system of claim 2, wherein the power source is a battery.

4. The system of claim 3, wherein the battery is a lithium ion battery pack.

5. The system of claim 4, wherein the wireless detection unit further comprises a charging receiver coil.

6. The system of claim 5, wherein the charging receiver coil is a wireless charging receiver coil.

7. The system of claim 1, wherein the wireless detection unit further comprises a gyroscope or an accelerometer.

8. The system of claim 7, wherein the gyroscope or accelerometer detects axial changes including orientation, rotation, and vibration.

9. The system of claim 1, wherein the one or more indicator elements comprises one or more audible source.

10. The system of claim 1, wherein the one or more indicator elements comprises one or more light emitting diodes.

11. The system of claim 10, wherein the one or more light emitting diodes direct the subject or the user.

12. The system of claim 11, wherein the one or more light emitting diodes direct the subject to inhale, hold air in lungs, or exhale.

13. The system of claim 12, wherein the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds.

14. The system of claim 1, wherein the wireless detection unit transmits the data collected using the pneumotach tube to the base station over a network.

15. The system of claim 14, wherein the wireless detection unit transmits the data collected using the pneumotach tube to the base station via short-range wireless communications.

16. The system of claim 14, wherein the network is a wireless network.

17. The system of claim 16, wherein the base station communicates with the wireless detection unit using a personal area network, Infrared Transmission, short-range wireless communications, or any combination thereof.

18. The system of claim 16, wherein the base station communicates with two or more wireless detection units.

19. The system of claim 16, wherein the wireless detection unit and the base station are separated by a distance.

20. The system of claim 1, wherein the base station further comprises a visual display.

21. The system of claim 20, wherein the visual display displays the pulmonary function data in real-time.

22. The system of claim 21, wherein the system is configured to determine a validity of the pulmonary function data, and wherein the visual display comprises an animated icon indicating the validity of the pulmonary function data in real-time.

23. The system of claim 20, wherein the system is configured to determine a success or failure to transmit the data collected using the pneumotach tube from the wireless detection unit, and wherein the visual display displays a user icon or a subject icon that provides feedback regarding the success or failure to transmit the data collected using the pneumotach tube from the wireless detection unit.

24. The system of claim 1, wherein the base station further comprises a power source.

25. The system of claim 24, wherein the power source is a battery.

26. The system of claim 25, wherein the battery is a lithium ion battery pack.

27. The system of claim 6, wherein the base station further comprises a charging transmitter coil.

28. The system of claim 27, wherein the charging transmitter coil is a wireless charging transmitter coil.

29. The system of claim 1, wherein the system further comprises a humidity sensor.

30. A system for assessing pulmonary function comprising:

(a) a mouthpiece having a cylindrical body and plural flow sensors, each flow sensor being disposed at a different location along a flow path of the cylindrical body, the cylindrical body having a first end and a second end, wherein the first end is opposite from the second end and at least the first end is configured to interact with a human mouth, wherein each flow sensor can generate pulmonary function data from a breath sample provided by a subject;

(b) a wireless detection unit having an interface for receiving at least the second end of the mouthpiece, wherein the mouthpiece is removable from the wireless detection unit, wherein the wireless detection unit further comprises a charging receiver coil;

(c) a base station configured to communicate with the wireless detection unit, wherein the base station comprises a touch visual display and a docking cradle, wherein the docking cradle comprises a charging transmitter coil and is sized and adapted to store the wireless detection unit and to wirelessly charge the wireless detection unit;

(d) a first biometric sensor on the base station configured to collect biometric data of the user and a second biometric sensor on the wireless detection unit configured to collect biometric data of the subject, wherein the user and the subject are not a same individual; and (e) a non-transitory computer readable medium including instructions, wherein the mouthpiece in combination with the plural flow sensors form a pneumotach tube, wherein the instructions, when executed by the system, i) cause the base station to receive the pulmonary function data, ii) cause the system to authenticate the user based on the biometric data of the user, and iii) cause the system to allow different defined rights to different users authenticated using the biometric data of the user, iv) cause the biometric data of the user collected by the first biometric sensor to control access to an application, wherein the application provides access to operate the wireless detection unit, and (v) cause the system to authenticate the subject based on the biometric data of the subject, wherein the wireless detection unit or the base station includes one or more indicator elements to direct the subject through a sequence for providing the breath sample, wherein the system is configured to determine a validity of the pulmonary function data based on the sequence for providing the breath sample, wherein the system is configured to perform a cross-correlation analysis that cross-correlates the pulmonary function data generated by the subject with stored pulmonary function data, wherein the system is configured to select the stored pulmonary function data based on identifying information of one or more subjects or select the stored pulmonary function data based on plural variables, the plural variables including the identifying information of one or more subjects and at least one of: an identity of the authenticated user, one or more ambient conditions measured when the breath sample is provided, and the determined validity of the pulmonary function data, and wherein the system is configured to standardize the pulmonary function data of the subject based on the cross-correlation analysis, the standardized pulmonary function data being used to assess pulmonary function of the subject.

31. The system of claim 30, wherein the wireless detection unit further comprises a power source.

32. The system of claim 30, wherein the charging receiver coil is a wireless charging receiver coil.

33. The system of claim 30, wherein the wireless detection unit further comprises a gyroscope or an accelerometer.

34. The system of claim 33, wherein the gyroscope or accelerometer detects axial changes including orientation, rotation, and vibration.

35. The system of claim 30, wherein the one or more indicator elements comprises one or more audible source.

36. The system of claim 30, wherein the one or more indicator elements comprises one or more light emitting diodes.

37. The system of claim 36, wherein the one or more light emitting diodes direct the subject or the user.

38. The system of claim 37, wherein the one or more light emitting diodes direct the subject to inhale, hold air in lungs, or exhale.

39. The system of claim 38, wherein the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds.

40. The system of claim 30, wherein the wireless detection unit transmits the data collected using the pneumotach tube to the base station over a network.

41. The system of claim 40, wherein the wireless detection unit transmits the data collected using the pneumotach tube to the base station via short-range wireless communications.

42. The system of claim 40, wherein the network is a wireless network.

43. The system of claim 42, wherein the base station communicates with the wireless detection unit using a personal area network, Infrared Transmission, short-range wireless communications, or any combination thereof.

44. The system of claim 42, wherein the base station communicates with two or more wireless detection units.

45. The system of claim 42, wherein the wireless detection unit and the base station are separated by a distance.

46. The system of claim 30, wherein the touch visual display displays the pulmonary function data in real-time.

47. The system of claim 46, wherein the system is configured to determine a validity of the pulmonary function data, and wherein the touch visual display comprises an animated icon indicating the validity of the pulmonary function data in real-time.

48. The system of claim 46, wherein the system is configured to determine a success or failure to transmit the data collected using the pneumotach tube from the wireless detection unit, and wherein the touch visual display displays a user icon or a subject icon that provides feedback regarding the success or failure to transmit the data collected using the pneumotach tube from the wireless detection unit.

49. The system of claim 30, wherein the base station further comprises a power source.

50. The system of claim 49, wherein the power source is a battery.

51. The system of claim 50, wherein the battery is a lithium ion battery pack.

52. The system of claim 32, wherein the charging transmitter coil is a wireless charging transmitter coil.

53. A system for assessing pulmonary function comprising:

(a) a mouthpiece having a cylindrical body and plural flow sensors, each flow sensor being disposed at a different location along a flow path of the cylindrical body, the cylindrical body having a first end and a second end, wherein the first end is opposite from the second end and at least the first end is configured to interact with a human mouth, wherein each flow sensor can generate pulmonary function data from a breath sample provided by a subject;

(b) a wireless detection unit having an interface for receiving at least the second end of the mouthpiece, wherein the mouthpiece is removable from the wireless detection unit, wherein the wireless detection unit further comprises a power source and a charging receiver coil;

(c) a base station configured to communicate with the wireless detection unit over short-range wireless communications, wherein the base station comprises a docking cradle and a touch visual display, wherein the docking cradle comprises a charging transmitter coil and is sized and adapted to store the wireless detection unit and to wirelessly charge the wireless detection unit;

(d) a first biometric sensor on the base station configured to collect biometric data of the user and a second biometric sensor on the wireless detection unit configured to collect biometric data of the subject, wherein the user and the subject are not a same individual; and (e) a non-transitory computer readable medium including instructions, wherein the mouthpiece in combination with the plural flow sensors form a pneumotach tube, wherein the instructions, when executed by the system, i) cause the base station to receive the pulmonary function data, ii) cause the system to authenticate the user based on the biometric data of the user, and iii) cause the system to allow different defined rights to different users authenticated using the biometric data of the user, iv) cause the biometric data of the user collected by the biometric sensor to control access to an application, wherein the application provides access to operate the wireless detection unit, and (v) cause the system to authenticate the subject based on the biometric data of the subject, wherein the wireless detection unit or the base station includes one or more indicator elements to direct the subject through a sequence for providing the breath sample, wherein the system is configured to determine a validity of the pulmonary function data based on the sequence for providing the breath sample, wherein the system is configured to perform a cross-correlation analysis that cross-correlates the pulmonary function data generated by the subject with stored pulmonary function data, wherein the system is configured to select the stored pulmonary function data based on identifying information of one or more subjects or select the stored pulmonary function data based on plural variables, the plural variables including the identifying information of one or more subjects and at least one of: an identity of the authenticated user, one or more ambient conditions measured when the breath sample is provided, and the determined validity of the pulmonary function data, and wherein the system is configured to standardize the pulmonary function data of the subject based on the cross-correlation analysis, the standardized pulmonary function data being used to assess pulmonary function of the subject.

54. The system of claim 53, wherein the charging receiver coil is a wireless charging receiver coil.

55. The system of claim 53, wherein the wireless detection unit further comprises a gyroscope or an accelerometer.

56. The system of claim 55, wherein the gyroscope or accelerometer detects axial changes including orientation, rotation, and vibration.

57. The system of claim 53, wherein the one or more indicator elements comprises one or more audible source.

58. The system of claim 53, wherein the one or more indicator elements comprises one or more light emitting diodes.

59. The system of claim 58, wherein the one or more light emitting diodes direct the subject or the user.

60. The system of claim 59, wherein the one or more light emitting diodes direct the subject to inhale, hold air in lungs, or exhale.

61. The system of claim 60, wherein the one or more light emitting diodes direct the subject to inhale, hold air in lungs, or exhale for at least 1, 2, 3, 4, 5, 6, 7, 8, 9, 10, 11, 12, 13, 14, 15, 16, 17, 18, 19, or 20 seconds.

62. The system of claim 53, wherein the wireless detection unit transmits the data collected using the pneumotach tube to the base station over a network.

63. The system of claim 62, wherein the network is a wireless network.

64. The system of claim 63, wherein the base station communicates with the wireless detection unit using a personal area network, Infrared Transmission, or short-range wireless communications.

65. The system of claim 63, wherein the base station communicates with two or more wireless detection units.

66. The system of claim 63, wherein the wireless detection unit and the base station are separated by a distance.

67. The system of claim 53, wherein the touch visual display displays the pulmonary function data in real-time.

68. The system of claim 67, wherein the system is configured to determine a validity of the pulmonary function data, and wherein the touch visual display comprises an animated icon indicating the validity of the pulmonary function data in real-time.

69. The system of claim 67, wherein the system is configured to determine a success or failure to transmit the data collected using the pneumotach tube from the wireless detection unit, and wherein the touch visual display displays a user icon or a subject icon that provides feedback regarding the success or failure to transmit the data collected using the pneumotach tube from the wireless detection unit.

70. The system of claim 53, wherein the base station further comprises a power source.

71. The system of claim 70, wherein the power source is a battery.

72. The system of claim 71, wherein the battery is a lithium ion battery pack.

73. The system of claim 54, wherein the charging transmitter coil is a wireless charging transmitter coil.

74. The system of claim 53, wherein the system further comprises a humidity sensor.

75. The system of claim 1, wherein the pneumotach tube is a lilly type pneumotach tube.

76. The system of claim 30, wherein the pneumotach tube is a lilly type pneumotach tube.

77. The system of claim 53, wherein the pneumotach tube is a lilly type pneumotach tube.

78. The system of claim 1, wherein the system further comprises a temperature sensor and a humidity sensor for measuring ambient conditions of the one or more ambient conditions.

79. The system of claim 78, wherein the temperature sensor and the humidity sensor are connected to the system by short-range wireless communications.

80. The system of claim 78, wherein the system is configured to compensate or adjust the pulmonary function data collected using the pneumotach tube based on an ambient condition measurement made by the temperature sensor and an ambient condition measurement made by the humidity sensor.

81. The system of claim 30, wherein the system further comprises a temperature sensor and a humidity sensor for measuring ambient conditions of the one or more ambient conditions.

82. The system of claim 81, wherein the temperature sensor and the humidity sensor are connected to the system by short-range wireless communications.

83. The system of claim 81, wherein the system is configured to compensate or adjust the pulmonary function data collected using the pneumotach tube based on an ambient condition measurement made by the temperature sensor and an ambient condition measurement made by the humidity sensor.

84. The system of claim 53, wherein the system further comprises a temperature sensor and a humidity sensor for measuring ambient conditions of the one or more ambient conditions.

85. The system of claim 84, wherein the temperature sensor and the humidity sensor are connected to the system by short-range wireless communications.

86. The system of claim 84, wherein the system is configured to compensate or adjust the pulmonary function data collected using the pneumotach tube based on an ambient condition measurement made by the temperature sensor and an ambient condition measurement made by the humidity sensor.

87. The system of claim 1, wherein the user is a healthcare provider and the subject is a patient.

88. The system of claim 30, wherein the user is a healthcare provider and the subject is a patient.

89. The system of claim 53, wherein the user is a healthcare provider and the subject is a patient.

90. The system of claim 1, wherein the defined rights comprise an ability to amend the subject's demographics on the system.

91. The system of claim 30, wherein the defined rights comprise an ability to amend the subject's demographics on the system.

92. The system of claim 53, wherein the defined rights comprise an ability to amend the subject's demographics on the system.

93. The system of claim 1, wherein the first biometric sensor is a fingerprint sensor, wherein the biometric data of the user includes a fingerprint of the user, wherein the fingerprint sensor is configured to selectively permit access to a feature of the system based on the fingerprint of the user.

94. The system of claim 1, wherein the base station further comprises an ambient sensor for measuring an ambient condition of the one or more ambient conditions and a docking cradle sized and adapted to store the wireless detection unit, wherein the ambient sensor is configured to measure barometric pressure.

95. The system of claim 1, wherein the pneumotach tube is disposable and pre-calibrated.

96. The system of claim 94, wherein the system is configured to assess the pulmonary function based on the pulmonary function data and a barometric pressure measurement made by the ambient sensor.

97. The system of claim 1, wherein the pulmonary function data collected using the pneumotach tube is transmitted from the wireless detection unit.

98. The system of claim 93, wherein the feature of the system comprises pulmonary function data stored on the system.

99. The system of claim 93, wherein the feature of the system comprises operation of the wireless detection unit.

100. The system of claim 93, wherein the feature of the system comprises pulmonary function data stored on the system for a plurality of subjects.

* * * * *